US010484361B2

(12) United States Patent
Pappu et al.

(10) Patent No.: US 10,484,361 B2
(45) Date of Patent: Nov. 19, 2019

(54) SYSTEMS, METHODS, AND APPARATUSES FOR IMPLEMENTING A VIRTUAL DEVICE OBSERVATION AND DEBUG NETWORK FOR HIGH SPEED SERIAL IOS

(71) Applicant: Intel Corporation, Santa Clara, CA (US)

(72) Inventors: Lakshminarayana Pappu, Folsom, CA (US); Timothy J. Callahan, Hillsboro, OR (US); Baruch Schnarch, Halfa (IL); Hem Doshi, Folsom, CA (US); Suketu U. Bhatt, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 622 days.

(21) Appl. No.: 15/199,356

(22) Filed: Jun. 30, 2016

(65) Prior Publication Data
US 2018/0007032 A1 Jan. 4, 2018

(51) Int. Cl.
*H04L 29/06* (2006.01)
*G06F 13/42* (2006.01)
(Continued)

(52) U.S. Cl.
CPC ............ *H04L 63/083* (2013.01); *G06F 11/30* (2013.01); *G06F 13/4282* (2013.01)

(58) Field of Classification Search
CPC ........ H04L 63/083; G06F 11/30; G06F 21/85; G06F 13/4282
See application file for complete search history.

(56) References Cited

U.S. PATENT DOCUMENTS 9,792,402 B1 * 10/2017 Ovadia ............... G06F 17/5081
9,965,405 B2 * 5/2018 Kim .................... G06F 13/4081
(Continued)

FOREIGN PATENT DOCUMENTS

WO  WO 2014065879 A1 * 5/2014 ............. G06F 13/38

OTHER PUBLICATIONS

Koitzsch et al, "Implementing Virtual Metrology Into Semiconductor Production Processes—An Investment Assessment", 2011, Proceedings of the 2011 Winter Simulation Conference IEEE, p. 1-12.*
(Continued)

*Primary Examiner* — Christopher A Revak
(74) *Attorney, Agent, or Firm* — Schwabe, Williamson & Wyatt, P.C.

(57) ABSTRACT

In accordance with disclosed embodiments, there are provided systems, methods, and apparatuses for implementing virtual device observation and debug network for high speed serial IOS. According to one embodiment there is a functional semiconductor device, having therein a serial Input/Output interface (serial IO interface); a device fabric to carry transactions between a plurality of components of the functional semiconductor device; a transaction originator to originate a transactions and issue the transactions onto the device fabric directed toward the serial IO interface; in which the virtualized device logic is to receive the transactions at the serial IO interface via the device fabric and return responsive transactions to the device originator based on the transactions received; signature collection logic to collect signal information based on the transactions carried by the device fabric; and a signal accumulator to generate a test signature based on the signal information collected by the signature collection logic. Other related embodiments are disclosed.

25 Claims, 30 Drawing Sheets

(51) Int. Cl.
*G06F 11/30* (2006.01)
*G06F 21/85* (2013.01)

(56) References Cited

U.S. PATENT DOCUMENTS

| | | | |
|---|---|---|---|
| 2009/0055632 A1* | 2/2009 | Chen | G06F 11/3652 |
| | | | 712/227 |
| 2018/0004701 A1* | 1/2018 | Pappu | G06F 13/4234 |
| 2018/0004702 A1* | 1/2018 | Pappu | G06F 13/4234 |
| 2018/0096979 A1* | 4/2018 | Pappu | H01L 25/18 |
| 2018/0246796 A1* | 8/2018 | Pappu | G06F 13/4282 |

OTHER PUBLICATIONS

Cooke et al, "Finite State Machine Overlay Architectures for Fast FPGA Compilation and Application Portability", Apr. 2015, ACM Transactions on Embedded Computing Systems, vol. 14, No. 3, Article 54, p. 1-25.*

* cited by examiner

600

SYSTEMS, METHODS, AND APPARATUSES FOR IMPLEMENTING A VIRTUAL DEVICE OBSERVATION AND DEBUG NETWORK FOR HIGH SPEED SERIAL IOS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of semiconductor and electronics manufacturing, and more particularly, to systems, methods, and apparatuses for implementing high speed serial controller testing; further to systems, methods, and apparatuses for implementing SoC coverage through virtual devices in PCIe and DMI controllers; and further to systems, methods, and apparatuses for implementing virtual device observation and debug network for high speed serial IOS.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Today's consumer electronics market frequently demands complex functions requiring very intricate circuitry. Scaling to smaller and smaller fundamental building blocks, (e.g. transistors), has enabled the incorporation of even more intricate circuitry on a single semiconductor device with each progressive generation. Modern semiconductor devices, often referred to as semiconductor packages, now incorporate controllers and entire System on a Chip or (SoC) design methodologies in which there are processing components, memories, Input/Output elements, serial interfaces, and many other functional elements.

For any product lifecycle there needs to be testing conducted to verify the functionality and performance of such devices. It is further necessary to perform testing of the PCIe interfaces and handling of PCIe messaging on the processing component.

Testing however presents serious challenges with respect to high volume manufacturing. Consider for instance that somewhere on the order of 300 million units of a given product will require testing over a product lifecycle which in turn requires thousands of unit testers, arranged into hundreds of test beds.

Two problems immediately present themselves in such a scenario. First, the capital outlay to acquire thousands of high-end graphics cards can be cost prohibitive. Secondly, the physical size and bulk of the PCIe devices, such as the exemplary graphics cards, are relatively large compared to the very compact semiconductor device test beds, thus necessitating a very large physical space to perform such testing, which may not be economically feasible.

Other less intuitive issues also arise with the testing of such semiconductor devices. First is the problem of detecting malicious attacks from hackers. Certain semiconductor devices incorporate protections against malicious attack such as hacking attempts. Counter-intuitively, use of commercially available PCIe devices such as graphics cards will operate according to accepted standards and therefore are not useful for testing the semiconductor device's internal protections against attack.

Another problem is with respect to the volume of messaging. Similar to the issue with hacking attempts and handling of malicious messages, commercially available PCIe devices simply are not capable of overwhelming the semiconductor device with valid, but excessive messages. By design, such semiconductor devices incorporate many protections against flooding and the normal peaks and valleys inherent in device communications. Nonetheless, it may be desirable to test such aspects of the manufactured semiconductor devices to ensure that these flooding and excessive volume message handing protections are operating correctly.

Yet another non-intuitive problem relates to the lack of availability of PCIe and DMI devices which are capable of satisfactorily exercising newly released semiconductor device for the purposes of testing. Because the semiconductor devices themselves are newly released, it has been observed repeatedly that a significant delay may exist before commercially available PCIe and DMI devices are available to the market place as the manufacturers of such PCIe and DMI devices prefer to await the release of the newest version of the semiconductor devices to the market place before supporting such devices. Consider for instance, for the sake of example, a Gen-4 CPU, a latest generation semiconductor device 199 developed and ready for release to the market. Such a device requires testing, however, new generation Gen-4 PCIe devices, such as new Gen-4 graphics cards, will not be available to the marketplace until some time after the release of the latest generation semiconductor device because the new Gen-4 PCIe devices must ensure compliance to the latest protocol, consequently resulting in a type of a chicken and the egg problem.

The present state of the art may therefore benefit from the innovative high speed serial controller testing, may benefit from the implementation of SoC coverage through virtual devices in PCIe and DMI controllers; and may further benefit from the implementation of virtual device observation and debug network for high speed serial IOS as is described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1A:
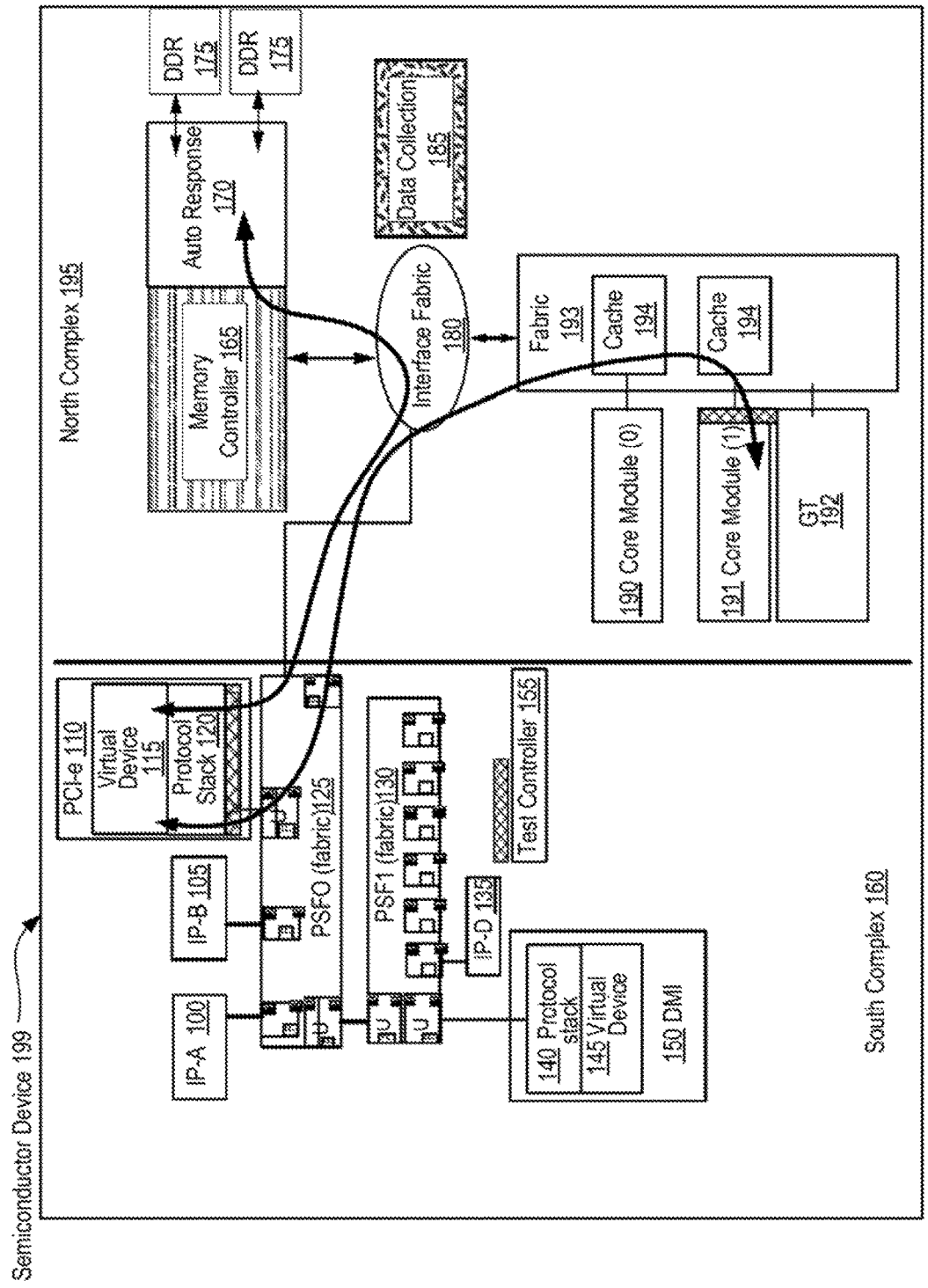
FIG. 1A depicts a semiconductor device in accordance with described embodiments.

Described herein are systems, methods, and apparatuses for implementing high speed serial controller testing; systems, methods, and apparatuses for implementing SoC coverage through virtual devices in PCIe and DMI controllers; systems, methods, and apparatuses for implementing virtual device observation and debug network for high speed serial IOS in accordance with described embodiments.

For instance, in accordance with one embodiment, there is a functional semiconductor device, comprising: a serial Input/Output interface (serial IO interface); a device fabric to carry transactions between a plurality of components of the functional semiconductor device; virtualized device logic embedded within the serial IO interface; a transaction originator to originate a transaction and issue the transaction onto the device fabric directed toward the serial IO interface; in which the virtualized device logic is to receive the transaction at the serial IO interface via the device fabric; in which the virtualized device logic is to modify the transaction received to form a modified transaction; in which the virtualized device logic is to issue the modified transaction onto the device fabric; and in which the modified transaction is returned to the transaction originator.

For instance, in accordance with another embodiment, there is a functional semiconductor device, having therein a serial Input/Output interface (serial IO interface); a device fabric to carry transactions between a plurality of components of the functional semiconductor device; virtualized device logic embedded within the serial IO interface; a transaction originator to originate a shuttle transaction and to issue the shuttle transaction onto the device fabric directed toward the serial IO interface; in which the shuttle transaction includes a shuttle header and a shuttle payload having embedded therein one or more passenger transactions for issuance onto the device fabric; in which the virtualized device logic is to receive the shuttle transaction at the serial IO interface via the device fabric; in which the virtualized device logic is to strip the shuttle header from the shuttle transaction to expose the one or more passenger transactions; and in which the virtualized device logic is to issue the one or more passenger transactions onto the device fabric.

For instance, in accordance with yet another embodiment, there is a functional semiconductor device, having therein a serial Input/Output interface (serial IO interface); a device fabric to carry transactions between a plurality of components of the functional semiconductor device; a transaction originator to originate a transactions and issue the transactions onto the device fabric directed toward the serial IO interface; in which the virtualized device logic is to receive the transactions at the serial IO interface via the device fabric and return responsive transactions to the device originator based on the transactions received; signature collection logic to collect signal information based on the transactions carried by the device fabric; and a signal accumulator to generate a test signature based on the signal information collected by the signature collection logic.

Certain embodiments are directed toward the systems, methods, and apparatuses for implementing high speed serial controller testing which are described in additional detail below. Such means provide expanded coverage of a logic die under test by originating messages at a test controller or CPU core module and sending the messages to a virtual device for handling in place of an externally connected serial device such as DMI controller or a PCIe controller. The messages may additionally be routed to a memory controller and then back to the originating test controller or CPU core module. Certain changes to the messages are necessary to permit the messages to traverse the upstream and downstream layers in compliance with upstream and downstream protocol stacks. Depending on whether messages are originated at the CPU or a test controller (TAM), varying degrees of test coverage is attainable. According to certain embodiments, both a PCIe device, such as a graphics card, and a memory, are emulated by virtual devices and the memory controller to avoid having these components required by a test bed for the silicon dies undergoing testing. In alternative embodiments, different serial devices are emulated such as a DMI controller, a Universal Flash Storage (UFS) controller, SATA controller, or multiple such controllers may be emulated.

Other embodiments are directed toward systems, methods, and apparatuses for implementing SoC coverage through virtual devices in PCIe and DMI controllers which are described in additional detail below. With the above mentioned testing architecture it is further possible to initiate flooding the virtualized PCIe device from the CPU core or the test controller by providing a legal (e.g., protocol legitimate) header to send a message and embedding within the payload section additional transactions which are not protocol compliant. Such a header is then stripped away in the upstream and the embedded transactions which are legal or protocol legitimate in the upstream are then issued by the virtualized PCIe controller or other virtual device. Due to various arbiters and prioritization schemes within a silicon die under test it may not be possible for a CPU core module or test controller to issue messages fast enough to flood the PCIe interface yet there remains a test such flood conditions to validate the device under test. Spawning the messages by embedding them within the payload enables the CPU or test controller to initiate such flooding for testing purposes. Additionally described are means by which known malicious or pseudo-hacking messages are issued for test purposes so as to test the embedded hacking logic and associated protections against potentially malicious attack. Additionally described are means by which to halt or stop buffers within the architecture of the semiconductor device under test which thus permits the buffers and queues to fill for the purposes of test. Releasing such buffers and queues then results in a burst flow condition with many packets released into the architecture very quickly this enabling still greater and more comprehensive testing of the device under test. Buffer and queue halting may be selectively enabled on either the Receiver (RX) side or the Transmitter (TX) side, or both.

Still further disclosed embodiments are related to systems, methods, and apparatuses for implementing virtual device observation and debug network for high speed serial IOS which are described in additional detail below. Embodiments include means for collecting test signature data including signature collectors, accumulators, signature storage, and means by which to compare collected signature data against known good signatures or expected signatures so as to verify pass or fail yield on a per-unit under test basis.

The described embodiments may be utilized in isolation or may be combined. Moreover, many of the described embodiments leverage iATM technologies in support of providing expanded test coverage.

Intel Address Translation Mode (iATM or Intel ATM) provides test coverage and debug capabilities in HVM (High Volume manufacturing) for all PCIe layers. With on die presence and high-speed capabilities it is possible to translate and loopback down stream transactions into valid upstream transactions. The iATM capabilities further permits PPV translation and loopback to system transactions with the aid of on platform loopback cards.

In accordance with described embodiments, a PCIe transaction layer generates out bound TLP (Transaction Layer Packets) traffic and accepts inbound TLP traffic. Digital near end loop (DNELB) functionality near the beginning of the physical layer fabric with DFX infrastructure provides loopback capabilities of the downstream traffic into the upstream without the need for any externally connected devices such as externally connected PCIe devices, externally connected DMI devices, and externally connected DDR memories.

In operation, agents including CPU core modules, a TAM (Test controller), and externally connected test beds connected into a device under test via a testing interface are able to initiate and send downstream transactions to a PCIe interface. The downstream transactions are morphed by a virtual device of the PCIe interface and are then looped back using the iATM features described in greater detail below. In other embodiments, accumulators in the PCIe collect the test coverage data. Various loopbacks are performed including loopbacks at the PCIe interface, loopbacks at the DMI interface, loopbacks at the MG-PHY, loopbacks at the memory controller or an auto-response mechanism which handles memory transactions and loops back on behalf of the memory controller, and loopbacks on the TIU, each providing varying test coverage and paths for transaction flows through a device under test after iATM morphing.

According to a particular embodiment, the virtual device 115 utilizes Address Translation Mode (ATM) or Intel ATM (e.g., iATM) to morph or modify the incoming upstream traffic into pre-determined protocol compliant downstream traffic.

The iATM functionality provides the necessary flexibility for test writers to modify any of several fields which are part of the control register. Modifiable fields include, for instance: a) Traffic class; b) Relaxed Ordering; c) No Snoop attribute; d) Masking of any address bits; and e) Fmt and Type.

Field a) Traffic class is defined as 000b: Traffic class 0 (default) . . . 111b (Traffic class 7) in which the TC0 is the default class and the TC1-7 provide differential services. The 3 bits of the traffic class are used to encode the traffic class to be applied to the TLP (Transaction Layer Packet) and to the completion associated with it (if any). During initialization, a PCI express device driver communicates the level of QoS (Quality of Service) that it desires for its transactions and the operating system returns the traffic class values that correspond to the QoS requested. The traffic class value ultimately determines the relative priority of a given transaction as it traverses the PCI Express fabric.

Field b) Relaxed Ordering: PCI-Express (PCIe) supports the relaxed ordering mechanism originally defined for PCI-X. Relaxed ordering allows certain transactions to violate the strict-ordering rules of PCI; that is, a transaction may be completed prior to other transactions that were already enqueued. In PCIe, if the Transaction Layer Protocol (TLP) header has the Relaxed Ordering attribute set to 1, the transaction may use relaxed ordering. In particular, a memory write transaction with the Relaxed Ordering attribute set to 1 is allowed to complete before prior write transactions enqueued in the hostbridge ahead of it.

Field c) No Snoop attribute does not alter the transaction ordering. Rather, when set to "1" hardware enforced cache coherency is not expected and when set to "0" hardware enforced cache coherency is expected.

Field d) Masking of any address bits in the header field permits a user specified mask value in a control register to be Xored with the TLPs corresponding address bits.

Field e) Fmt and Type: Fmt field(s) indicate the presence of one or more TLP Prefixes and the Type field(s) indicates the associated TLP Prefix type(s). The Fmt and Type fields of the TLP Header provide the information required to determine the size of the remaining part of the TLP Header and whether or not the packet contains a data payload following the header. The Fmt, Type, TD, and Length fields of the TLP Header contain all information necessary to determine the overall size of the non-prefix portion of the TLP.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts a semiconductor device 199 in accordance with described embodiments. For instance, such a device may be a System on a Chip or SoC semiconductor device, a device controller, a semiconductor package having processing circuitry therein, etc.

For every serial controller on the semiconductor device 199, such as PCIe, DMI, OMI, SATA, etc., there are two protocol stacks providing protocol logic for the upstream and downstream directions. Each of the respective serial controllers implements its own protocol stack. For instance, there is depicted protocol stack 120 for the PCIe interface providing both upstream and downstream logic and separately there is depicted the protocol stack 140 of the DMI interface 150 again providing both upstream and downstream logic.

Upstream traffic takes external device traffic IO the CPU core modules and downstream traffic carries CPU messages back to the external device. For instance, with a connected graphics card at the PCIe interface 110, upstream traffic carries messages from the graphics card to the CPU and the downstream traffic carries return messages from the CPU back to the graphics card.

The upstream and downstream protocol layers are non-symmetric in nature and are conventionally limited to communicating only legal or protocol legitimate messages with a genuine external device connected with the respective serial interface, such as PCIe interface 110.

By implementing the depicted virtual devices 115 and 145 for the respective serial controllers within the silicon of the semiconductor device 199 the functionality of the conventionally externally connected devices are emulated on board the semiconductor device 199 without having to rely upon an external device actually being coupled to the PCIe 110 or DMI 150 interface.

An exemplary implementation is shown here with the depicted test controller 155 securely communicates with the virtual device 115 of the PCIe's protocol stack 120. The CPU core module 190 sends downstream transactions to the PCIe 110 device which then decodes the transaction and responds back in the upstream. The virtual device 115 of the PCIe 110 interface additionally modifies the original existing transaction such that it may be sent over to the DDR 175 memory via memory controller 165 so as to provide greater and more comprehensive test coverage. The depicted auto response 170 mechanism then responds with data as if the modified transaction sent to the DDR 175 memory actually performed a memory read. However, there is no such DDR 175 memory connected with the semiconductor device under test. Rather, the auto response 170 mechanism simply returns synthesized test data for the sake of executing the testing profile. Consequently, the returned data provided by the auto response 170 mechanism on behalf of the DDR 175 memory is returned back to the virtual device 115 which then proceeds to route the response back to the originating CPU module or the test controller, depending on which of the components originated the transaction downstream transaction initially.

Posted transactions typically report to their corresponding write transaction. Memory read transactions however result in non-posted transactions which require data to be returned for the transaction to be successful. According to such embodiments, the auto response 170 mechanism accepts the incoming memory read transaction, processes the memory read transaction, and then proceeds to send back a responsive message with data on behalf of the DDR memory which is not present for the purposes of test and validation, thus emulating the memory read response with simulated data.

The memory controller implements an I/O controller on the semiconductor device which includes functionality to interact with the external DDR memory modules once the semiconductor is provisioned into a system. In the case of test, however, those functions are virtualized such that it is not necessary to include the physical DDR memory with the auto response mechanism providing the necessary responses to the various memory transactions which interact with the memory controller.

As will be described in greater detail below, signature data is additionally collected so as to enable determination of passing units from failing ones for the purpose of semiconductor device 199 platform validation testing.

In accordance with such an embodiment, there is depicted both a south complex 160 and a north complex 195. Within south complex 160 there is provided a PCIe 110 device interface having therein both a virtual device 115 and a protocol stack 120. PSF-0 (fabric) 125 is communicably interfaced with the PCIe 110 and is additionally interfaced to each of IP-A 100 and IP-B 105. PSF-1 (fabric) 130 is further depicted, being in communication with IP-D 135 and also DMI 150 interface. The DMI 150 includes protocol stack 140 and virtual device 145.

The virtual devices 115 and 145 are designed to capture as many operations as possible so as to negate the need to connect an externally provided PCIe or DMI device such as a graphics card or other external board.

IP-A 100 and IP-B 105 elements may operate as imaging units (e.g., a camera) or display interfaces capable of sending and receiving signals and exchanging information with an externally provide PCIe graphics card over fabric PSF0 125.

Further depicted here is a test controller 155 which may operate as an internal component to the semiconductor device 199 which is capable of generating and initiating test instructions or may operate as an interface to an external device which is capable of generating and initiating instructions external to the semiconductor device but for issuance into the semiconductor device 199 via the test controller 155 depicted.

With reference to the north complex 195, there is depicted memory controller 165 (or a memory controller logic integrated circuit) and auto response 170 mechanism, each communicably interfaced with virtualized or actual memory banks depicted here as DDR 175. Interface fabric 180 is further depicted, being communicably interfaced with the 193 fabric which in turn includes cache 194 and is interfaced with core module 0 190 and core module 1 191 and GT 192. Data collection 185 unit is still further depicted.

After manufacture of the semiconductor device 199 there is provided a bare or a naked functional silicon die which is ready for testing and validation before the manufactured semiconductor device 199 is deemed ready for packaging and shipment to resellers.

PCIe 110 interface is capable of accepting a PCIe device and receiving from such a PCIe device upstream traffic (from the PCIe device through the PCIe 110 interface and into the semiconductor device 199) through the PCIe protocol stack 120.

However, testing is described for the semiconductor device without use of a physical PCIe device being externally connected with the PCIe 110 interface of the semiconductor device 199 and without the use of a physical DMI device being externally connected with the DMI 150 interface of the semiconductor device 199.

The PCIe 110 interface (Peripheral Component Interconnect Express) provides a high-speed serial computer expansion bus standard capable of providing reverse compatibility with older PCI, PCI-X, and AGP bus standards, but provides numerous improvements over the older standards, including higher maximum system bus throughput, lower I/O pin count, smaller physical footprint, better performance scaling for bus devices, a more detailed error detection and reporting mechanism with Advanced Error Reporting (AER), native hot-plug functionality, and support for I/O virtualization.

The DMI 150 interface (Direct Media Interface) developed by Intel Corporation provides a link between the northbridge and southbridge on a computer motherboard or the north complex 195 and the south complex 160 of the depicted semiconductor device 199. The DMI 150 interface shares many characteristics with PCIe such as providing multiple lanes and differential signaling to form a point-to-point link.

The PCIe 110 and DMI 150 interfaces are used interchangeably herein, though they are distinct interfaces and each use distinct PCIe and DMI protocol stacks 120 and 140 respectively. Accordingly, as is depicted in accordance with described embodiments, each implements its own respective virtual device, such as virtual device 115 of PCIe 110 interface to emulate PCIe functions of an externally connected PCIe device and virtual device 145 of DMI 150 interface to emulate DMI functions of an externally connected DMI device.

Traffic from a PCIe device will travel upstream from the PCIe device through the PCIe 110 interface and through the PCIe 120 protocol stack into the semiconductor device. Such traffic is referred to as the upstream traffic. However, the upstream traffic is not symmetric to the traffic that goes in the downstream. Downstream traffic is the traffic coming from within the semiconductor device 199 and returning through the protocol stack 120 of the PCIe 110 interface and ultimately to an external PCIe device.

Because the upstream and the downstream traffic is not symmetrical, each of the upstream and downstream layers are handled differently via either distinct protocol requirements. It is therefore not feasible to simply loop back traffic coming from the upstream back onto the downstream for the purposes of testing.

It is therefore in accordance with described embodiments that a test controller 155 is incorporated into the semiconductor device which is capable of molding downstream traffic coming from the PCIe 110 interface such that is then possible to place traffic into the upstream. It is necessary to mold, modify, alter, or otherwise change the downstream traffic because it must first be made compliant in accordance with the permissible upstream protocol before placing such traffic into the upstream.

According to certain embodiments, transactions originating from the CPU core modules are returned to the CPU core modules and transactions originating from the test controller are returned to the test controller. However, certain embodiments may additionally modify the requester ID of incoming downstream transactions arriving at the virtual device and consequently, when the responsive transactions looped back onto the upstream are routed to their destination they are returned, for example, to the test controller despite being issued by one of the CPU core modules or vise versa. In other embodiments, the requester ID is modified such that the transaction is routed to the DDR memory through the memory controller such that auto response mechanism 170 may simulate a memory transaction and respond with simulated data despite the absence of physical memory.

If the downstream traffic is not modified in a manner permissible for the upstream protocol then anything arriving from the downstream will be deflected as non-compliant. Stated differently, the semiconductor device 199 and its CPU (e.g., core modules 190 and 191) may be considered a host and the PCIe device communicates with the host via the PCIe 110 interface of the host. If the PCIe device sends upstream data to the host then a response is expected to be returned as downstream traffic, coming from the semiconductor device 199 as the host to the external PCIe device via PCIe 110 interface. Such traffic being returned in the downstream direction understandably has a distinct protocol from that of the incoming traffic in the upstream direction.

It is therefore in accordance with described embodiments that testing components are designed and integrated into the semiconductor device 199 so as to emulate the role of the external PCIe device. For instance, virtual device 115 is depicted within the PCIe 110 interface which operates as a virtualized external PCIe device, but operating entirely within the semiconductor device 199. Moreover, auto response mechanism 170 provides functionality to respond to memory interactions, such as returning data responsive to a memory read and providing acknowledgement of memory writes where the protocol requires such acknowledgements to occur.

In such a way, any messages, warnings, acknowledgements, interactions, and other communications which would normally occur between the semiconductor device 199 and an externally provided PCIe device are accommodated via circuitry embedded within the semiconductor device 199.

For example, according to one embodiment, the CPU core module 191 may generate downstream traffic which, as depicted, is routed through the interface fabric 180 to the PSF0 fabric 125 and into the PCIe virtual device 115 via protocol stack 120. The virtual device 115 receiving the downstream traffic originating at the CPU core module 191 includes responsive logic to handle the message or sequence arriving from the downstream and then responsively issue an appropriate reply in the upstream, as would be the normal behavior with an externally connected PCIe device.

According to another embodiment, streams of upstream data are processed at the virtual device 115 and translated into protocol compliant streams of downstream traffic for return to either the CPU core module 191 as depicted or alternatively directed through the interface fabric 180 and through the memory controller 165 at which point the auto response 170 module returns an appropriate response, such as an acknowledgement of a memory write or if a memory read is requested then simulated or pre-determined test data is returned by the auto response 170 module to the virtual device 115 along the same route.

According to certain embodiments, many transactions permissible in the upstream according to the upstream layer protocol enforced by protocol stack 120 are entirely eliminated in the downstream layer protocol and therefore it is necessary for a component internal to the semiconductor device 199 to generate such transactions.

However, because such downstream transactions are eliminated, they are consequently illegal or impermissible to the CPU core modules 190 and 191. Because such transactions are illegal for the CPU, the CPU logically cannot issue or handle such downstream transactions. Therefore, according to another embodiment, illegal transactions are encapsulated or masked as a payload to be carried within a legal transaction that is acceptable on the downstream to the CPU core modules 190 and 191 and then sent from the CPU core modules 190 and 191 in the upstream to the virtual device 115. When such masked transactions arrive at the virtual device 115, the mask or encapsulating transaction is stripped away and the transactions carried in the payload which are illegal on the downstream are revealed and available for use by the virtual device, notwithstanding having been carried through the downstream's protocol stack 120.

Consider for instance a vendor message transaction. If a graphics card is attached as a PCIe device to the PCIe 110 interface of the semiconductor device, it may legally and appropriately issue a vendor message transaction in the upstream (from the external device to the semiconductor device 199) identifying itself to the CPU core modules 190 and 191. Such a transaction is legal and permissible and provides valuable information to the CPU core modules 190 and 191 which may, for instance, institute an appropriate configuration or take some other action specifically responsive to that vendor message transaction. The opposite is not true however. The CPU core modules 190 and 191 will never issue a vendor transaction message in the downstream. The CPU core modules 190 and 191 are not vendors, they are not external PCIe devices, and there is no need for the CPU core modules 190 and 191 to issue such a transaction on the downstream. Such a transaction is therefore wholly eliminated from the downstream and consequently is not legal or permissible in the downstream according to the protocol stack 120.

The problem therefore, is how to test the issuance and handling of a vendor message transaction when there is no PCIe device externally connected with the semiconductor device. Such a message is therefore, according to one embodiment, embedded within a legal upstream transaction as masked or encapsulated payload data, sent upstream to the virtual device 115, and the virtual device 115 strips away the mask or encapsulating layer to reveal the valid downstream transaction which was made to arrive via the upstream, despite the fact that such a downstream transaction would be non-compliant on the upstream had it been communicated without the mask or encapsulation.

It is therefore in accordance with one embodiment that the downstream protocol stack 120 enforcement does not detect the illegal transaction carried as payload data and the virtual device 115 immediately modifies the downstream traffic into a legal upstream transaction (e.g., by removing the payload carrying the transaction from the mask or encapsulation) and immediately issues the legal upstream transaction as upstream traffic. In one such embodiment, the legal upstream transaction is returned to and handled by CPU core modules 190 and 191 as though it had originated external to the semiconductor device 199.

The result of communicating transactions and messages throughout the upstream and downstream directions among the PCIe 110 interface, its protocol stack 120, the memory controller 165, the interface fabric 180, the CPU core modules 190 and 191, the cache 194 and fabric 193, etc., is to ensure testing and access to all the various partitions and regions of the semiconductor device 199 and all the various combinations of the upstream fabrics, upstream logics, upstream message handling, and complementary downstream elements.

Figure 1B:
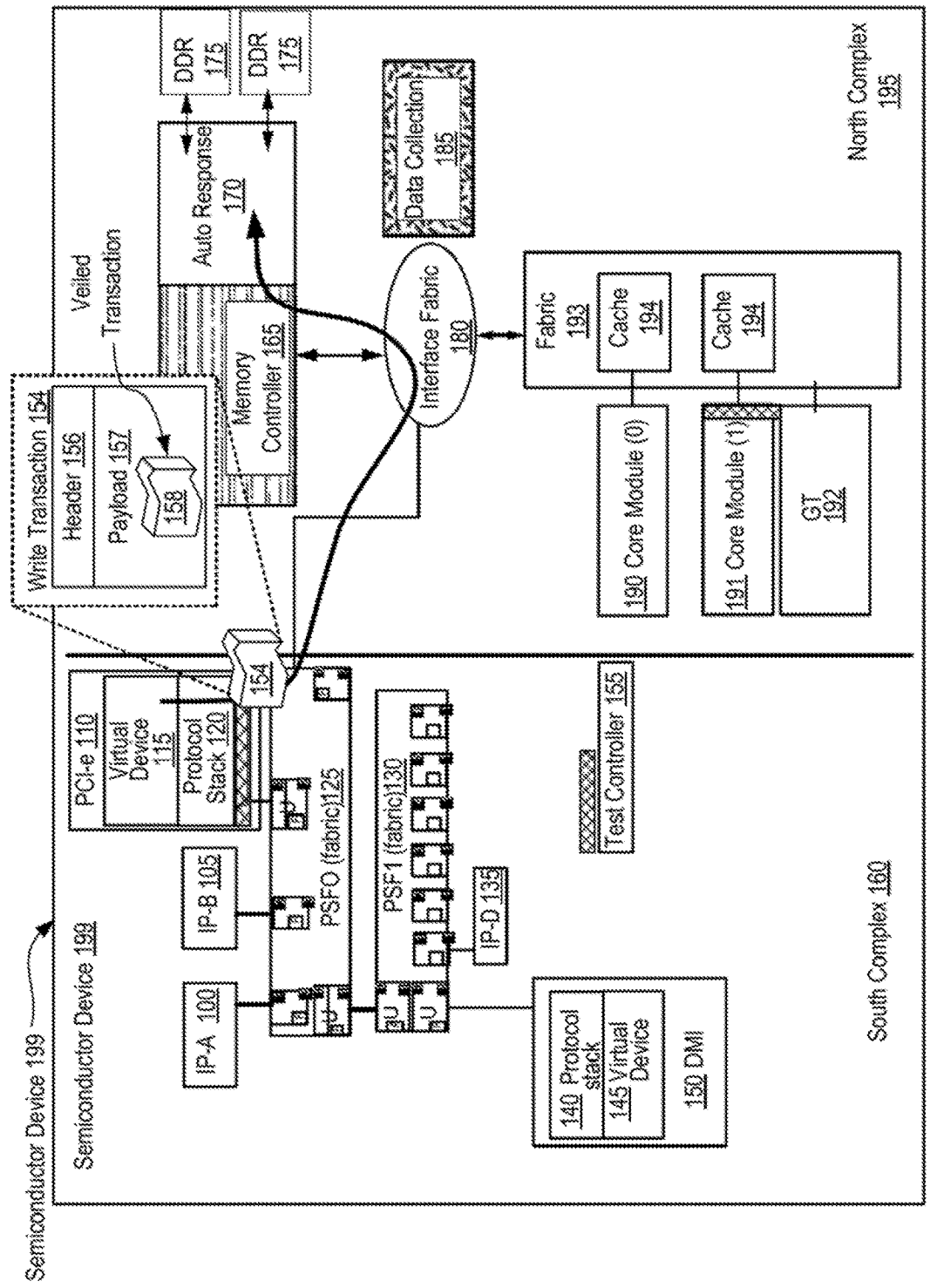
FIG. 1B depicts another example of a semiconductor device in accordance with described embodiments.

FIG. 1B depicts another example of a semiconductor device 199 in accordance with described embodiments.

As noted above, memory controller 165 may additionally be exercised for testing purposes by the issuance of transactions as discussed herein. For instance, it is normal and expected for a memory map I/O transaction to be issued in the downstream, such as a memory write transaction. Typically such a memory write transaction includes a header and data. The header may be utilized as a mask or veil or encapsulating layer and the data portion is the payload. The header and payload may also be referred to as the shuttle and a passenger.

Consider for example a memory write transaction for which it is normal to contain a header 156 and also data in the payload 157. PCIe 110 Virtual device 115 of PCIe 110 may issue the write transaction 154 which originates at the virtual device, traverses through the protocol stack 120 as a valid and legal write transaction 154, proceed through PSF0 fabric 125 on the south complex 160 over to the interface fabric 180 of the north complex 195 and ultimately up through memory controller 165 and reaching the auto response 170 mechanism.

For such a write transaction 154, all that is required is for the write transaction 154 to reach the memory controller 165 which handles the transaction as appropriate. However, the write transaction 154 is manipulated in such a way that the header 156 identifies the write transaction 154 as a legal write transaction such that it may pass through the protocol stack 120 safely, but the payload 157 is manipulated such that it actually carries within it the payload 157 portion of the write transaction 154 a veiled transaction 158, or alternatively referred to as an encapsulated transaction or an embedded transaction or a masked transaction.

In accordance with a particular embodiment, auto response 170 mechanism receives operates in conjunction with the memory controller 165 to automatically handle appropriate responses to incoming memory transactions, such as write transaction 154. For instance, auto response 170 may simply accept the incoming write transaction 154 or may accept and responsively issue an acknowledgement to the write transaction if such an acknowledgement is expected by the originator of the write transaction 154.

Figure 1C:
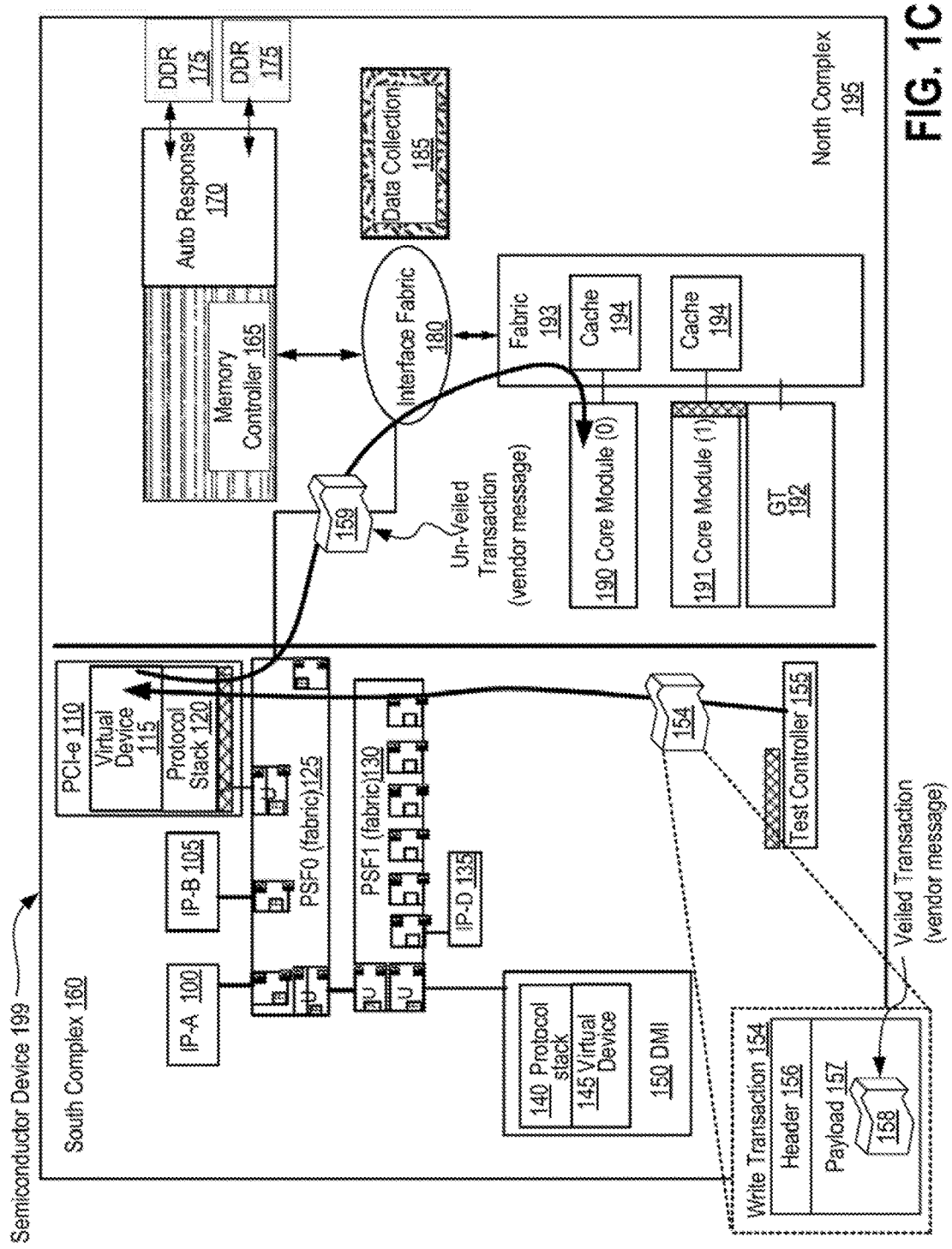
FIG. 1C depicts another example of a semiconductor device in accordance with described embodiments.

FIG. 1C depicts another example of a semiconductor device 199 in accordance with described embodiments. According to the depicted embodiment, the test controller 155 initiates a write transaction 154 which is legal in the downstream. Specifically, the write transaction 154 is communicated to the virtual device 115 of the PCIe 110. Embedded within the payload 157 of the write transaction 154, however, is a veiled transaction 158 which is illegal in the downstream direction and thus, the vendor message cannot by itself be issued from the test controller 155 as it would not successfully pass through the protocol stack 120 of the PCIe 110 interface.

Test coverage necessitates that the PCIe 110 device be tested and therefore, rather than utilizing an externally connected PCIe device which would ordinarily interface with the PCIe 110 interface of the semiconductor device 199, the test controller is utilized instead to initiate a legal write transaction 154 in the downstream, here the veiled transaction within the payload 158 which carries the vendor message in the downstream to the virtual device 115 without being detected or blocked as an illegal transaction.

According to such an embodiment, the virtual device 115 strips away the header 156 of the write transaction to reveal the veiled transaction 158 within the payload 157 and then issues the unveiled vendor message transaction in the upstream which is a permissible and legal transaction according to the protocol stack 120.

As depicted here, un-veiled transaction 159 is the same vendor message originally encapsulated within the write transaction 154. Because the un-veiled transaction 159 is issued from the virtual device 115 of the PCIe 110 interface into the semiconductor device 199 it is considered an upstream message transaction. Such a vendor message is a permissible transaction in the upstream pursuant to the protocol stack 120 and thus, it proceeds interrupted from the virtual device 115 of the PCIe 110 interface through the protocol stack 120 down through the PSF0 fabric 125 and across to the interface fabric 180 of the north complex 195 and then onwards to CPU core module 190 through the fabric 193 as depicted.

In such a way, it is possible to ensure broad test coverage throughout the semiconductor device, including testing the routing of vendor messages which cannot be initiated by the CPU core modules 190 and 191 without necessitating the inclusion of an externally connected PCIe device at the PCIe 110 interface.

More particularly, routing the write transaction 154 and the unveiled transaction 159 having the vendor message therein additionally provides testing of the protocol stack 120 so as to ensure the correct functioning of both the upstream and the downstream protocol layers.

In accordance with one embodiment, the vendor message is emulated at the test controller 155 and embedded within a transaction which is legal on the downstream, such as a write transaction 154. Such a write transaction operates as a shuttle message carrying the emulated vendor message as its passenger within the payload section of the transaction. According to such an embodiment, the header or mask of the transaction is then stripped away by another element within the semiconductor device 199, such as virtual device 115 of the PCIe 110 interface as described above, or alternatively by virtual device 145 of the DMI 150 or by auto response 170 mechanism, and the emulated vendor message is then issued as a transaction on the upstream.

According to on embodiment, a graphics card is fully functionally emulated by virtual device 115 and capable of providing all messaging provided by a compliant graphics card. The virtual device 115 additionally provides enhanced testing capabilities such as the ability to modify traffic for the purposes of testing. According to certain embodiments, modifying traffic includes removing the mask or header from transactions to reveal embedded or masked transactions.

According to one embodiment, an externally provided PCIe device communicates with the semiconductor device 199 through PSF0 (fabric) 125 through the PCIe 110 interface. According to such embodiment, logic at virtual device 115 within the PCIe 110 interface emulates the externally provided PCIe device by sending signals, commands, messages, and other communications to the PSF0 fabric 125 through protocol stack 120 as if the virtual device 115 were a physical externally provided PCIe device.

Figure 1D:
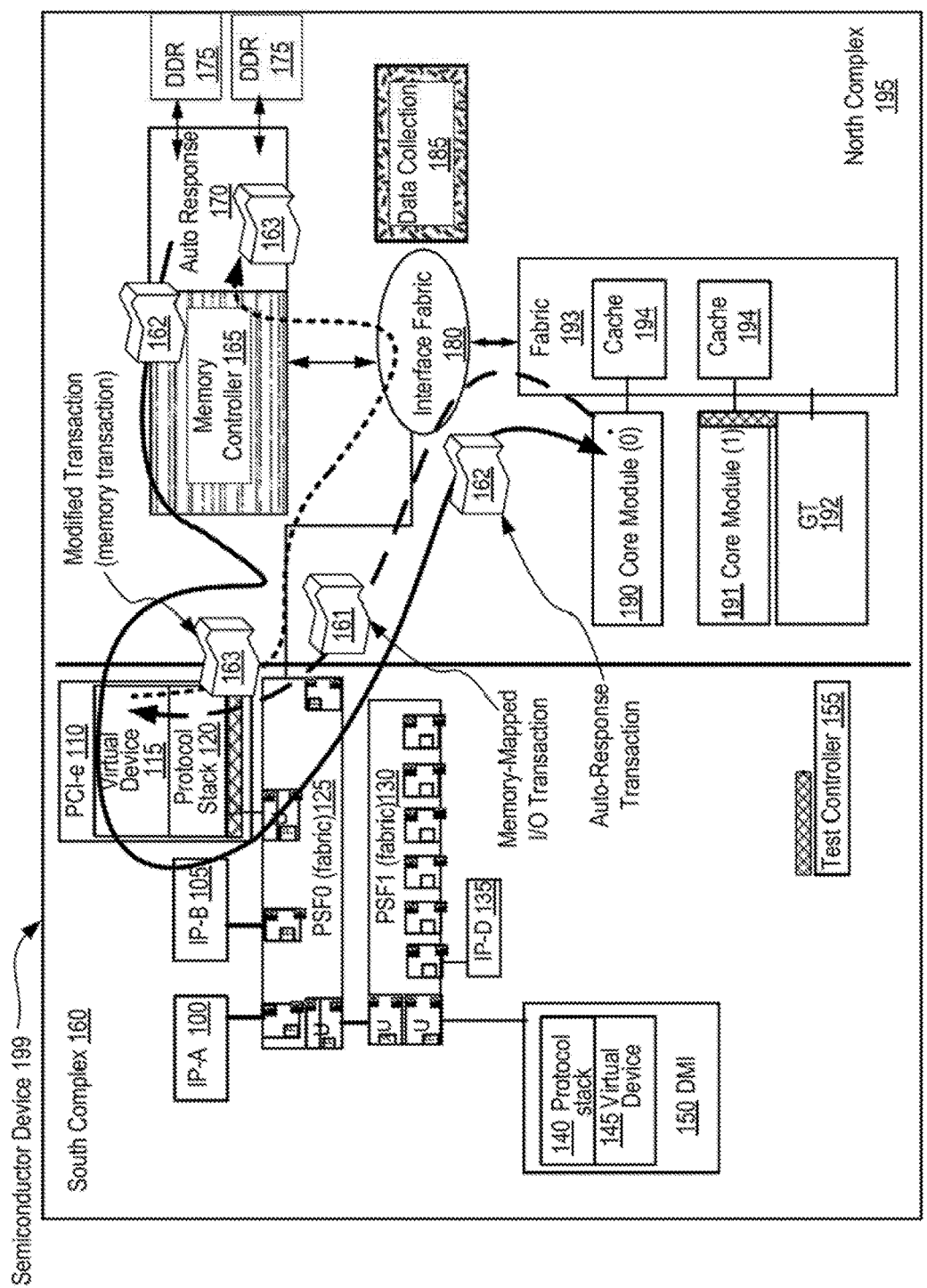
FIG. 1D depicts another example of a semiconductor device in accordance with described embodiments.

FIG. 1D depicts another example of a semiconductor device 199 in accordance with described embodiments. According to the depicted embodiment, the test controller 155 expands coverage still farther by pushing traffic out to the memory controller 165 and to the DDR 175 memory interfaces.

Although it is desirable to expand test coverage on the semiconductor device 199 as much as possible by exercising as many different paths as possible through the semiconductor device, it is accordance with particular embodiments that both memory read and memory write transactions are sent to the memory controller 165 and handled appropriately by the auto response 170 mechanism without the presence of any externally connected memory modules with the DDR memory 175 interfaces.

Similar to the issue with the externally connectable PCIe graphics card, the use of externally provided and physically connected memory modules not only introduces cost but also introduces increase physical bulk and size to the otherwise compact testing beds for the semiconductor device 199.

Therefore, according to one embodiment, test controller 155 provides expanded test coverage by extending the functional path to be as long as possible, including traveling to the DDR 175 memory interfaces but without necessitating externally connected devices to the semiconductor device 199.

The longer the path traveled for any transaction through the semiconductor device 199 the better the test coverage. According to described embodiments, a signature is collected for transactions having traversed a path through the various components of the semiconductor device and that signature is then evaluated to determine whether or not the semiconductor device is functioning properly. If the transaction properties all along the path traveled are correct and behaving as expected then a known good signature will result and the device pass that aspect of testing. If a satisfactory signature is not provided for any particular transaction, then the semiconductor device will be flagged as being faulty.

According to one embodiment, one of the CPU core modules, such as CPU core module 190, initiates a memory transaction which traverses the path through fabric 193 and interface fabric 180 up to the virtual device 115 of the PCIe 110 interface through protocol stack 120. According to such an embodiment, the issue transaction is a memory-mapped I/O (MMIO) transaction 161. The memory mapped I/O transaction 161 is then routed on to the memory controller 165 where it is then directed to the DDR memory 175.

In normal system operation, once the semiconductor device 199 has been integrated into a consumer product, the MMIO transaction would then continue on to the DDR memory through DDR 175 interface, however, because it is desirable to eliminate such external components, including memory, the auto response 170 mechanism provides a response to the MMIO transaction. For instance, in the case of a write transaction, the auto response 170 mechanism will provide an acknowledgment of the write transaction if such an acknowledgment is expected by the initiator and in the case of a memory read transaction, the auto response 170 mechanism provides a response to the memory read which includes data provided as a payload for the purposes of testing.

Memory-mapped I/O or MMIO transactions use the same address bus to address both memory and I/O devices in which the memory and registers of the I/O devices are mapped to address values. When an address is accessed by the CPU, it may refer to a portion of physical RAM, but it may also refer to memory of the I/O device. Thus, the CPU instructions used to access the memory can also be used for accessing devices. Each I/O device monitors the CPU's address bus and responds to any CPU access of an address assigned to that device, connecting the data bus to the desired device's hardware register. To accommodate the I/O devices, areas of the addresses used by the CPU are be reserved for I/O and are therefore unavailable for normal physical memory.

According to a particular embodiment, the auto response 170 mechanism provides a loop back function to automatically respond to the transaction with a responsive message sent back to whichever virtual device or CPU core module originated the transaction. For instance, the auto response 170 mechanism may respond back to the virtual device 145 of the DMI 150 or may respond back to the virtual device 115 of the PCIe 110 or may respond back to the CPU core module 190 or 191, based on which of such elements is the originator of the transaction reaching the memory controller 165 which is then automatically handled by the auto response 170 mechanism in place of externally connected physical memory.

In the case of the CPU core modules 190 and 191, it is important that they receive a response to memory transactions else they may initiate a fault condition. The auto response 170 mechanism provides the auto-response transaction 162 which is depicted here back to CPU core module 190 and additionally permits for an expanded path through the various logic and functional components of the semiconductor device 199 with the aim of improving overall test coverage.

According to certain embodiments, the auto response 170 mechanism emulates or simulates the function of externally connected memory in a similar manner as the virtual device 115 of PCIe 110 emulates or simulates the functions of an externally connected PCIe device, such as a graphics card. In such a way, the semiconductor device 199 may be tested on a compact and lower cost test bed without requiring the connection of an external PCIe device or an external memory or an external DMI device.

By emulating the memory components, the external PCIe devices, and the external DMI devices, it is possible to provide the required response to transactions and events initiated by the CPU core modules 190 and 191 as well as the test controller 155 just as if those external devices were actually connected with the semiconductor device.

According to a particular embodiment, the CPU core module 190 sends transaction 161 to the memory-mapped I/O external device and the transaction 161 travels through the downstream traffic. As noted above, traffic going from the CPU core modules 190 and 191 to the external devices through PCIe 110 interface is referred to as downstream traffic. As depicted, the virtual device 115 handles the transaction 161 as there is no external device actually connected. The virtual device 115 modifies the transaction 161 resulting in modified transaction 163 which is then looped back into the upstream traffic flow as if the modified transaction 163 were originating from an externally connected PCIe device arriving through PCIe 110 interface. The modified transaction 163 then proceeds to the memory controller 165 and because the original MMIO transaction 161 is modified by the virtual device to a memory transaction (e.g., modified transaction 163), the memory controller 165 receives the memory transaction and the auto-response 170 mechanism responds as appropriate by issuing auto-response transaction 162, for instance, a memory write instruction acknowledgement or data provided in response to a memory read request.

The auto-response transaction 162 initially travels to the virtual device 115 where it is then looped back yet again in to the upstream where the auto-response transaction 162 is shown returning to the CPU core module 190 which originated the MMIO transaction 161 initially.

According to one embodiment, virtual device 115 receives an incoming transaction originated by the CPU core module 190 and then evaluates the transaction on the basis of a series of registers to determine whether or not the CPU core module 190 having originated the transaction is expecting a response. In the event the CPU core module 190 does not expect a response, then the virtual device 115 kills the transaction. Otherwise, the virtual device 115 proceeds to issue the appropriate response or action, such as sending a modified transaction 163 or an acknowledgement, etc., based on the expected behavior that would be observed with a physically connected external PCIe device.

For transactions that reach the DDR 175 interfaces, they have no indication that the transaction was originated by CPU core module 190 and thus, the responses need to be modified again and an auto-response transaction needs to be issued by the auto-response 170 mechanism as depicted, with the auto-response transaction 162 being returned to the originating CPU core module by way of the virtual device 115.

Figure 1E:
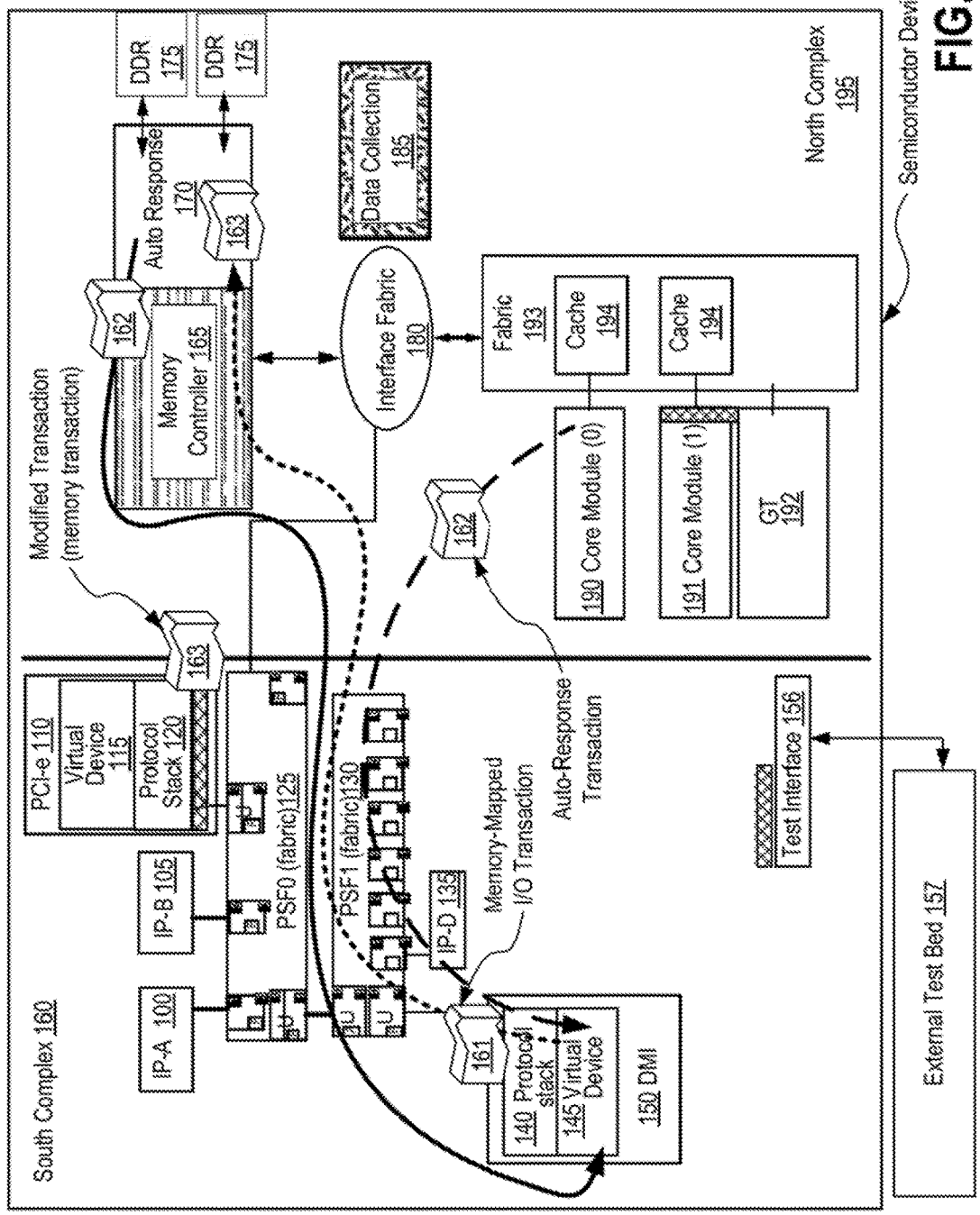
FIG. 1E depicts another example of a semiconductor device in accordance with described embodiments.

FIG. 1E depicts another example of a semiconductor device 199 in accordance with described embodiments. According to the depicted embodiment, the test controller 155 of the prior figures is replaced with a test interface 156 which is communicably interfaced to an external test bed 157. The test controller 155 of the prior figures operates as a self contained microcontroller or logic device, albeit less powerful than either of the CPU core modules 190 and 191 of the semiconductor device. Nevertheless, such a test controller 155 includes sufficient computing power to initiate test instructions, operate testing sequences, communicate with an external test bed 157, receive testing profiles for execution from an external test bed 157, and so forth.

However, certain semiconductor device 199 products will be configured with a less sophisticated test interface 156 as depicted here which lacks the internal functionality to initiate test instructions and therefore merely provides an interface for the external test bed 157 to initiate and issue such testing instructions into the semiconductor device.

Additionally depicted at FIG. 1E is the ability for the virtual device 145 of DMI 150 interface to modify MMIO transactions originated from the CPU core modules and loop them to the memory controller or back to the CPU core module originating such a transaction in a similar manner to that of the virtual device 115 of the PCIe 110 interface.

For instance, as depicted, here, CPU core module 190 initiates MMIO transaction 161 which proceeds through fabric 193 and interface fabric 180 of the north complex 195 then through PSF1 (fabric) 130 of the south complex 160 and ultimately into virtual device 145 of the DMI 150 interface. Virtual device 145 modifies the transaction 161 resulting in modified transaction 163 which is then looped back into the upstream traffic flow as if the modified transaction 163 were originating from an externally connected DMI device arriving through DMI 150 interface. The modified transaction 163 then proceeds to the memory controller 165 and because the original MMIO transaction 161 is modified by the virtual device 145 to a memory transaction (e.g., modified transaction 163), the memory controller 165 receives the memory transaction and the auto-response 170 mechanism responds as appropriate by issuing auto-response transaction 162, for instance, a memory write instruction acknowledgement or data provided in response to a memory read request. Auto-response transaction 162 returns to virtual device 145 of the DMI 150 interface where it is then looped back yet again in to the upstream where the auto-response transaction 162 is shown returning to the CPU core module 190 which originated the MMIO transaction 161 initially.

Figure 2A:
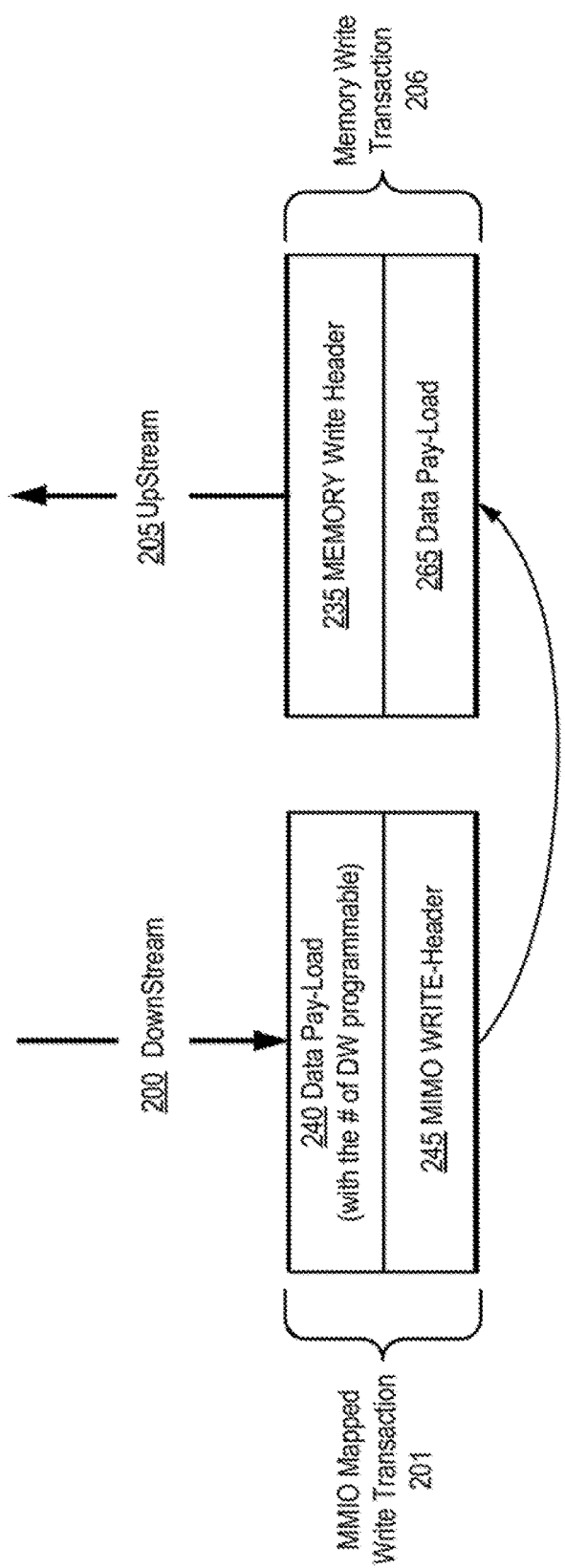
FIG. 2A depicts a transaction modification flow for a Memory Mapped IO (MMIO) write transaction to Memory write transaction in accordance with described embodiments.

FIG. 2A depicts a transaction modification flow for a Memory Mapped IO (MMIO) write transaction to Memory write transaction in accordance with described embodiments. In particular, there is depicted both a downstream 200 and an upstream 205 direction. In this mode either a CPU core module or a test controller issues an MMIO mapped write transaction 201 in the downstream 200 which is modified by the virtual device of either the PCIe interface or the DMI interface into a Memory write transaction 206 which is looped back onto the upstream 205.

The MMIO mapped write transaction 201 permits the CPU core module under normal operating conditions to write n-bytes to an external device, such as an externally connected PCIe device or an externally connected DMI device.

For the purposes of seeking comprehensive test coverage, such MMIO transactions are utilized notwithstanding the absence of the externally connected PCIe and/or DMI devices. However, rather than the memory being written to an external device, the transactions are handled by the virtual devices 115 and 145 and modified such that they may be passed along the various fabrics of the semiconductor device as described above, for instance, to the memory controller and the DDR interfaces, etc.

As depicted, the MMIO mapped write transaction 201 includes both a data payload 240 (with the number of Double Word (DW) being programmable) and also an MMIO write header 245. The conversion of the MMIO mapped write transaction 201 results in a memory write transaction 206 having both a data payload 265 and a memory write header 235.

According to such one embodiment, a CPU core module such as elements 190 and 191 of the semiconductor device 199 at FIG. 1A issues a write into the Memory IO space (Memory mapped IO). With Address Translation Mode (ATM) mode enabled a DFX module such as the virtual device 115 or 145 of the PCIe and DMI interfaces translates the address of the write command and translates additionally configured attributes as needed. The resulting memory write transaction 206 is then looped back onto the upstream with any one of a variety of payload options selected at the discretion of the test creator.

Figure 2B:
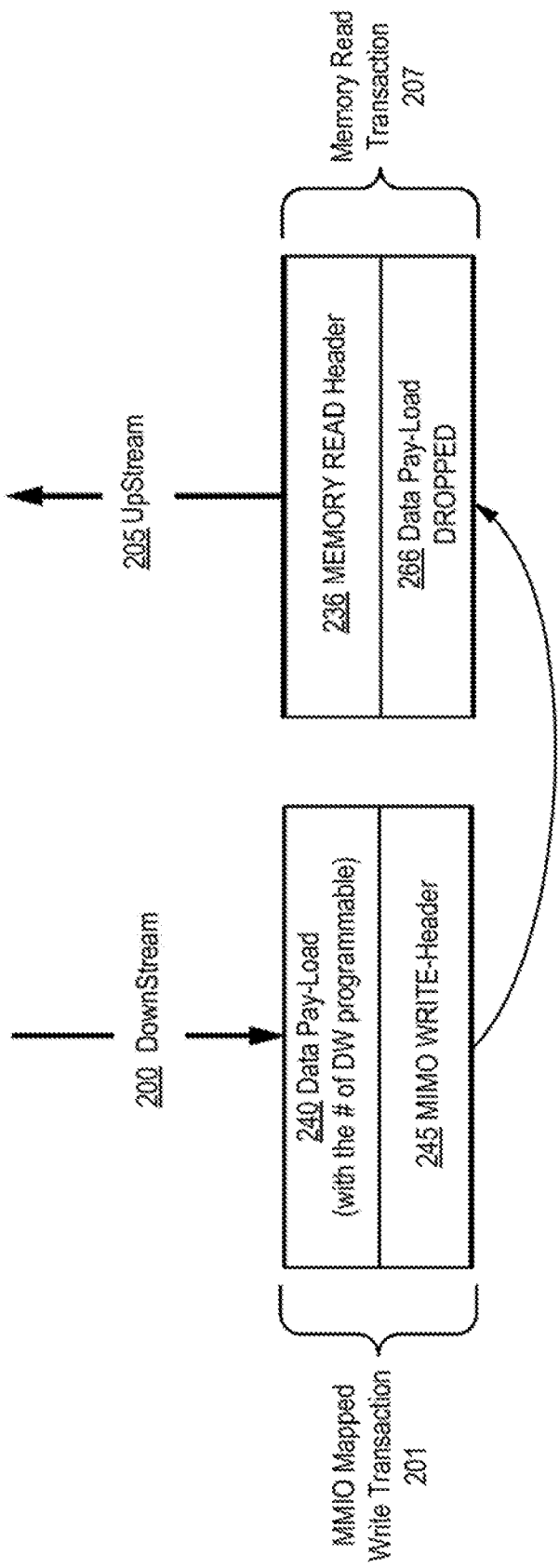
FIG. 2B depicts a transaction modification flow for a Memory Mapped IO (MMIO) write transaction to Memory read transaction in accordance with described embodiments.

FIG. 2B depicts a transaction modification flow for a Memory Mapped IO (MMIO) write transaction to Memory read transaction in accordance with described embodiments. As before, there is depicted both a downstream 200 and an upstream 205 direction. In this mode either a CPU core module or a test controller issues an MMIO mapped write transaction 201 in the downstream 200 which is modified by the virtual device of either the PCIe interface or the DMI interface into a Memory into a Memory read transaction 207. In such an embodiment, the size of the data payload 240 may vary and when the transaction is converted into the memory read transaction 207 the memory read header 236 is provided on the original data payload is dropped as depicted by element 266.

According to a first embodiment, a register is set to cause downstream completions to be dropped if the CPU core module or test controller having issued the original MMIO mapped write transaction 201 are not expecting any response. In a second embodiment, the register is set to cause the downstream completion acknowledgement to be returned to the originating CPU core module or test controller having issued the original MMIO mapped write transaction 201 where such a response is expected behavior.

According to such embodiments, a register is set to cause the data payload provided at element 240 to be dropped as indicated at element 266 and as such, it is permissible to select a wide variety of payloads and payload sizes.

According to another embodiment, if the size or length of the read transaction is in excess of a threshold then multiple packets of data will be returned from the emulated memory by the auto response mechanism or the memory controller, necessitating that multiple packets be dropped as such return packets resulting from the memory read conversion transaction are not expected behavior by the originating CPU or test controller.

Figure 2C:
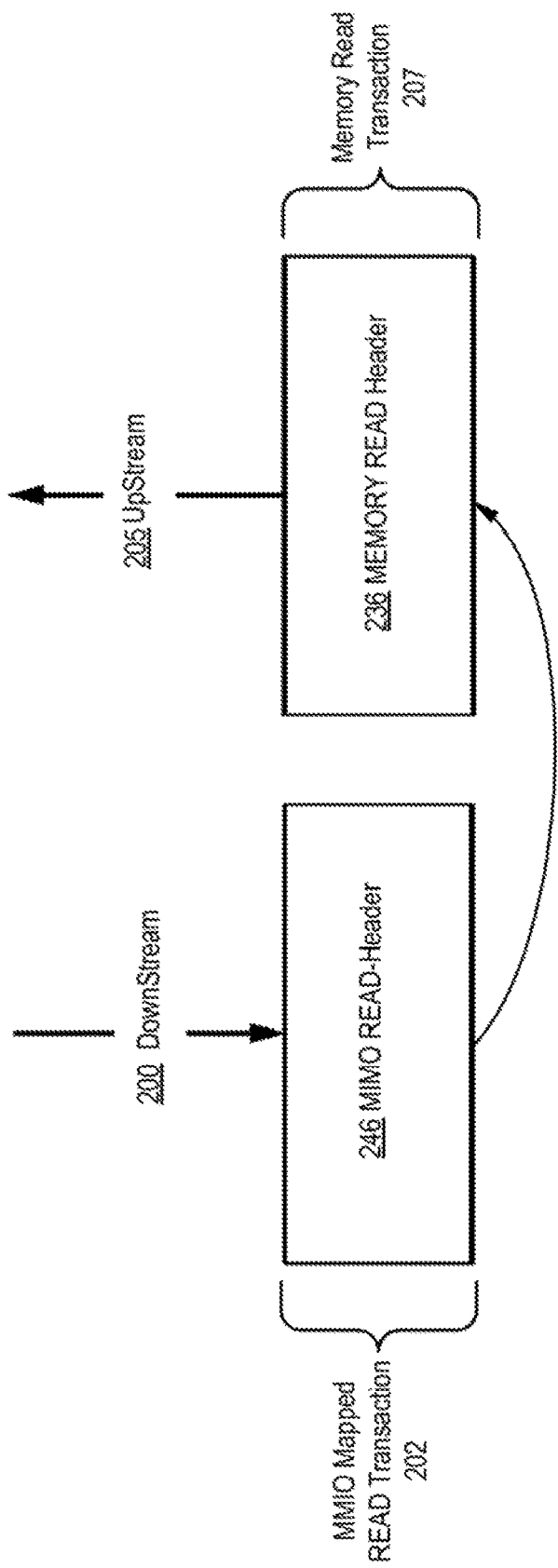
FIG. 2C depicts a transaction modification flow for a Memory Mapped IO (MMIO) read transaction to Memory read transaction in accordance with described embodiments.

FIG. 2C depicts a transaction modification flow for a Memory Mapped IO (MMIO) read transaction 202 to Memory read transaction 207 in accordance with described embodiments. As before, there is depicted both a downstream 200 and an upstream 205 direction. In this mode either a CPU core module or a test controller issues an MMIO mapped read transaction 202 in the downstream 200 which is modified by the virtual device of either the PCIe interface or the DMI interface into a Memory into a Memory read transaction 207. According to such an embodiment, the MMIO mapped read transaction 202 having a MIMO read header 246 is issued into the IO space and converted by the virtual device to the depicted memory read transaction 207 having only the memory read header 236. It is not necessary to drop any payload as none is provided with the downstream MMIO read operation. In such an embodiment, because the originating CPU core module or test controller having issued the original MMIO mapped read transaction 202 is expecting a response as expected behavior the returned acknowledgment or completion message is not be dropped.

Figure 2D:
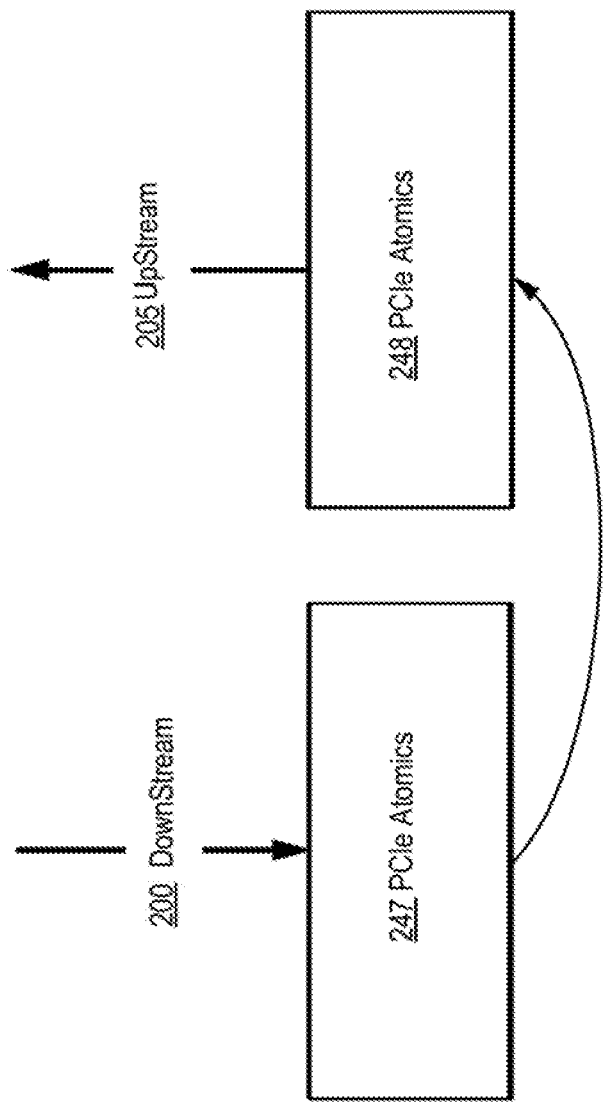
FIG. 2D depicts a transaction modification flow to support Atomics in iATM mode (Intel ATM or Intel Address Translation Mode) in accordance with described embodiments.

FIG. 2D depicts a transaction modification flow to support Atomics in iATM mode (Intel ATM or Intel Address Translation Mode) in accordance with described embodiments. As before, there is depicted both a downstream 200 and an upstream 205 direction. As depicted PCIe atomics 247 in the downstream 200 is looped via a modification process resulting in PCIe atomics 248 being placed onto the upstream 205.

Supported atomic operations where a single PCI Express transaction targeting a location in Memory Space reads the memory location's value, optionally writes a new value to the location, and returns the original value. A so called read-modify-write sequence to the location is performed atomically.

Multiple atomics operations are supported when operating in iATM mode including, for example, FetchAdd (Fetch and Add), Swap (Unconditional Swap), and CAS (Compare and Swap). According to described embodiments, FetchAdd and Swap support operand sizes of 32 and 64 bits. CAS supports operand sizes of 32, 64, and 128 bits.

A compare and swap Atomic operation is where the value of a target compared to a specified value, and if they match, another specified value is written back to the original location. Regardless of whether or not a match occurs, the original value of the location is returned.

A Fetch and Add Atomic operation is where the value of a target location is incremented by a specified value using two's complement arithmetic ignoring any carry or overflow, and the result is written back to the location. The original value of the location is returned.

An unconditional Swap Atomic operation is where a specified value is written to a target location and the original value of the location is returned.

Figure 2E:
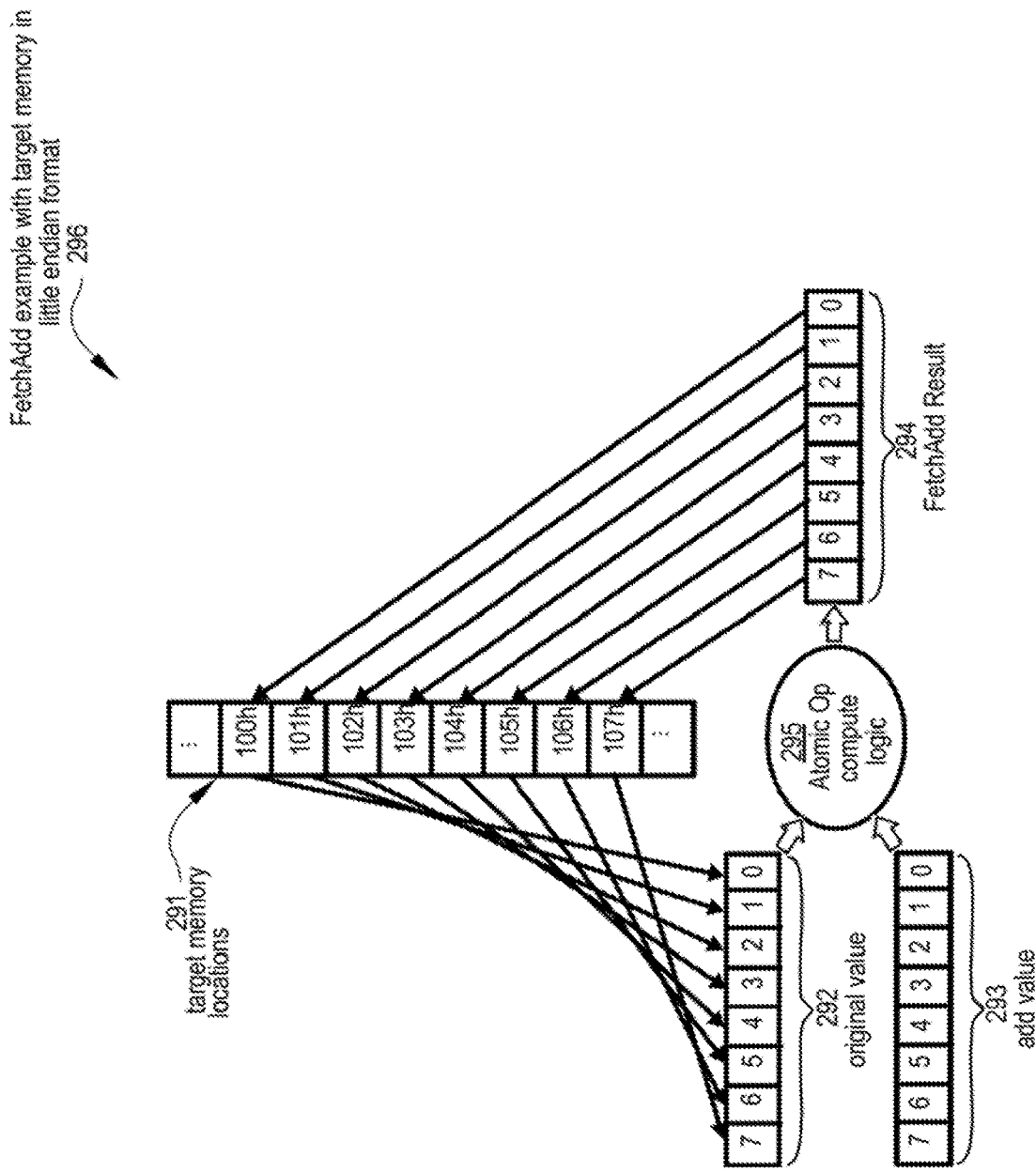
FIG. 2E depicts an exemplary Fetch and Add Atomics transfer operation for operation in iATM mode in accordance with described embodiments.

FIG. 2E depicts an exemplary Fetch and Add Atomics transfer operation for operation in iATM mode in accordance with described embodiments. Specifically depicted is a FetchAdd example with target memory in little endian format 296. For instance, target memory locations are depicted at element 291, 100h through 107h . . . with original values 292 7 . . . 0 below an the add values 293 7 . . . 0 being inputs to the atomic operation compute logic 295, resulting in the depicted fetch and add result 7 . . . 0 as depicted at element 294.

Figure 3A:
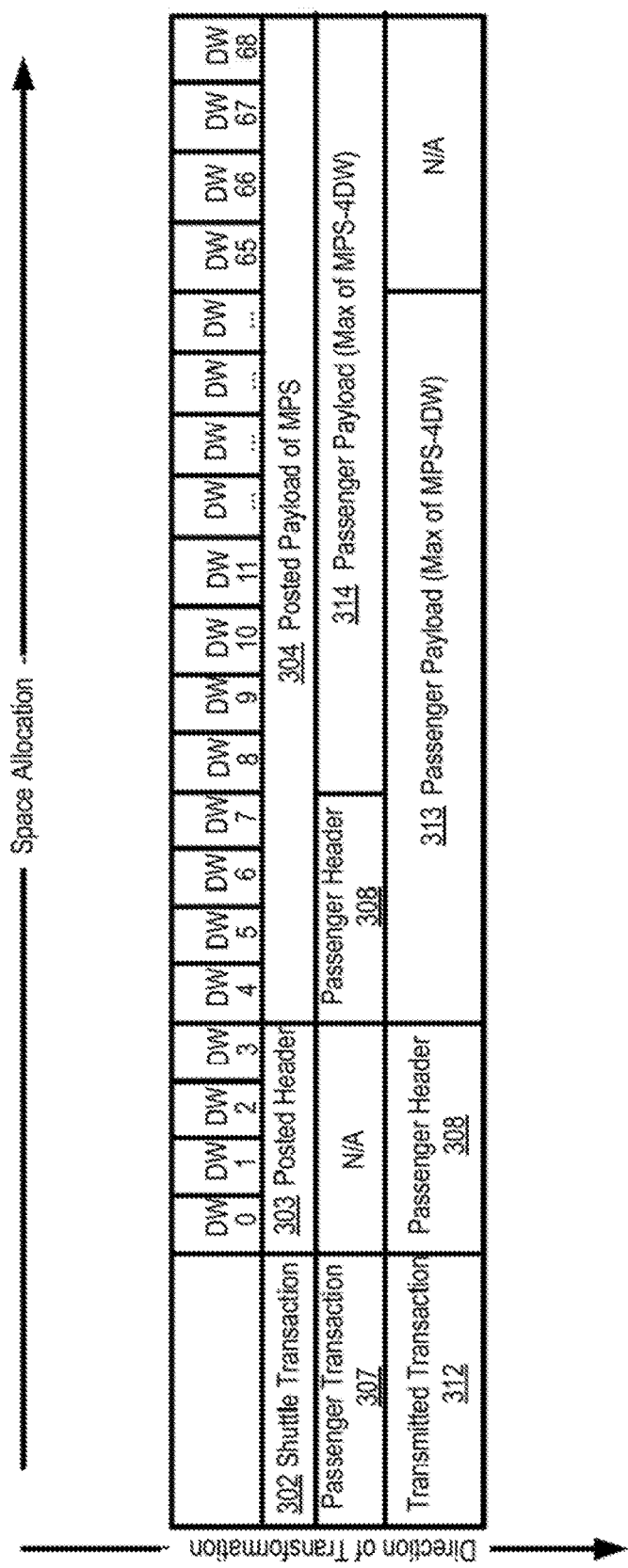
FIG. 3A depicts an exemplary Posted Cycle Shuttle (PCS) operation filled with 256 MPS Payload for operation in iATM mode in accordance with described embodiments.

FIG. 3A depicts an exemplary Posted Cycle Shuttle (PCS) operation filled with 256 MPS Payload for operation in iATM mode in accordance with described embodiments.

As PCI Express devices operate in increasingly higher frequencies, high speed bypasses are reaching the limits of the test controller or CPU core module issuing transactions to supply data at sufficient speeds which in turn leads to limitations on the ability of High Volume Manufacturing processes to effectively validate controllers, especially those operating at Gen-3 or higher frequencies. The described iATM provides the ability to perform controller validation via digital near end loopbacks with additional of cycles translations including the issuance of illegal transactions masked behind the headers of valid transactions and the ability to spawn multiple transactions, legal or illegal, via shuttle operations.

The depicted Posted Cycle Shuttle (PCS) operation utilizes posted cycles as its shuttle transaction 302, whereas a passenger transaction 307 is carried by the shuttle transaction 302. Agents receiving the posted cycles, such as a virtual device of a PCIe or DMI interface, extract the posted payload 304 within the shuttle transaction 302, locally consume the posted header 303 of the shuttle transaction 302, and then reroute the shuttle transaction's 302 posted payload 304 as a new transaction called the passenger transaction 307. The passenger transaction 307 is then routed to egress port as a transmitted Transaction 312 for looping back at an ingress port in the upstream.

Depicted is an exemplary shuttle transaction 302 which consists of 256 Max Payload Size (MPS) where MPS of 256 is supported. The depicted shuttle transaction 302 shows the posted cycles received from an IOSF primary interface. Passenger transaction 307 is carried by the shuttle transaction 302 within the posted payload 304 of the shuttle transaction 302. Passenger transaction 307 includes its own passenger header 308 and its own passenger payload 314 with a maximum of MPS-4DW as depicted. The passenger transaction 307 is sent out the egress port and TLP formation take place to form become transmitted transaction 312 with the passenger header 308 and passenger payload 313 now part of the transmitted transaction 312.

Figure 3B:
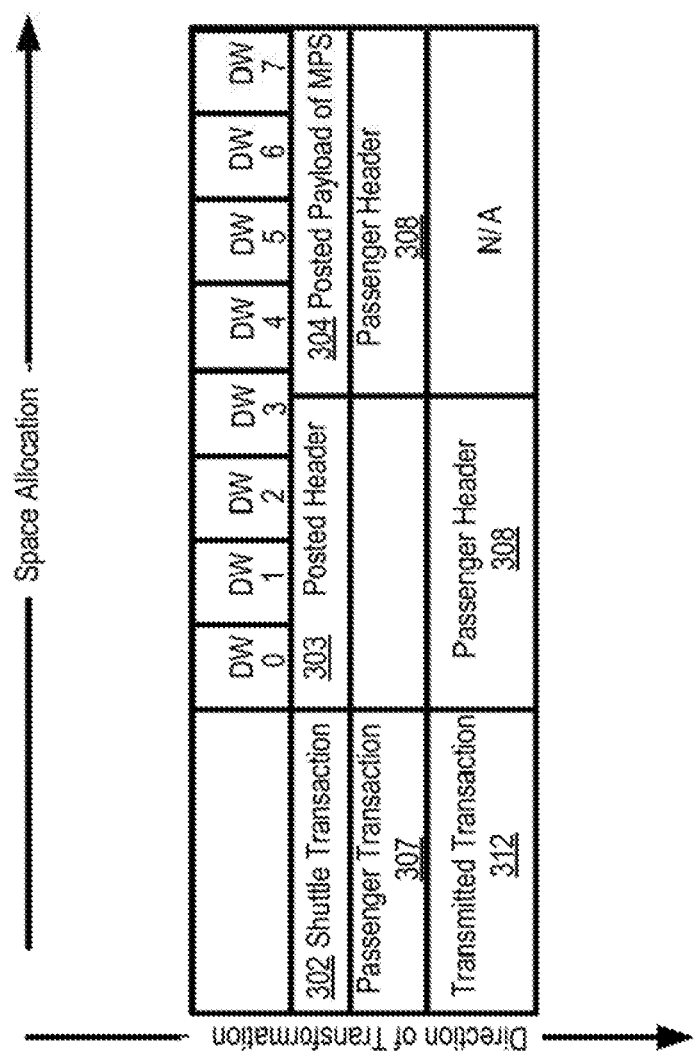
FIG. 3B depicts an exemplary Posted Cycle Shuttle (PCS) operation filled with 4-DW Payload for operation in iATM mode in accordance with described embodiments.

FIG. 3B depicts an exemplary Posted Cycle Shuttle (PCS) operation filled with 4-DW Payload for operation in iATM mode in accordance with described embodiments. As depicted here, the shuttle transaction 302 with its posted header 303 and the 4DW posted payload 304 carries the passenger transaction 307 of cycles with only the passenger header 308 and without passenger data, resulting in transmitted transaction 312 issued in the upstream from an egress port with passenger header 308.

Figure 3C:
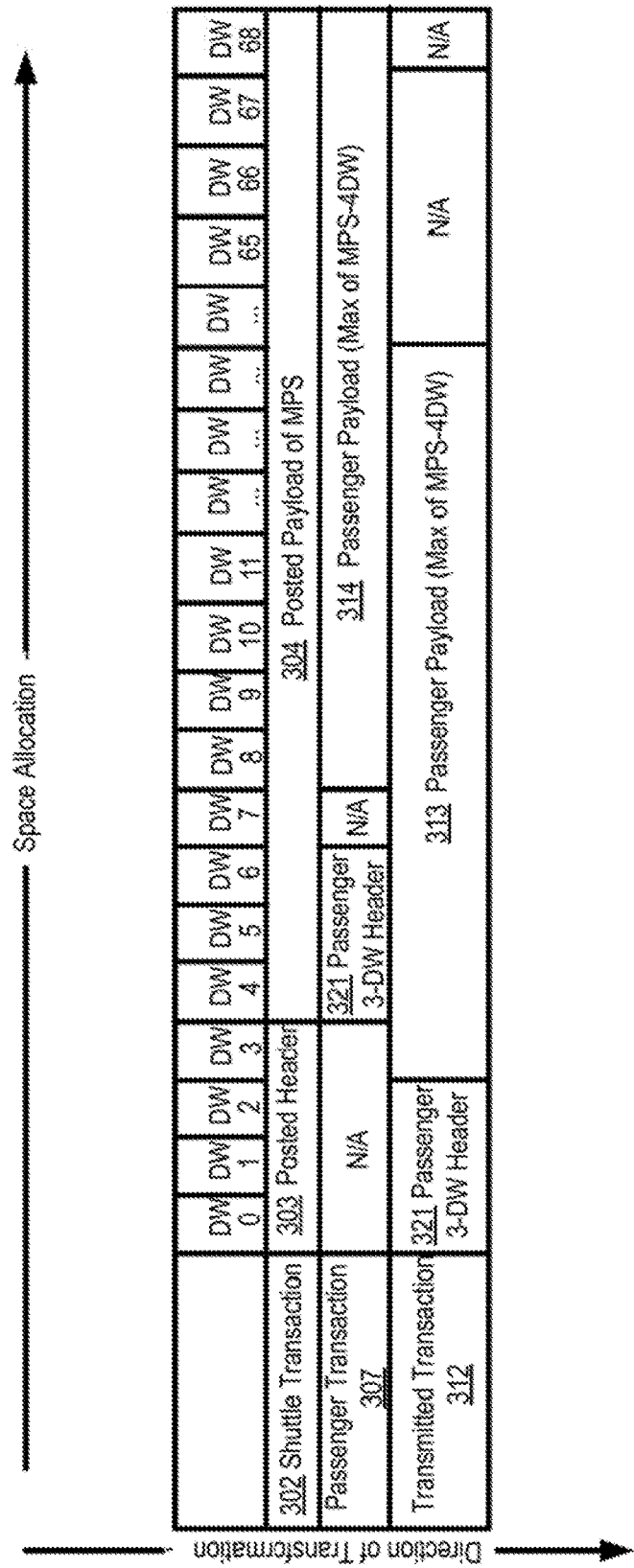
FIG. 3C depicts an exemplary Posted Cycle Shuttle (PCS) operation filled with 3-DW Payload for operation in iATM mode in accordance with described embodiments.

FIG. 3C depicts an exemplary Posted Cycle Shuttle (PCS) operation filled with 3-DW Payload for operation in iATM mode in accordance with described embodiments. Rather than the 4-DW payload it is permissible to utilize a 3-DW payload at the test writer's discretion.

As depicted, the posted shuttle transaction 302 carries passenger transaction 307 with a passenger 3-DW header 321 within its posted payload 304. As shown, the test writer pads bubble space between the passenger 3-DW header 321 and the passenger payload 314 data of the passenger transaction 307 such that the header and data is 4-DW aligned, 8-DW aligned and 16-DW aligned for a 128-bits transmitter data buffer width, a 256 bits transmitter data buffer width and a 512 bits transmitter data buffer width respectively. Consequently, the transmitted transmission 312 is egressed in the upstream with its passenger 3-DW header 321 and passenger payload 313.

Figure 4A:
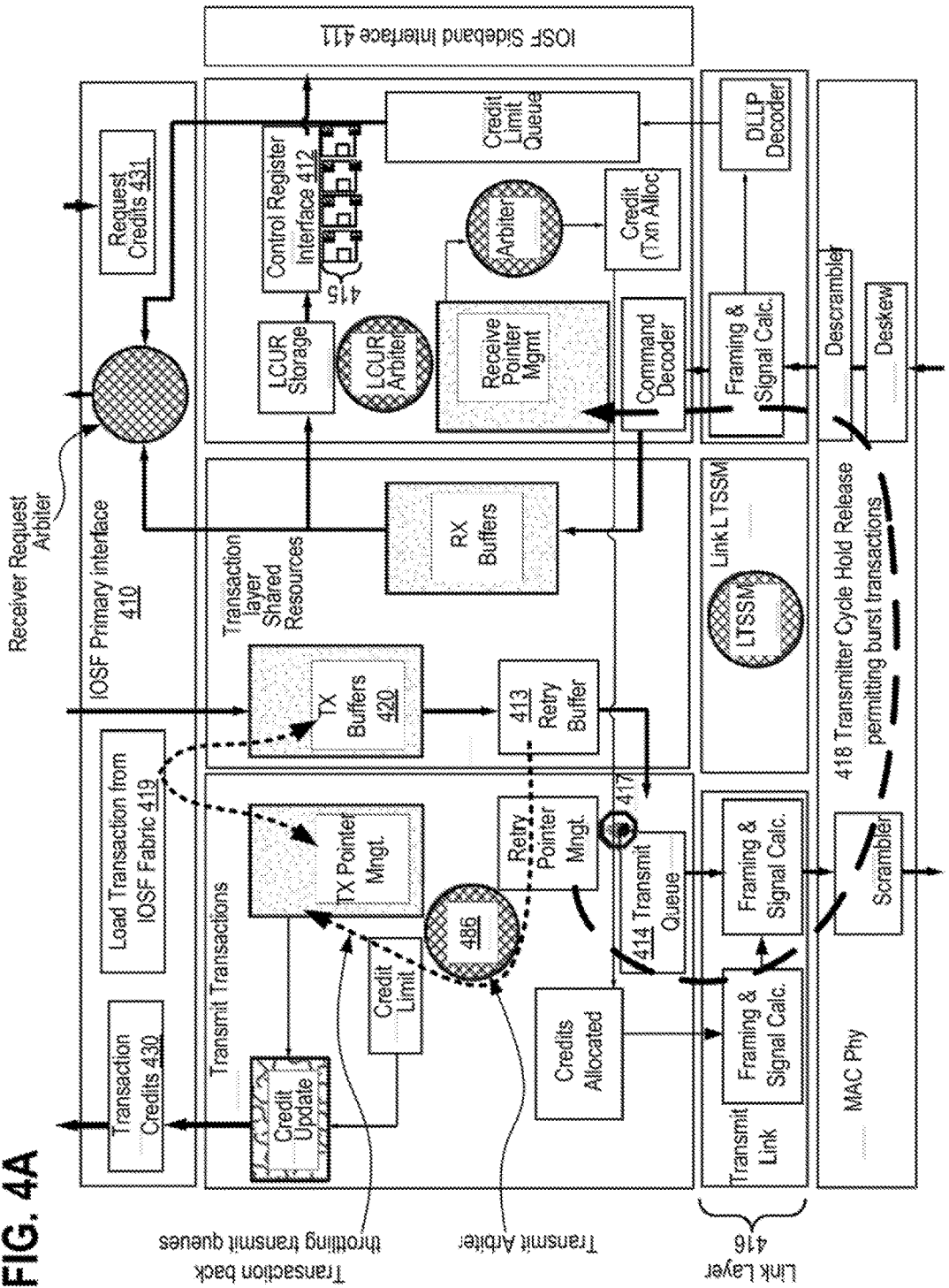
FIG. 4A depicts an exemplary Transmitter Cycles Hold Off operation and cycle flows in accordance with described embodiments.

FIG. 4A depicts an exemplary Transmitter Cycles Hold Off operation and cycle flows in accordance with described embodiments.

According to a particular embodiment, test profiles are designed to test the semiconductor device 199 logic including its queues and buffers for both the upstream and downstream layer protocols.

While issuing transactions from within the semiconductor device 199 is performed for the purposes of testing the components of the semiconductor device, both the CPU core modules and also the test controller experience sufficient delay when issuing the transactions that it simply is not feasible to completely fill the various queues and buffers of the semiconductor device. Moreover, there is a transmission latency from the moment the transactions are issued by the CPU core modules or the test controller and the time at which they arrive at any given transmit or receive buffer and a still further delay before a subsequently issued transaction arrives to the same transmit or receive buffer. Consequently, the transmit or receive buffers have sufficient time to process the flow of transactions without becoming overwhelmed and necessitating the various arbiter logics to be engaged.

It is normal and expected behavior for the semiconductor device to operate in such a regard, with the transmit or receive buffers clearing the stream of transactions before becoming overwhelmed, however, for the purposes of testing the functioning of the arbiters and the transmit and receive buffers of the semiconductor device under test it is necessary to cause the transmit and/or receive buffers and queues to become at least partially or completely filled.

The externally connected devices which couple with the serial controllers of the semiconductor device, such as a graphics card connected with the PCIe or DMI interface of the semiconductor device are capable of issuing transactions with such speed and intensity that it is possible for them to partially or completely fill the transmit and/or receive buffers and queues of the semiconductor device and it is therefore appropriate to test such components.

However, as noted previously, test methodologies are described herein for which there is no externally connected PCIe or DMI or other high speed serial device coupled with the semiconductor device so as to reduce the physical size of the test beds and so as to additionally eliminate testing costs.

Consequently, it is necessary to implement the described hold off operation functionality for the transmit and/or receive buffers and queues to permit them to be systematically filled and flushed or burst open, such that still greater coverage of the semiconductor device may be attained.

Therefore, it is provided according to certain embodiments that the transmit and/or receive buffers and queues are held up, permitting them to fully or partially fill, such that more comprehensive testing of the semiconductor device 199 including testing of the arbiters and buffers may be attained regardless of the speed or induced latency of the test controller and the CPU core modules which may not be able to issue transactions with sufficient speed.

Moreover, utilization of the onboard CPU test module and test controller for issuing transactions and performing testing of the arbiters and buffers and queues is significantly less costly than coupling externally provided PCIe or DMI devices which are capable of issuing transactions with sufficient speed.

Generally speaking, transaction packets are accumulated at various cross sections of the pipeline and then released as if a flood gate was opened permitting the accumulated transactions to burst through the semiconductor logics for the purposes of exercising the arbiters and queuing logic and generating signatures which may then be utilized to deterministically identify a semiconductor device under test as passing or failing.

According to the described embodiments, the semiconductor device 199 under test includes multiple buffers in both the transmit (TX) and also receive (RX) layers. Transactions flow through the buffers as downstream traffic and then are processed, responded to, or looped back onto the upstream at which point the upstream traffic then flows through additional buffers.

Buffers range in size and depends upon the particular implementation of the semiconductor device, however, described embodiments permit programmable and dynamic filling of the receive and transmit buffers such that a test profile may partially fill the buffers or completely fill the buffers to precisely their maximum capacity and so forth, depending on the test sequence design.

Still further, there are virtual channels provided by the semiconductor device under test denoted as, for example, the transmit queue 414 and other queues. Embodiments therefore permit the queues to be filled as well so as to ensure more comprehensive test coverage of the semiconductor device under test.

According to described embodiments, one or both of the transmit queue and the receiver queue are blocked, permitting a stream of incoming transaction packets to accumulate and partially or fully fill the buffers and queues. Retry buffers 413 may additionally be filled by implementing a transmitter cycle hold off.

Once the buffers and queues are filled to the extent specified by the test profile the flood gates may be opened by programming the register 415 at the control register interface to release the transmitter cycle hold off, thus causing the accumulated traffic to burst through the remainder of the logics provided, exercising the arbiters, the queues, buffers, pointer managers, credit allocation logics, decoders, scramblers, descramblers, etc.

Each logic component touched by traffic contributes to a signature which is collected via accumulators and traffic counters as described in greater detail below, the process of accumulating the blocked traffic and then releasing the traffic in a burst fashion causes a specific signature which should be identical every time for a semiconductor device 199 under test which is functioning properly when compared to a known good semiconductor device or compared with simulation and modeling signature data.

If on the other hand, any of the buffers, arbiters, queues, or other logics malfunction when the traffic is blocked and accumulated and then permitted to burst process through then a different and non-conforming signature will be generated, which, when compared with the test signature of a known good silicon device, will not match and will thus indicate a defective or failing unit under test.

If the provided prioritization schemes and arbiters of the semiconductor device are never overwhelmed then test coverage is not comprehensive as possible because such logics would be present on a device under test but never utilized and thus, never contribute to the test signature ultimately utilized for pass/fail determinations.

Alternative embodiments test the prioritization schemes and arbiters responsive to flooding conditions by spawning or issuing multiple concurrent transactions simultaneously rather than performing a transmitter hold off operation to stop traffic at the outputs of the queue or buffers. Still other embodiments perform both concurrent issuance of transactions via a shuttle and payload transaction scheme and additionally utilize hold off and release operations to permit the buffers to partially or completely fill.

Embodiments of iATM provide HVM flexibility to perform functional versus error injection testing over loopback mode with features including: "Transmitter Receiver Cycles Hold Off Operation," "Cycle Translation Operation," and "Posted Cycle Shuttle Operation." Each of these operations are supported for both upstream and downstream components.

Use of the Transmitter Receiver Cycles Hold Off Operation provides an intentional and configurable hold off the Cycles at respective queues while HVM tests profiles fill the respective queues. Such a mode is useful for HVM tests including: (a) HVM testing coverage for queue full conditions; (b) burst cycles transactions for upstream/downstream testing coverage; (c) back to back transactions for upstream/downstream coverage testing; and (d) transactions ordering coverage testing.

According to described embodiments, the CPU core modules or test controller initiate many transactions in quick, succession so as to test the upstream queues and in particular, so as to test the flooding control mechanisms of the semiconductor device 199. However, semiconductor device 199 has purpose built flooding control mechanisms which prevent the device from becoming overwhelmed with transactions and the CPU core modules and test controller cannot initiate a sufficient number of transactions fast enough to fill the buffers and queues of the semiconductor device 199 for the purposes of testing. While the CPU core modules and test controller are able to generate a large number of transactions quickly, there is nevertheless a delay in their creation and issuance which is sufficiently long to permit the upstream queues to clear up the burst of transactions. Nevertheless, it is desirable to completely fill the queues and overwhelm the flooding control mechanisms for the purposes of testing the queues so as to validate their correct performance and functionality in the event of a true flooding condition occurring, for instance, due to a malfunction or a malicious attack originating from an externally connected DMI or PCIe device when the semiconductor device is in actual operation within an end-user implementation.

Therefore, it is in accordance with certain embodiments that an upstream flooding condition is emulated on the semiconductor device 199 by embedding multiple transactions within the payload of a single protocol compliant and legal downstream transaction issued by the CPU core modules or the test controller which is subsequently unmasked to reveal the multiple transactions which may then be issued simultaneously by the virtual device 115 of the PCIe 110 interface or by the virtual device 145 of the DMI 150 interface.

For instance, multiple such transactions may be masked, hidden, veiled, or encapsulated behind a single memory write header which is valid and protocol compliant. Behind the single memory write header may then be hidden within the payload section three additional headers for three more transactions, but carried by the payload as data.

Additionally described is functionality capable to perform upstream and downstream blocking capabilities such that the queues and buffers may be temporarily halted or paused, permitting the launching of multiple concurrent transactions to fill the device queues.

For instance, utilizing iATM mode a test writer may elect to block both upstream and down stream buffers. Separate control register bits enable this mode which are configurable by the test writer for use with test arbitration logic, FIFO buffer testing, and other test cases by issuing concurrent sets of transactions while the upstream and/or downstream buffers are blocked.

Exemplary usage modes may include any of: a) Block only upstream buffers; b) Piggy backing any upstream legal or illegal transaction upto 4-DW within the payload of a transaction behind a legal down stream transaction (referred to as a Shuttle transaction), in which the iATM mode logic drops the 1st 4-DW (shuttle transaction) which provides the header for the legal transaction and then queues the shuttled payload transactions; c) Repeating operation "b" to result in any quantity of concurrent transactions being enqueued; d) Enabling an "infinite" credit mode; and e) Releasing of the upstream buffers blocked.

Test writers may set and configure the appropriate control register bits to drop completion for the Non-posted "payload transactions," if inappropriate. For instance, if the shuttle operation is a "memory write" transaction then a completion will not be forthcoming according to expected behavior, however, if the shuttle operation is a "non-posted" transaction, then completions should be allowed according to expected behavior.

Exemplary valid Shuttle operations include Memory Writes and exemplary Pay-load operations include, by way of example: (a) CFG WR/RD; (b) IO WR/Rd; (c) Vendor Messages (VDM); (d) Memory read; (e) Memory writes; and (f) Atomics. In the case of illegal (e.g., protocol non-compliant) upstream transactions such as CFG WR/RD and IO WR/THE transactions should be marked by the test writer as "un-supported type" and the "un-supported type" may then be read out from the status registers during test, debug, etc.

As depicted here, available cycle flow descriptions include: (a) Transmitter cycles which hold off transactions accessible either through an IOSF Primary interface 410 or an IOSF Sideband Interface 411. Transactions are loaded from the IOSF fabric 419 on the transmit side into the transmit buffers 420. When the respective register 415 bit set to enable via the control register interface 412, subsequent transmitter cycles will be held off at the outlet 417 of the retry buffer 413 until released. Transaction Layer Protocol (TLP) traffic inflight to the transmit queue 414 and retry buffer 413 at the time of cycle hold off operation.

Once the transmitter cycles hold off bit is set, posted, non-posted, and completion cycles may then be initiated through IOSF Primary interface 410 to the transmit queues 414. Respective cycles may then be loaded into the retry buffer 413 until full or until filled to the specified quantity as per the test profile. Because of the transaction hold at the outlet 417 of the retry buffer 413, transaction cycles will be accumulated at retry buffer 413, and eventually back throttle to the transmit queues 414. Configuration then cycles from either the IOSF Primary Interface 410 or the IOSF sideband interface 411 to clear the transmitter cycle hold off transactions held at the retry buffer 413.

Because configuration cycles through IOSF Primary interface 410 must be loaded to transmit queues and because ordering is enforced at the at transmit arbiter 414, configuration cycles will not reach configuration registers blocks if there are pending Transaction Layer Protocol (TLP) traffic on posted transmit queues 414.

After the transmitter cycles hold off is released as depicted by element 418, burst cycles will be transmitted and eventually looped back at the receiver side resulting in bursting back to back operations to load the receivers logics.

According to one embodiment, there are two associated registers 415 which handle the necessary hold offs. A first register 415 is to independently hold off the transmitter transactions, specifically, the downstream transaction hold off for upstream components and upstream transaction hold off for downstream component. A second register 415 is to independently hold off the receiver transactions, specifically, the upstream transaction hold off for upstream components and the downstream transaction hold off for downstream transaction.

When the transmitter cycles hold off operation is enabled, transmitter cycles held at the retry buffer 413 will cause TLP available transaction indications not to be advertised to the link layer 416.

Configuration cycles are accessed through IOSF primary interface 410 or the or IOSF sideband interface 411 to enable posted shuttle transaction operation such as the posted shuttle transactions depicted at FIG. 3A above. Permissible configuration of the posted transaction shuttle include: Cycle Format and Type, Virtual Channel and Payload Length Of Passenger Transaction. Further permitted configuration of the posted transaction shuttle include: egress memory decoding rules which allow the posted cycles to be decoded as with the decoding rules targeting the egress port (e.g., the Cycle Targeting Retry Queue or retry buffer 413). Submitted posted transaction shuttles may be configured to access through either the IOSF primary interface 410 or the or IOSF sideband interface 411 and may further optionally set the transceiver cycles hold off operation or the receiver cycles hold off operation or both as appropriate for the test case. Submitted shuttle transactions sent from the IOSF primary interface 410 are stored in the transmitter posted queues 414. Passenger transactions are extracted based on configuration registers 415 programming for the outlet of transmit queue 414 and then loaded to retry buffer 413 and looped back into the receiver queues 425. If receive cycle hold off operational mode is enabled then upon clearing the receive cycle hold off register 415 through either the IOSF primary interface 410 or the or IOSF sideband interface 411 any received cycles will burst and back to back drain to the IOSF primary interface 410.

Test cases which may utilize such a model include testing for back to back non-posted streams at the receiver side via receiver queue 425 to the IOSF primary interface 410; testing for proper handling of malformed cycles injections; and testing for unsupported cycles injections, among others.

Because shuttle transactions and passenger transactions are extracted using the posted path before reaching the transmit arbiter 486, link flow control credits are bypassed for design simplification in accordance with selected embodiments. For IOSF credit maintenance of the transaction credits 430 and request credits 431 at the IOSF primary interface 410, the Posted Credit of the IOSF primary interface 410 are returned accordingly, regardless of any given passenger transaction's format, type, or length. In order to support multiple concurrent non-posted inflight downstream transactions which are looped back onto the upstream for upstream components, functionality for outstanding completion queues may be disabled as the outstanding completion queues functionality will otherwise advertise available credits to the transmit arbiter 486 which would allow multiple concurrent non-posted transactions to grant downstream.

Passenger shuttle restrictions may be applied in accordance with the described embodiments, including: (a) mandating that only one single passenger transaction may be carried by one single shuttle transaction; (b) mandating that bubbles must be filled between the passenger header and the passenger payload, so as to align with 4DW, 8DW and 16 DW configurations for 128 bit transmitter data buffer widths, 256 bit transmitter data buffer widths, and 512 bit transmitter data buffer widths respectively; (c) mandating clearing of Transmit or Receive Cycle Hold off Operations be done through either the IOSF primary interface 410 or the IOSF sideband interface 411 and preventing overfilling of the posted cycle from the ISOF primary and sideband interfaces through to the transmit queue 414; (d) mandating a maximum payload size for passenger transactions of MPS-16DW; and (e) preventing the Received Queue from overloading as flow control credit will not be maintained.

Figure 4B:
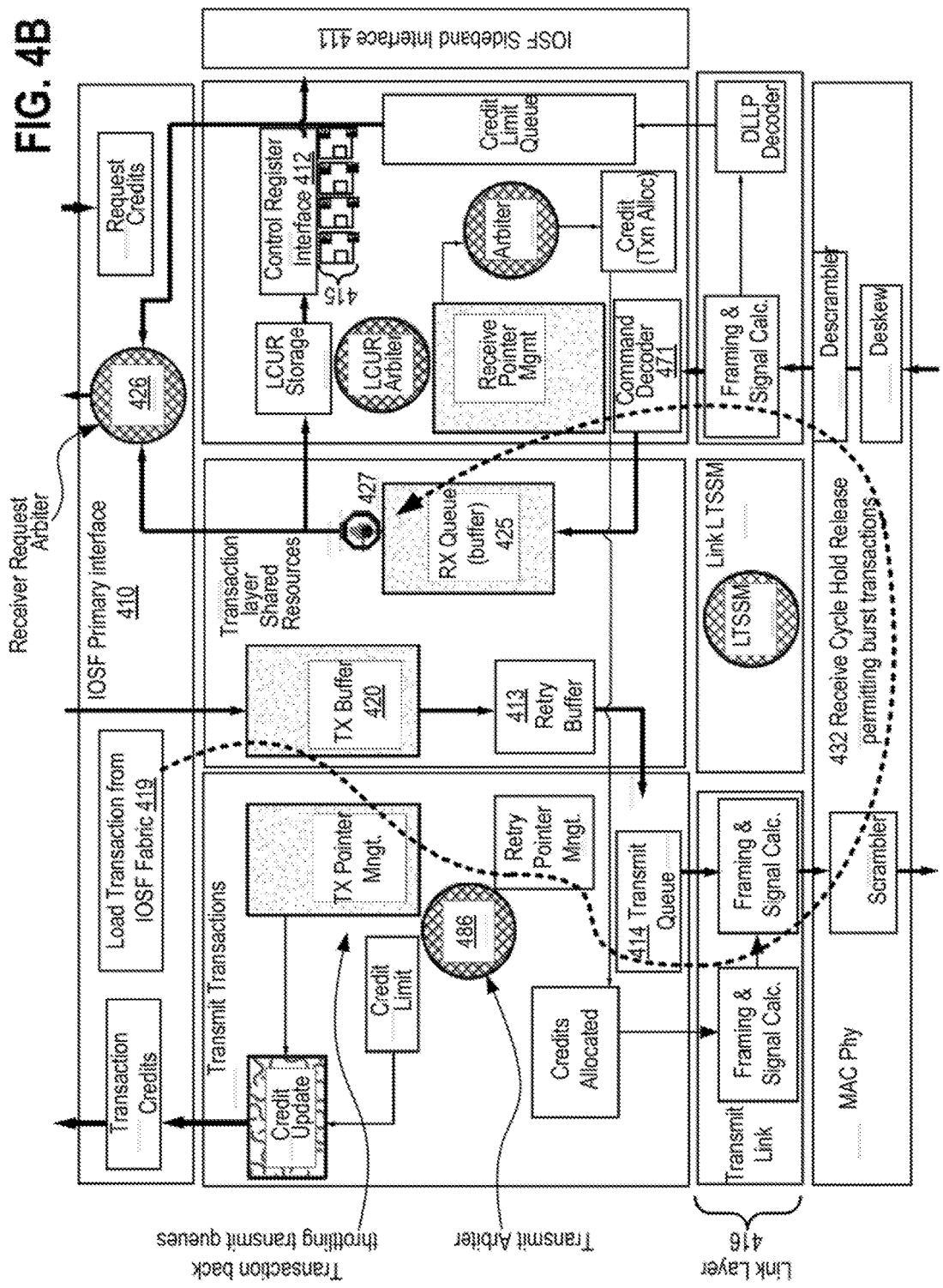
FIG. 4B depicts an exemplary Receiver Cycle Hold Off Operation and cycle flows in accordance with described embodiments.

FIG. 4B depicts an exemplary Receiver Cycle Hold Off Operation and cycle flows in accordance with described embodiments. When enabled, the Receiver Cycle Hold Off Operation will hold off the receiver cycles at the outlet of receiver queue 425 buffer by masking TLP availability indication from reaching the receiver request arbiter 426.

Receiver cycles hold off transactions are accessible either through IOSF Primary interface 410 or IOSF Sideband Interface 411. When the respective register bit 415 is set to enable via the control register interface 412, receiver cycles will be held off at the outlet 427 of the receiver queue 425 for all VC R-Type. Posted, non-posted, and completion cycles sent from the transmitter will then be looped back to the receiver and held off at the outlet 427 the receiver queue thus enabling a test profile to completely or partially fill the receiver queue 425.

Receiver queues 425 may also be made to apply back pressure to the retry buffer 413 and eventually back to the transmitter queues 414.

Such an approach may thus be utilized to test the enforcement of ordering rules handling at the transmit queues 414. Configuration cycles from either the IOSF Primary Interface 410 or the IOSF Sideband Interface 411 to clear the receiver cycle hold off stopping transactions at the outlet 427 of the receiver queue 425.

After the receiver cycle hold off register 415 is cleared, receiver cycles will burst drain and back to back drain to the IOSF Primary interface 410 as indicated by element 432. The receiver cycle hold off operation may therefore be utilized for any generation speed and any link width supported by the semiconductor device. The receiver cycle hold off operation may also be used to simultaneously enable on multiple ports for any supported root port configuration. Further still, the "Cycle Translation Operation" and the "Posted Cycle Shuttle Operation" may be utilized in conjunction with the receiver cycle hold off operation.

Cycle Translation Operations permit HVM to send TLPs via egress ports and loop back TLPs at an ingress port followed by cycle forwarding to an IOSF Primary interface 410. Due to receiver cycle decode checking, certain rules and requirements are enforced to either allow or reject received cycles. Header attribute translations are performed at the inlet of receiver command decoder 471.

Translation of header information is performed to allow cycles to be forwarded to IOSF Primary interface 410. Address translation for memory access cycles including Atomic cycles are performed to permit memory cycles to be forwarded to IOSF Primary Interface 410. Requester ID of the Non-Posted request is additionally swapped with the subordinate bus number to allow completion returns to flow back to the root port.

Various header attribute may also be overwritten to provide test coverage for receiver error handling including the following fields: Relax Ordering, Snoop Required Attribute, Traffic Class, and Format Translation.

Cycle translation operations permit HVM testing to cover all types of valid cycles with minimum attribute overriding so as to verify the transmitter command and data paths are functioning correctly. In order to maximize functional coverage, outstanding completion queues and flow control credit remains functional thus enabling functional coverage of pending egress non-posted cycles with ingress completion returns, as well as receiver flow control handling logics.

The protocol stacks in normal operation dictate that transactions initiated for which a reply is required must have a corresponding reply otherwise the initiating component for the transaction missing its reply will error. It is therefore in accordance with certain embodiments that implementing the hold off operations to cause the queues to pause and fill that quieting logic is utilized to prevent the fabric from initiating error messages for transactions failing to have a corresponding response within the ordinary period of time allowed during normal operation. In such a way, time limits for reply may be over-ridden such that the queues and buffers may be filled with transactions for testing purposes and the fabric logic will be prevented from choking or issuing errors for the missing responses. For instance, Quality of Service (QoS) requirements normally mandate responses to be received within a specified period of time however the quieting logic may be utilized to override such requirements.

Choking conditions may when the semiconductor device interfaces and fabric observes a lack of transactions and then begins to shut down clocks and initiate power savings mode on the assumption that there is no demand, however, the quieting logic may additionally be utilized to maintain the clocks and full power mode despite the absence of transactions traversing the fabric for a period of time which exceeds the normal time thresholds.

According to one embodiment, the quieting logic avoids chocking conditions by continuing to issue packets into the downstream permitting the fabrics to light up and preventing the clocks from shutting down and preventing the semiconductor device 199 from entering a sleep or low power mode.

According to another embodiment, the quieting logic manipulates the credit tracking components of the semiconductor device. For instance, each of the fabrics maintain credit tracking to manage the flow of packets. Therefore, certain embodiments activate an infinite credit mode on the fabrics such that even if sufficient credit would ordinarily be lacking for certain transactions on the fabric, those transactions may nevertheless be processed through and either accumulate in the queues and buffers or be processed based on whether a hold off operation is in effect at the time.

The quieting logic may additionally cause checks along the path through the fabrics to be ignored such that transactions spawned and issued may flow through freely despite being in violation of checks and rules restricting or mitigating flooding conditions during normal operation of the semiconductor device.

In other embodiments, the quieting logic over-rides a handshake check mechanism so as to ignore transactions which violate handshake requirements. For example, ordinarily a transaction will trigger handshake events or acknowledgements and ultimately result in a responsive message or a responsive transaction. Certain issued transactions, however, are never processed in the usual manner. For example, shuttle transactions are not consumed by the components along the fabric, but rather, are captured by the virtual devices of the semiconductor device and they have their headers stripped away and their passenger transactions within their payloads then issued onto the fabrics. The handshake mechanism would normally error on such a condition because the shuttle transaction which appears as a valid transaction due to its header is never actually issued onto the upstream and appears to have gone "missing" for no apparent reason. Such checks may be over-ridden via the quieting logic for the purposes of semiconductor test.

Figure 5A:
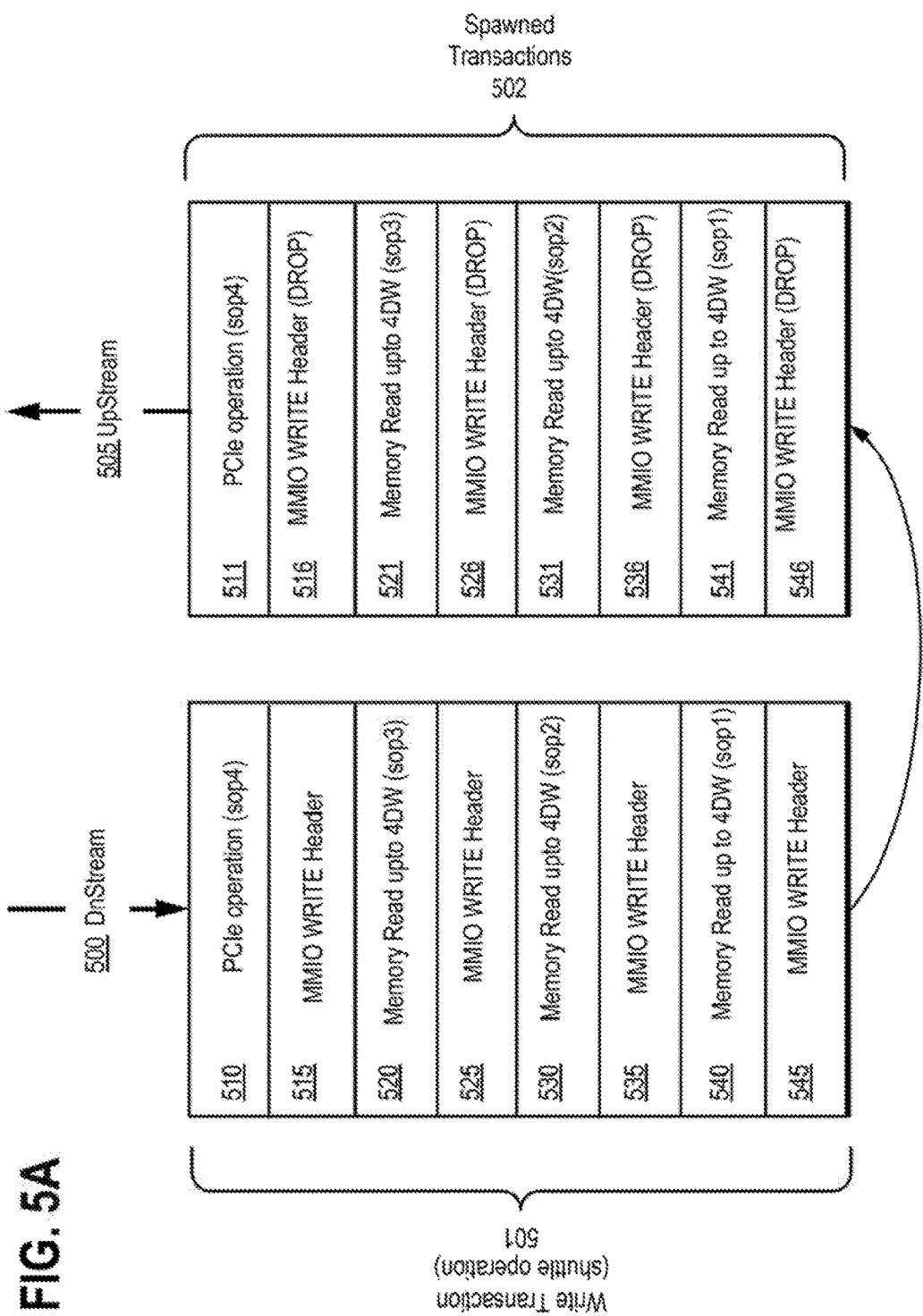
FIG. 5A depicts an exemplary transaction modification flow for the issuance of multiple memory reads concurrently in accordance with described embodiments.

FIG. 5A depicts an exemplary transaction modification flow for the issuance of multiple memory reads concurrently in accordance with described embodiments. As depicted, there is depicted both a downstream 500 and an upstream 505 direction.

Depicted in this exemplary flow, there are multiple read transactions issued concurrently. After blocking the upstream buffers, test writers may elect to issue a "multiple read operations" configured transaction, each being piggy backed or carried as a pay-load operation within a legal downstream transaction, with the payload carrying the multiple read transactions and masked by a legal header, in this case, a legal Memory write transaction providing the shuttle operation. After releasing the upstream buffer which was previously blocked, all pay-load transactions will be spawned concurrently. Because the downstream logic does not expect completions, the test writer may configure the appropriate register to drop all the completions. Credits may also be managed by the test writer. For instance, the test writer may enable "infinite credit" mode to prevent the queues from halting the flood of transactions.

Depicted in greater detail are an exemplary write transaction 501 which provides the shuttle operation in the downstream 500 and also the spawned transactions 502 as a result of the transformation or modification process, in which the multiple spawned transactions 502 are issued concurrently into the upstream 505.

As depicted on the left side with the write transaction 501, there is a PCIe operation (sop4) 510 which may be any legal PCIe operation which is legal, permissible, and protocol compliant in the downstream 500. Within the exemplary write transaction 501 it can be seen there is a MIMI write header 515 providing the masking function for the hidden payload and then within the payload there are carried three hidden memory read operations carried by the shuttle. Specifically, below the MIMO write header 515 it can be seen there is a first memory read 520 operation up to 4-DW (sop3) followed by a MIMO write header 525, a second memory read 530 operation up to 4-DW (sop2) followed by a MIMO write header 535, and finally a third memory read 540 operation up to 4-DW (sop1) followed by a MIMO write header 545.

The write transaction 501 packet is issued by a CPU processor core or a test controller and travels in the downstream 500 to a virtual device such within the PCIe or DMI interfaces of a semiconductor device 199 where it is then transformed into the multiple concurrent memory operations.

As depicted here, the virtual device strips away the headers and permits the multiple memory read operations to be issued concurrently as the spawned transactions 502. The resulting spawned transactions 502 will thus include the PCIe operation (sop4) 511 and the three memory read operations including memory read 521 (up to 4-DW, sop3), memory read 531 (up to 4-DW, sop2), and memory read 541 (up to 4-DW, sop1). The remaining headers are no longer required and therefore the virtual device drops them, with MIMO write header 516 being dropped, MIMO write header 526 being dropped, MIMO write header 536 being dropped, and MIMO write header 546 being dropped.

In accordance with particular embodiments, a shuttle and payload scheme is utilized to carry multiple transactions or protocol non-compliant transactions, or both, past a protocol stack on the downstream such that the non-compliant or illegal transactions may then be issued into the upstream.

As noted above, the upstream and downstream protocol layers are not symmetrical, meaning that transactions permissible in the downstream may not be permissible in the upstream and vise versa. However, it is nevertheless desirable to issue upstream transactions from the CPU core modules or the test controller which necessitates transactions first traversing downstream logics.

The described shuttle and payload mechanisms are therefore utilized to carry such transactions through the downstream to a point at which they may be issued into the upstream, for instance, by the virtual devices described above.

However, rather than issuing single transactions which are then morphed or modified and looped back onto the upstream, the shuttle and payload mechanism permits multiple transactions to be carried as "passengers" within the payload space of the "shuttle."

According to such embodiments, the shuttle operation as depicted as an exemplary write transaction at element 501 always provides a protocol permissible and legal transaction and the payload carries one or more additional transactions which may be legal or illegal and may be singular or configured to spawn multiple concurrent transactions.

The header of the shuttle operation provides appears protocol compliant to the protocol stack evaluating the transaction and therefore permits the shuttle operation to progress, regardless of its payload. The virtual device or other entity processing the shuttle operation strips the shuttle header and releases and issues the payload transactions on the upstream.

According to such embodiments, the shuttle transaction itself is never issued as a transaction into the upstream, rather, it is killed off and its header is discarded.

Figure 5B:
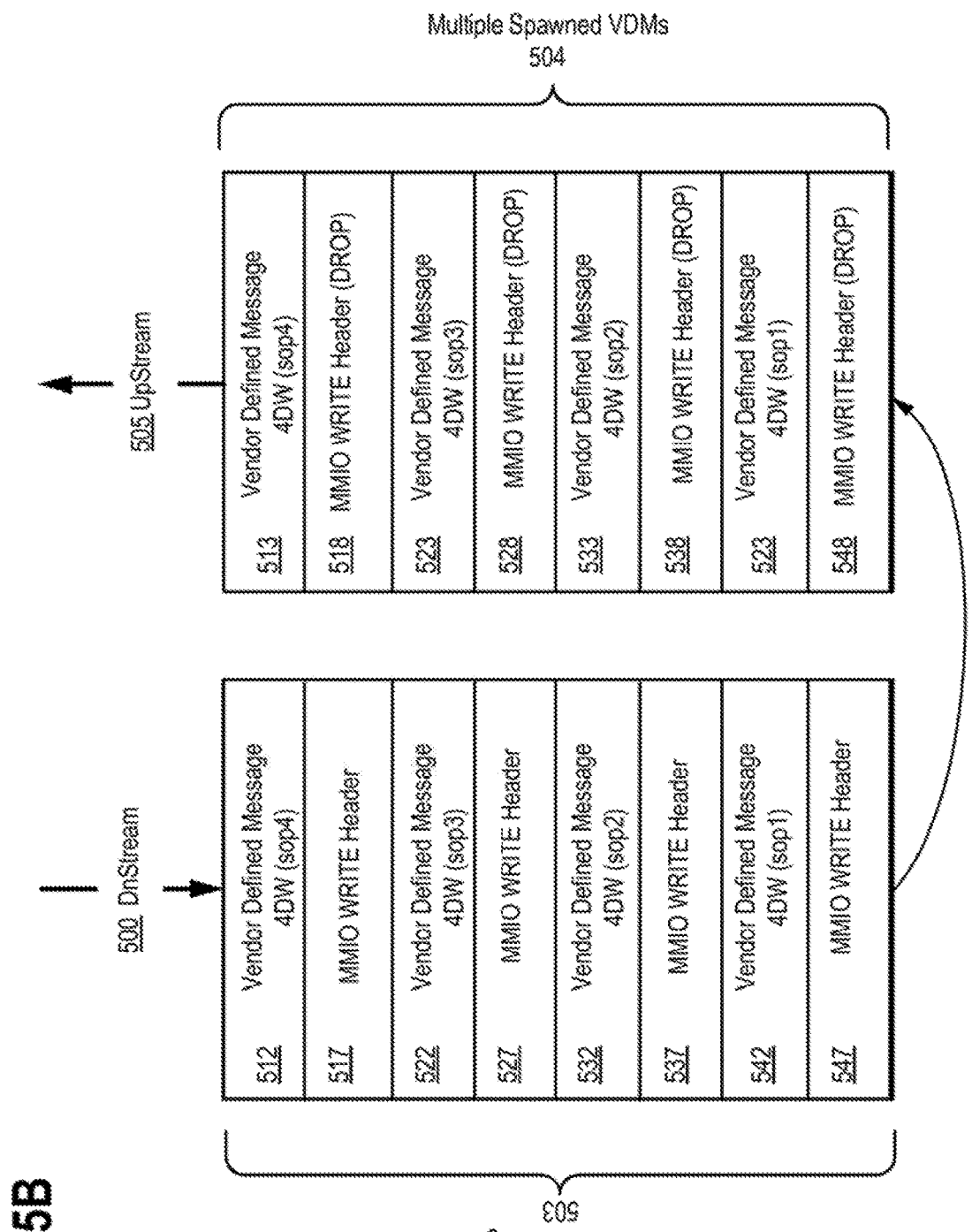
FIG. 5B depicts another exemplary transaction modification flow for the issuance of multiple vendor messages concurrently in accordance with described embodiments.

FIG. 5B depicts another exemplary transaction modification flow for the issuance of multiple vendor messages concurrently in accordance with described embodiments. As depicted, there is depicted both a downstream 500 and an upstream 505 direction.

Test writers may issue multiple vendor defined operations concurrently as depicted here so as to further expand test coverage of the semiconductor device under test.

As depicted by the sequence, Vendor Defined Messages (VDMs) which are otherwise are illegal in the downstream are nevertheless shuttled by or piggybacked on a set of legal and permissible MMIO write operations in the downstream. After blocking the upstream buffers, the virtual devices may then issue as many transactions as possible within the credit limits imposed by the blocked buffers and then release the buffer causing multiple VDMs to be spawned and concurrently released in the upstream.

As depicted here, the virtual device strips away the headers and permits the multiple provided Vendor Defined Message transactions within the vendor defined message shuttle 503 to be issued concurrently as the multiple spawned transactions 504. The resulting multiple spawned VDM transactions 504 will thus include the first vendor defined message (up to 4-DW, sop4) 512, the second vendor defined message (up to 4-DW, sop3) 522, the third vendor defined message (up to 4-DW, sop2) 532, and the fourth vendor defined message (up to 4-DW, sop1) 542, each being followed by a MIMO write header 517, 527, 537, and 547 which mask the illegal downstream vendor defined messages as legal and permissible upstream MIMO write transactions.

The virtual device handling the incoming vendor defined message shuttle 503 strips away the MIMO write headers 518, 528, 538, and 548 which are indicated as being dropped and then permits the four payload transactions to be issued concurrently into the upstream, thus permitting each of vendor defined message 513, 523, 533, and 543 to be issued as legal and permissible upstream transactions.

Figure 5C:
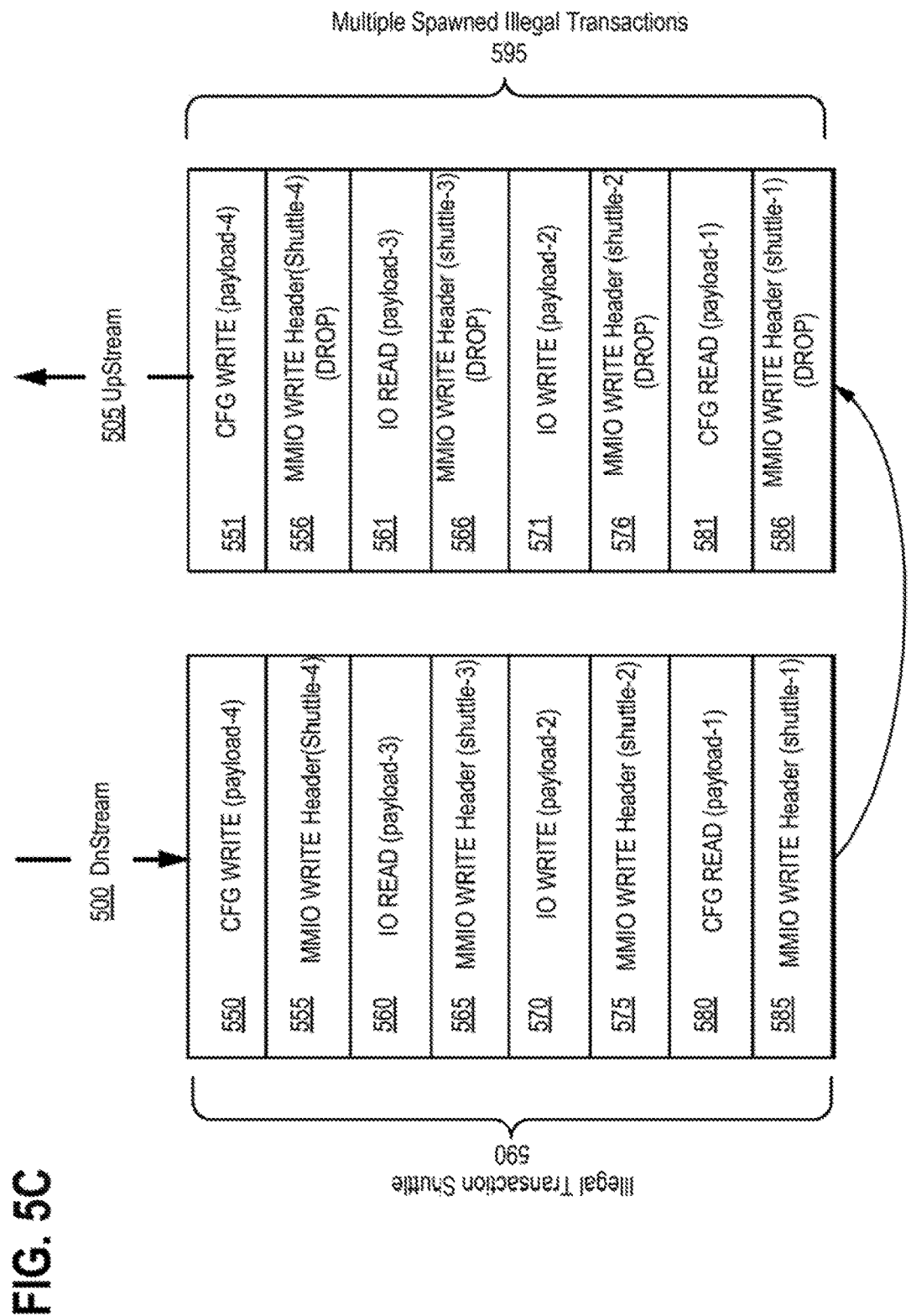
FIG. 5C depicts another exemplary transaction modification flow for the issuance of multiple illegal upstream transactions concurrently in accordance with described embodiments.

FIG. 5C depicts another exemplary transaction modification flow for the issuance of multiple illegal upstream transactions concurrently in accordance with described embodiments. As depicted, there is depicted both a downstream 500 and an upstream 505 direction.

According to the described embodiments, upstream protocol compliant transactions but downstream non-compliant transactions may be shuttled via the payload for issuance in the upstream or alternatively, malicious transactions may be shuttled and issued for the purpose of testing of hacking protection mechanisms or multiple transactions of any type may be shuttled and released concurrently on the upstream.

In such a way, an externally conducted malicious attack may be simulated via the shuttle and release of the known malicious messages for the purposes of ensuring correct functioning of the hacking protections. Without the shuttle, the malicious transactions would not survive the transmission through the downstream because the protocol layer would reject them as non-compliant, regardless of whether they are malicious or not, and as such, no test coverage would be provided.

By shuttling the transactions through the downstream for release into the upstream it is possible to bypass the downstream protocol layer and prevent the malicious transactions from being prematurely discarded.

Test writers may elect to issue multiple illegal transactions concurrently into the upstream. For instance, IO/CFG and RD/WR operations are illegal in the upstream and such transactions may therefore shuttled from the downstream via a legal downstream transaction to an upstream release agent such as the virtual devices for release on the upstream. Although multiple such illegal transactions are depicted here, it is permissible to issue only a single illegal transaction on the upstream which is shuttled behind a legal downstream transaction.

As depicted here, the virtual device strips away the headers and permits the multiple provided illegal transactions within the illegal transaction shuttle 590 to be issued concurrently as the multiple spawned illegal transactions 595. As depicted here, the illegal transaction shuttle 590 includes the four MIMO write headers which mask the illegal transactions such that they may pass through the downstream without interruption. These include the MIMO write header (shuttle-4) 555, the MIMO write header (shuttle-3) 565, the MIMO write header (shuttle-2) 575, and the MIMO write header (shuttle-1) 585 which in turn permit the illegal transaction shuttle 590 to carry the four illegal downstream transactions depicted here, including the CFG write (payload-4) 550 transaction, the IO read (payload-3) 560 transaction, the IO write (payload-2) 570 transaction, and lastly the CFG read (payload-1) 580 transaction.

The virtual device handling the incoming illegal transaction shuttle 590 strips away the MIMO write headers 556, 566, 576, and 586 which are indicated as being dropped and then permits the four payload transactions to be issued concurrently into the upstream, thus permitting each of the illegal downstream but legal upstream messages 551, 561, 571, and 581 to be concurrently issued as legal and permissible upstream transactions.

In accordance with one embodiment, test coverage for illicit instructions is provided so as to ensure correct handling of potentially malicious transactions such as those which may be introduced by a hacker or other malicious actor. For example, known malicious messages may be masked behind the valid MIMO write headers 555, 565, 575, and/or 585 as part of an illegal transaction shuttle. The CPU core modules and test controller will not issue such malicious instructions in the downstream as they are the units under test and their behavior is known, however, externally connected high speed serial devices such as DMI and PCIe devices will ultimately be coupled directly to the DMI and PCIe interfaces of the semiconductor device and such devices are not controlled and it is not known with certainty whether such devices will operate in a fully compliant manner or whether or not such devices may themselves be high-jacked and reprogrammed so as to cause malicious instructions to be issued directly into the upstream of the semiconductor device targeting the CPU processor cores, the memory, or other upstream components and circuitry.

Certain test cases therefore introduce known malicious transactions so as to validate proper handling. In order to permit malicious transactions to be issued into the upstream without having an externally connected PCIe or DMI device the known malicious transactions are hidden within the illegal transaction shuttle 590 behind the valid, legal, and permissible downstream transaction headers (e.g., MIMO write header 555). The virtual device of the PCIe and DMI interfaces will then strip away and drop the valid downstream headers causing the multiple spawned illegal transactions to be issued via loopback onto the upstream. However, such transactions are not merely illegal CFG and IO read/write transactions but are also malicious instructions utilized to simulate an attack and to validate hacking logic protections.

According to other embodiments, the payload of the shuttle carries within it another shuttle operation which thus provides for the ability to issue a large number of transactions at the virtual device from a single shuttle transaction issued by the test controller or the CPU module.

For instance, when such a transaction is processed by the virtual device, the shuttle header is stripped away and within the payload are multiple transactions ready for issuance on the upstream. However, rather than the payload transactions carrying traditional transactions such as vendor message transactions, memory transactions, and so forth, the payload transactions are additional shuttle operations which themselves have headers to be stripped away thus revealing yet additional shuttle operations within the payload of the original parent shuttle. In such a way, recursive or compound shuttle transactions encapsulating additional shuttle transactions may be utilized to spawn any number of operations in the upstream to, for example, cause a flooding condition or fill queues and buffers or test arbiters, prioritization schemes, buffers and queues, etc.

With such an embodiment, the parent shuttle operation dies or is killed off when the shuttle header is stripped away to reveal the child or subordinate shuttle operations carried in the payload of the parent shuttle operation. The process then repeats for each iteration of the shuttle operations spawned.

According to one embodiment, logic of the virtual device provides specialized handling for shuttle transactions to cause the inner transactions to be released and issued on the upstream rather than performing the transaction morphing and loop back operation described above for transactions that are converted from the downstream to the upstream on a 1:1 basis.

Figure 6A:
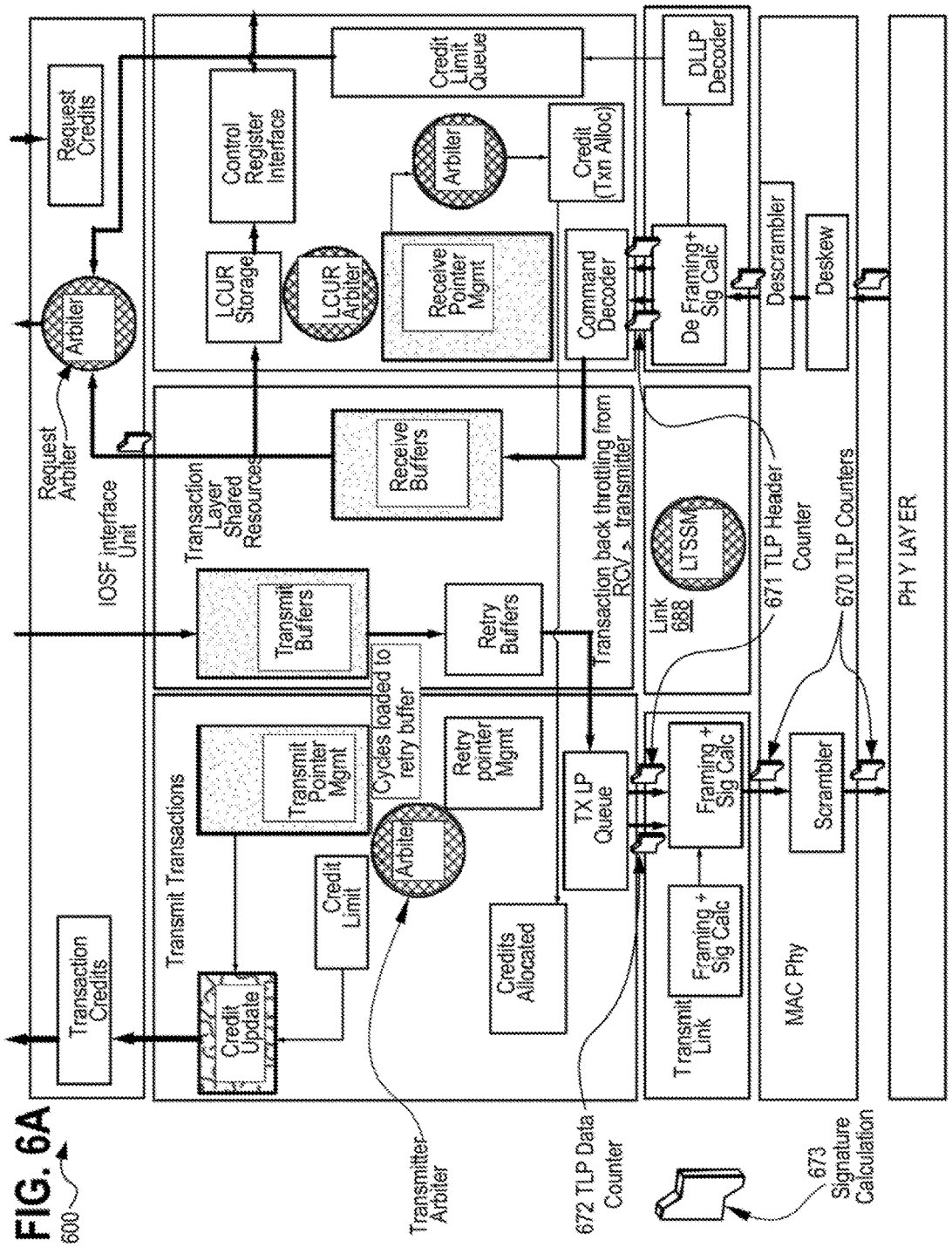
FIG. 6A depicts an exemplary Transmit and Receive Transaction Layer Protocol (TLP) Counter and Accumulator architecture in accordance with described embodiments.

FIG. 6A depicts an exemplary Transmit and Receive Transaction Layer Protocol (TLP) Counter and Accumulator architecture 600 in accordance with described embodiments.

High speed serial I/Os such as PCIe (Peripheral component Interconnect Express), OMI (Direct Media Interface), and SATA (Serial ATA Express) are utilized to drive system critical platform components including graphics cards. The I/Os additionally are utilized to interface between north bridge and south bridge semiconductor device 199 architectures and SSDs (solid state devices).

Serial IO connection technology requires matching and compatible devices. For instance, a fourth generation serial IO, such as a gen-4 PCIe interface requires a gen-4 high performance graphics card. As noted above, the need to test such serial IO's is complicated by the fact that compatible devices are generally not released until after the semiconductor devices having the interfaces are released to the market place, resulting in a type of chicken and the egg problem in which one cannot be made without the other.

As described herein, virtual devices are therefore utilized to negate the need for having such an externally provided serial device, such as a PCIe graphics card, for testing the PCIe interface and the various components of the semiconductor device 199 under test. The approach is equally applicable to SATA, OMI, DMI, and other serial interfaces.

In addition to providing more comprehensive test coverage by routing packages and transactions throughout the architecture of the semiconductor device 199 under test, there is additionally provided the ability to collect and compare test signatures captured via accumulators and DFx signature collection blocks positioned at design locations through out the semiconductor device 199 architecture which provide both greater visibility into the functioning for the purposes of debug and test but also collect test profile signature data which may be used to validate a semiconductor device 199 as pass or fail on a per-unit basis.

Corruption of Transaction Layer Protocol (TLP) packets and messages as they flow through the architecture of a semiconductor device 199 presents a serious challenge for HVM testing and debug due to low visibility of the TLP packages on available monitoring ports. Additional taps are therefore disclosed. TLP package accumulators and counters are provided at various location across the architecture to ease the HVM debug and help to isolate failing regions and sequence TLPs that become corrupted and consequently fail the accumulator's known good signature pattern.

Three types of TLP counters are provided including the TLP Header Counter 671, TLP Data Counter 672, and the TLP Counter 670, all of which contribute to signature collection 673. TLP Header counter 671 counts the number of TLP Headers transmitted and received. Because PCIe IP TLP packet processing operates on a basis of one header per clock cycle, each TLP Header count 671 corresponds to a number of TLP packets being transmitted and received. TLP Data Counter 672 counts the number of data phases transmitted. If the TLP packet contains more than a single data phase, then the exact number of data phases will be recorded via TLP Data Counter 672. TLP packets which do not have payload data but which support end to end CRC will still increment the TLP Data Count 672 by 1, and TLP packets without payload and without end to end CRC support will not increment TLP Data count 672. Lastly, the TLP counter 670 counts the number of TLP package being transmitted and received, regardless of whether or not the TLP packets are transmitted and received with or without payload data.

According to a particular embodiment, the various counters 670, 671, and 672 are directly to the serial configuration data path so as to provide observation and signature collection 673 capabilities at all key junctions and transaction intersection areas so as to provide the maximum possible coverage and visibility. For instance, as depicted here, observation blocks are attached inside the serial IO protocol layers for improved device observation and debug capabilities.

According to described embodiments, the architecture 600 implements both TLP0 and TLP1 paths via a ping-pong architecture. Accordingly, the transmitter TLP is deterministic on pre-silicon to post silicon so long as the number of TLP packets observed at link 688 up to L0 are identical which may be evaluated via the TLP Header Counter 671, TLP Data Counter 672, and the TLP Counter 670.

Figure 6B:
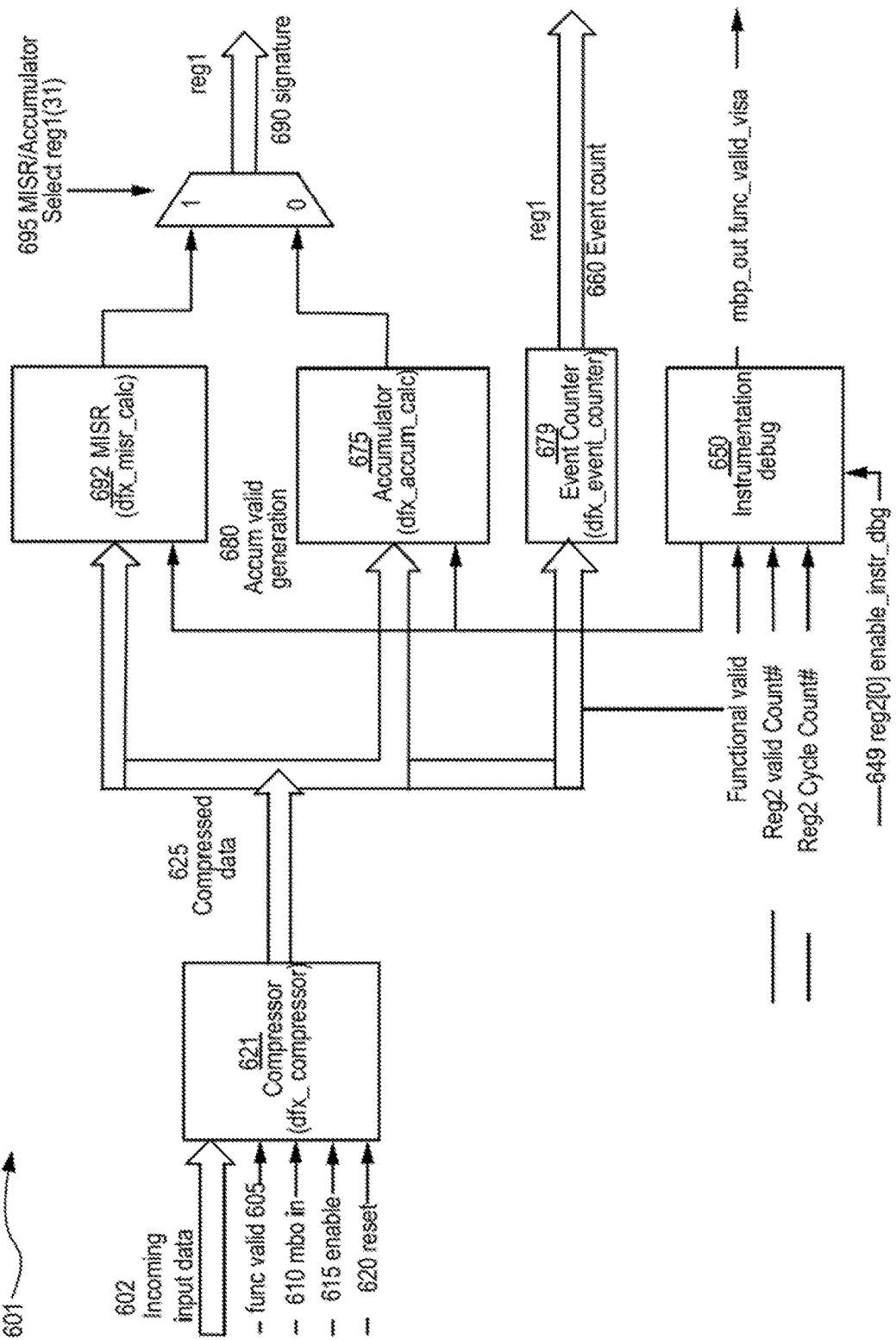
FIG. 6B depicts an exemplary virtual device observation and debug network which operate in conjunction with the Transmit and Receive Transaction Layer Protocol (TLP) Counter and Accumulator architecture depicted at FIG. 6A in accordance with described embodiments.

FIG. 6B depicts an exemplary virtual device observation and debug network 601 which operate in conjunction with the Transmit and Receive Transaction Layer Protocol (TLP) Counter and Accumulator architecture 600 depicted at FIG. 6A in accordance with described embodiments.

In particular, there are specifically depicted the data compressor 621, the accumulator 675, MISR 692, event counter 679, and instrumentation debug 650.

The data compressor 621 provides data compression for the incoming input data 602 depicted as the functional valid 605 signal, the mbo in 610 signal, the enable 615 signal, and the reset 620 signal. Compressed data 625 is then output by the compressor and provided to the subsequent blocks as shown.

If necessary, the compressor 621 may provided gated clock data to the subsequent blocks including generating valids 680 from the enable, override, and micro break point signals as required.

The accumulator 675 and MISR 692 then provide signature collection for every valid event observed through the MISR/Accumulator selection register 695 and output signature 690. The MISR 692 provides signature collection for every valid event but in an order dependent manner.

The event counter 679 counts the number of valid events in the signature collected thus far and outputs event count 660 which provides helpful information for the purposes of pre and post silicon debug.

Instrumentation debug 650 collects silicon emissions for back-end debug including taking corresponding inputs and modifying the enables 649 for signature collectors.

Figure 7A:
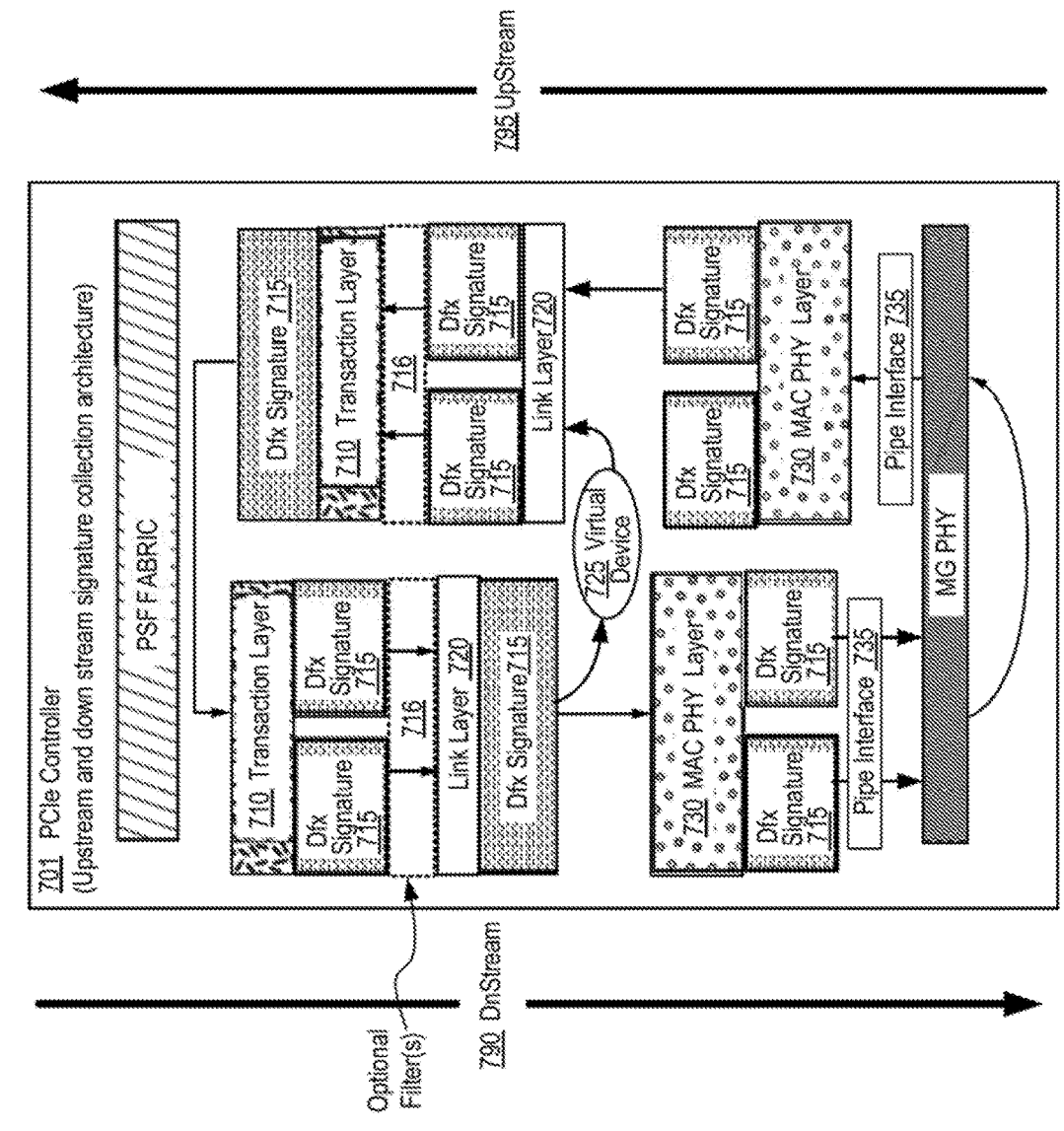
FIG. 7A depicts an another signature collection architecture in accordance with described embodiments.

FIG. 7A depicts another signature collection architecture 700 in accordance with described embodiments. In particular, it is additionally depicted the locations of accumulators in a PCIe controller 701 which implements the necessary functionality for upstream and downstream signature collection as shown.

It is important for the semiconductor device 199 and the PCIe controllers 701 to implement designs which provide for both comprehensive test coverage and also observability. Design fabrics and IP components are built for flexibility but are tend to be non-deterministic. Conventional cycle by cycle based signature collection is therefore not a reliable option in modern designs. Modern designs require viable signature capture and observability so as to ensure both the semiconductor device 199 and also PCIe controllers 701 meet DFx HVM objectives. The depicted PCIe controller 701 provides accumulator instances that are "transaction order agnostic," non-determinism tolerant, and which additionally provide a viable observation mechanism.

As depicted, DFx signature collection 715 is provided at numerous points within the PCIe controller 701. According to described embodiments, the PCIe controller 701 includes data accumulators on each layer. As shown transaction layers 710 include DFx signature 715 blocks, link layer 720 includes DFx signature 715 blocks, and the MAC Physical layer 730 includes DFx signature 715 blocks. DFx signature 715 blocks are provided at the respective interfaces in both up and down stream logic. Providing the DFx signature 715 blocks in the manner depicted not only aids HVM but additionally facilities debug activities when necessary to identify the failing portion of the logic. Transaction layer 710 and link layer 720 both include accumulators on the (i) Header and (ii) data portion of the logic while the MAC physical layer 730 provides accumulators on the pipe interfaces 735.

Additionally depicted is the virtual device 725 which is communicably interfaced between the DFx signature 715 block of the link layer 720 in the downstream 790 on the left hand side and looping back to the link layer 720 in the upstream 795 direction.

According to the described embodiments the DFx signature 715 blocks implement accumulators of various designs. As depicted here, each of the accumulator sets at both the transaction layer 710 and also the link layer 720 include two distinct types of accumulators, as implemented by the DFx signature 715 blocks shown. For instance, each of the link and transaction layers implement both accumulators on the header path and also accumulators on the data path. At the transaction layer, the accumulators then collect via the DFx signature 715 blocks headers, data payloads, and TLP CRC values. At the data link layer 720, the accumulators then collect via the DFx signature 715 blocks TLP packages and also LCRC values.

According to certain embodiments, Sequence-ID fields are not collected as they are non-deterministic.

Filters may be employed via the accumulators implemented by the DFx signature 715 blocks to avoid collection of certain data. For instance, filters may filter out non-deterministic packet data including any one or more of: (i) Training sequences, (ii) SKIPS, (iii) scrambled NOPS, and (iv) IDLEs.

According to certain embodiments, each of the accumulators, as implemented by the DFx signature 715 blocks, include both data collection logic and event counter logic. The data collection logic collects data on valid events and the event counter logic counts the number of valid events for which the data collectors has accumulated data.

For instance, DFx signature 715 may collect signature data via its accumulator as follows: On a valid event input the data Logic is Xor'ed and then summed. Because the incoming data vary large in size, it is compressed using Xors. Next, the logic in each stage and division of stages is condensed based on the computing period of a pipeline. Optionally, flop stages may be added if necessary to match timing requirements. According to certain embodiments, multiple pipelines generate signature data via DFx signature 715 blocks and only data from common pipelines are summed, thus resulting in multiple accumulator values and DFx signatures for each of the respective pipelines. According to certain embodiments, all incoming signals should have an equal number of pipe line stages.

Computed Xor data is then stored in a register that is clocked by the local clock and internally gated to save dynamic power. Summing logic sums the incoming data for each respective pipeline signal such that $F(n+1)=f(n)+f(n-1)$, and for which the result is commutative.

A functional valid provides the option to choose either an event based functional valid signal for HVM pass/fail determination or a clock by clock accumulation to support laser probing tools. All functional valid signals being used in the accumulators are then sent to the test controller or test interface for use in pass/fail determinations or as triggers for probing tools.

Because the pipeline topology differs from one semiconductor device 199 under test to another, a register set corresponding to the lane topology for any given semiconductor device 199 will also change from one to another. Therefore, a standardized register set mapping is provided according to described embodiments which permits the register set to scale and be applied to any conforming semiconductor device under test.

According to certain embodiments, state machines are further provided for link training, flow control, status, scrambling, and descrambling.

Figure 7B:
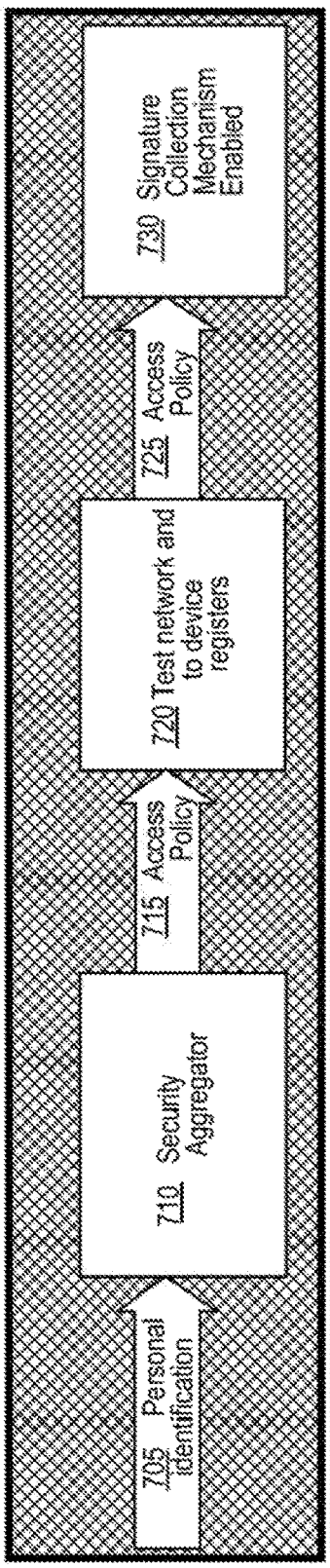
FIG. 7B depicts a security mechanism for the signature collection architecture depicted at FIG. 7A, in accordance with described embodiments.

FIG. 7B depicts a security mechanism 701 for the signature collection architecture 700 depicted at FIG. 7A, in accordance with described embodiments. In particular, there is a security mechanism 701 provided for the DFx signature blocks so as to ensure access is restricted to legitimate testing needs. In accordance with one embodiment, during test there is a requirement to enter personal identification 705, which is then provided to the security aggregator 710 and processed through an access policy 715. The personal identification credentials and the access policy are then sent to the test network and to the device registers (of the semiconductor device 199) as depicted at element 720. Authentication is then processed based on the access policy as depicted at element 725 and the signature collection mechanism is enabled as depicted at block 730. According to certain embodiments, the registers of the semiconductor device are programmed pursuant to authentication with the access policy 725 such that the signature collection may be enabled for that boot session. According to another embodiment, a security password is required to be input at boot time for the semiconductor device 199. According to a particular embodiment, the password must be entered via a testing interface on the semiconductor device 199 as is depicted at element 156 of FIG. 1E.

According to a particular embodiment the semiconductor device 199 implements secure debug and secure data collection and packet observation so as to prevent non-authorized users from accessing the functionality. For instance, the functionality is intended for manufacturing and therefore security policies are implemented which requires a user to enter a secure password at boot time of the semiconductor device.

One the password is entered the semiconductor device 199 permits read access to the registers where the test signatures and counters are accumulated. For instance, regular boot may activate a green security policy in which normal functionality for end users is provided. Orange policy may unlock certain features for authorized vendors. A red policy may activate a manufacturing mode which requires the manufacturing security password. According to certain embodiments the password required by the security policy is a secure and encrypted token passed from a manufacturing test bed for the semiconductor devices through a test interface. For instance, it may be the case that individual in manufacturing knows the password, but rather, connecting the semiconductor device 199 under test to the manufacturing test bed enables the activation of the features via the security policy as the secure token is accessible from the test bed.

Figure 8A:
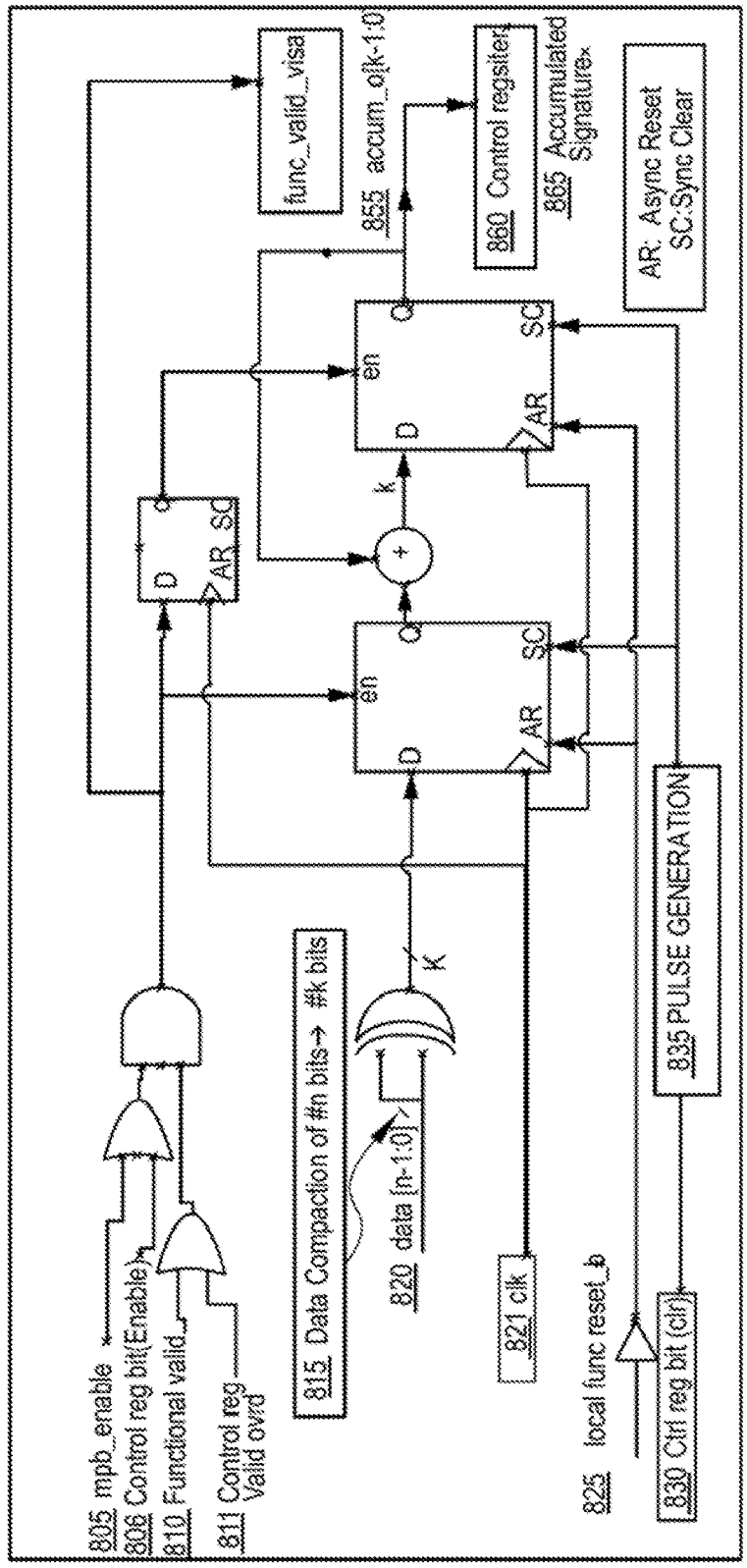
FIG. 8A depicts an accumulator in accordance with described embodiments.

FIG. 8A depicts an accumulator 800 in accordance with described embodiments. In particular, there is shown within the accumulator 800 various input signals including, for example, mpb enable 805, control register bit enable 806, functional valid 810, and control register valid override 811. As can be seen, the signals are or combined or consolidated to form a single input signal with a particular signature based on the combination of inputs. Still further provided are data compaction of #n bits to #k bits at element 815 resulting in the input data signal shown at element 820. Clock signal 821 is additionally input as are any local functional reset_b signals at element 825 and control register bit clears at element 830 which are combined with pulse generation at element 835.

Resulting output is the accumulation signal at element 855 which is provided to control register 860 to record the accumulated signature 865 as shown.

In accordance with particular embodiments, test signatures are collected to establish a pass/fail mechanism for the semiconductor devices under test. For instance, traffic flows through the various components of the semiconductor device 199 and generates certain signatures through the interactions of the transactions which are caused to be issued by a test profile and a resulting signature is then compared with a known good or "golden" silicon device. In certain embodiments, a known good signature is generated through simulation and modeling of the semiconductor device. In other embodiments, a known good signature based on or taken from physical semiconductor devices having been manufactured and validated.

With the previously described capabilities it is possible to collect not only signature data from the semiconductor device itself but also from the manner in which the semiconductor device interacts with various serial controllers such as PCIe, DMI, SATA, and UFS serial controllers. The signature data may be collected from the semiconductor devices under test even in the absence of such serial controllers by emulating the functions of the serial controllers and causing the semiconductor device to interact with the virtualized devices.

According to certain embodiments, the semiconductor device 199 further includes a host complex or a Platform Controller Hub (PCH) in addition to the CPU core modules. Such a host complex may additionally include a CPU and may additionally be utilized to generate transactions which are then transmitted to one of the virtual devices so as to further increase test coverage of the device under test.

For the purposes of signature generation it is necessary to select a path amongst the various components which is deterministic, meaning that it can be known with certain which components are touched or through which components the transactions and messages are routed as well as what component responds to known transactions. It is additionally needed that when data is provided with a responsive transaction, such as in reply to a memory read, that the proper data is returned, hence the use of known simulated data for the purposes of testing.

Accordingly, a test profile causes the issuance of known transactions from a known originator (such as the test controller, test interface, or one of the CPU core modules) and then causes the transaction to follow a deterministic path, such as over the fabric to a virtual device and then on to the memory controller at which point the auto response mechanism responds with, for example, an acknowledgement of a memory write or with data responsive to a memory read, and then with the responsive message traversing the path again back through the virtual device and then to the originator of the initial upstream transaction initiated at the behest of the test profile.

Every point of interaction causes various signals to be input and output, registries touched and/or updated, and data to be transacted. If the identical set of transactions are issued a first time on a correctly functioning (e.g., "golden" or known good) silicon device, then those same transactions issued a second time should cause identical behavior, identical input and output signals, identical touching and updating of registers, and identical data to be transacted.

The accumulators 800 capture these signals and generate a test signature for the given transactions which must be identical every time the semiconductor device operates with the same set of transactions. In such a way, a deterministic pass or fail result may be issued.

The pass or fail result is determined by comparing the resulting test signature generated by the accumulators 800 with a corresponding test signature from a known good or golden silicon device if one is available or from a modeled but identical silicon device which is operated through simulation to execute the test profile and the series of transactions so as to generate and output the test signature for the purposes of comparison with actual units undergoing testing and for which the pass fail status is not yet known.

According to a particular embodiment, simulated data, including that which is carried within a write transaction payload and that data which is returned by the auto response mechanism in reply to a memory read transaction constitutes generated deterministic pseudo random data. Because the data is deterministic, consistent signature data may be collected by the counters and accumulators for the purposes of generating a test signature from units under test for comparison to a known good test signature.

According to certain embodiments, signature data is captured at junctions and data taps where the accumulators 800 are connected with the semiconductor device's 199 fabric. For instance, signature data may be captured via accumulator when the CPU core module generates a downstream transaction directed toward an externally connected component, such as a DMI or PCIe device which the CPU observes to be connected with the respective DMI or PCIe interface respectively. The CPU need not be aware that no such externally connected component is connected with the semiconductor device's 199 serial controller interfaces. Rather, signature data may be gathered at points along the path of the fabric where the transaction originating at the CPU core module passes a counter or accumulator through the various junctions. At each point, the signal is captured and summed or integrated.

In other embodiments, signature data is gathered from transactions traversing the fabric of the semiconductor device 199 having originated at a test controller. In other embodiments, an externally connected test controller is connected via a test interface of the semiconductor device 199 which is connected with the fabric of the semiconductor device and the signature data is gathered from the transactions traversing the fabric of the semiconductor device for transactions having originated at the externally connected test controller or test bed, in which the transactions are injected into the fabric of the semiconductor device via the test interface.

Figure 8B:
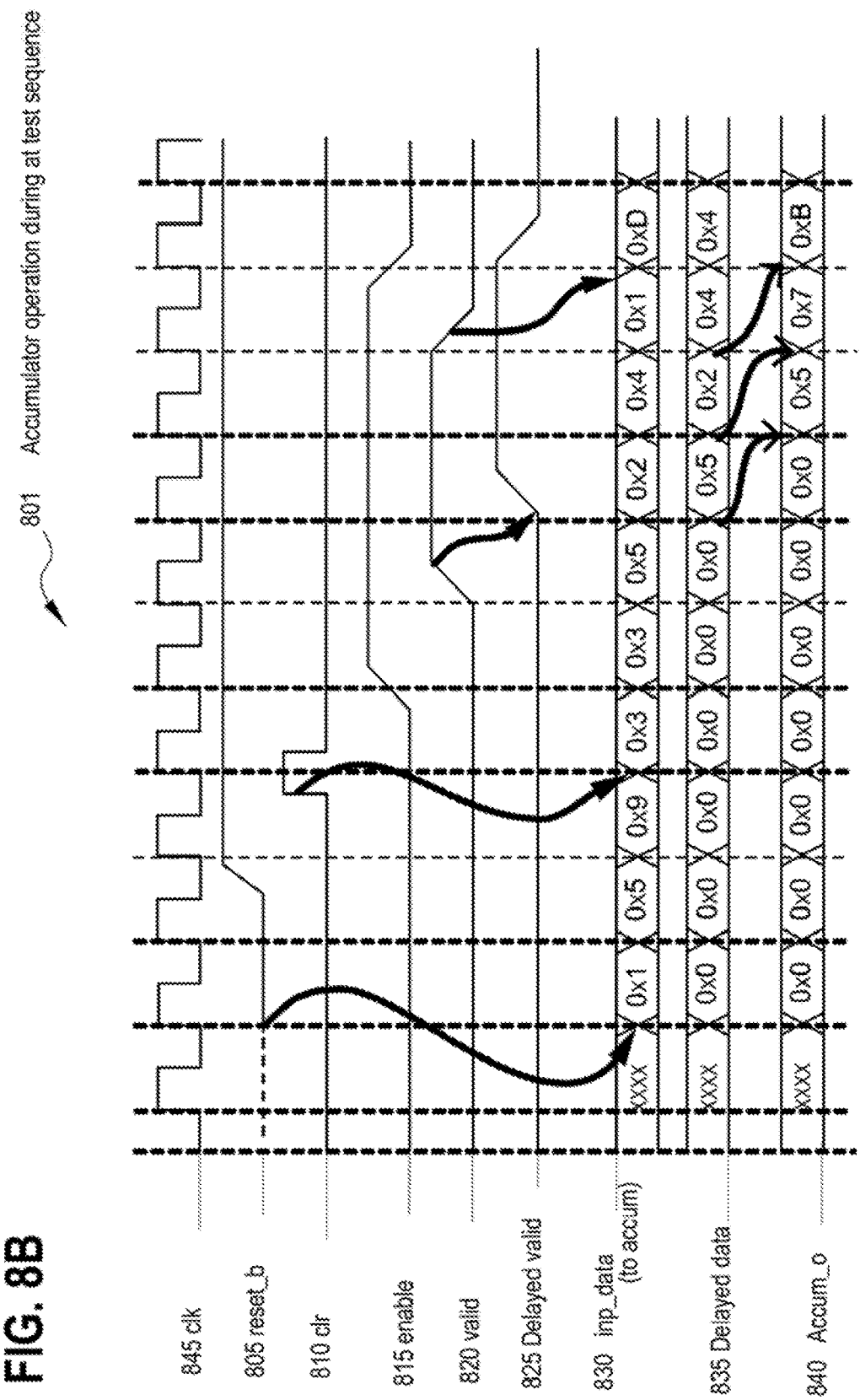
FIG. 8B depicts accumulator operation during a test sequence in accordance with described embodiments.

FIG. 8B depicts accumulator operation during a test sequence 801 in accordance with described embodiments. In particular, there is depicted multiple distinct waveform signals including each of clock 845, reset 805, clear 810, enable 815, valid 820, delayed valid 825, input data to the accumulator 830, delayed data 835, and accumulator output 840.

The depicted interfacing waveform are enabled via the above described iATM TLP header count and TLP data count accumulators. As depicted here, accumulators may function on the transmit side or the receive side or both, and more likely, both the transmit and the receive sides. According to certain embodiments, there may be only a single TLP package counter located between a link layer to the physical layer interface. Because the TLP header and data boundaries are not distributed to independent busses with the Prefix, Header and Data being formatted into the same TLP package, only a single TLP package counter is required to count the number of TLP packages transmitted.

Depending on a PIPE interface data bus width, and the maximum link width, the number of TLP packages per clock may vary. For instance, certain semiconductor devices 199 may process 2-byte or a 4-byte quantities per clock cycle.

In other embodiments there is both a single TLP header counter and also a single TLP data counter between the link to transaction layer boundary for each and every TLP path implemented by the semiconductor device 199. In embodiments where the controller supports two TLPs path, the controller will utilize two sets of TLP header and data counters with one set of the counters positioned upon each of the respective TLP paths provided.

Where parallel data TLP data paths are provided, such as a TLP0 path and a TLP1 path it is possible for the TLP counters to increment simultaneously which is permissible behavior.

Unlike the transmit transaction layer to link layer interfaces described previously, the receive link layer to transaction layer is not a ping-pong interface. Accordingly, the link layer will align the TLP to the lower bus when possible and when there is more than one TLP bus supported. Consequently, a non-deterministic count will result for pre-silicon validation versus post-silicon validation as the post-silicon validation may have more DLLP packets transmitted due to the TLPs received period change and the TLP's alignment between TLP busses 0 and 1 will change. Care should therefore be taken to ensure deterministic counts are realized including implementation of the optional filters or truncation algorithms as necessary.

According to described embodiments collected test signatures are utilized to determine whether or not the processing of the transactions through the various components and along the various fabrics and paths throughout the semiconductor device are handled correctly and in a deterministic and consistent manner which thus indicates a passing result for the semiconductor device under test.

As transactions are processed by the silicon components there are monitors, accumulators, and counters which silently monitor and collect the various pieces of information associated with the traffic being processed at those monitor points, such as junctions and transitions.

According to described embodiments, a test signatures is collected for every single semiconductor device fabricated through the manufacturing process as part of a final platform validation test. Those signatures should be identical for common or identical semiconductor devices running the identical test profile.

According to one embodiment, the test signatures of units under test are compared with a so called "golden" value or with the test signature from a "golden" and thus known good semiconductor device of the same type having run the same test profile.

By comparing the resulting test signature for units under test with the known good test signature a pass/fail result may be attained for every semiconductor device under test on a per unit basis.

If the test signature of a unit under test does not match, then it may be pulled from production as a failing unit and evaluated further to determine the root cause of the failing condition.

A golden value, golden test signature, or a known good test signature by which to compare the resulting test signatures of the units under test may be acquired from either a manufactured semiconductor device evaluated to be good various testing means or based on pre-silicon simulation modeling such as register-transfer level (RTL) simulation modeling the semiconductor device under test. With RTL simulation, the test profile may be executed against the simulated model to attain the golden signature and then manufactured units undergoing test via the same test profile will yield a test signature which may then be compared with the test signature obtained from the simulation.

RTL simulation obtained signatures may be useful for new products initially undergoing validation testing and signatures taken from known good units may be useful once the product matures somewhat and thus permits a test signature to be taken from a physical unit rather than a simulation.

For instance, when silicon first comes to the laboratory there are no golden units from which to obtain a test signature for comparison and therefore RTL simulation would be utilized to generate a known good test signature. After a few weeks or months of silicon fabrication, a physical unit may instead be utilized to generate the test signature for use as a golden signature.

While useful, the RTL simulation generated test signature is extremely time consuming to generate. Each time the test profile or test sequencing is modified in any way, the resulting signature will also change, and therefore, the test profile needs to be re-run through the simulation. The simulation operates in a precise and correct manner, but because it is a software model of the semiconductor device it is extremely slow.

Conversely, the physical semiconductor devices fabricated will execute the test profile very fast and generate a test signature in a much shorter amount of time. Therefore, if a known good physical unit is available it may be more preferred as the test signature may be obtained much faster than possible with the RTL simulation.

When a semiconductor device under test does fail due to its non-matching test signature with that of a golden test signature it is further in accordance with described embodiments that sub-sets or sub-portions of the golden signature may be utilized for the purposes of debug. For instance, by comparing sub-test profiles or portions of a test sequence against a corresponding portion of the test sequence run against a known good or golden unit, it is possible to generate a test signature for comparison to a golden unit's corresponding test signature for any customizable sub-set of a test sequence. Because the test sequences exercise different components and different portions of the fabric the semiconductor device, through a series of deductive operations it is possible to narrow down and ultimately pinpoint the failing instruction or failing transaction having generated a non-matching test signature and then correlate that failing instruction or transaction to a particular component of the semiconductor device.

According to the described embodiments, execution of the test profiles constitutes execution of hundreds of thousands or millions of transactions and operations, each of which generate signals and data at each of multiple observation points via the accumulators, counters, and monitors. It may be infeasible to collect all of the potentially billions of bits of data for the purposes of comparison and therefore the accumulators implement combinational logic to mux or merge or otherwise combine signals into a smaller signature.

For instance, if one signal provides 16 bits of data at an observation point after running the transaction but there are millions of transactions processed and data is collected at hundreds or thousands of observation points the data would be unwieldy. However, by consistently sampling a portion to the data and merging it and compressing it through a compression network there will ultimately be a unique signature representing a particular test execution for the unit under test corresponding to a specific test profile.

The test signature is not intended to represent all of the data which was utilized to create the signature as the compression and combinational logic results in significant data losses. Rather, the test signature is intended to represent a value which is unique to that particular test execution. If the test profile changes its operations or the data inputs for the test profile change or the unit under test fails to perform an operation correctly, then the test signature will be corrupted and fail to match at the test signature comparison stage.

In such a way, the test signature is akin to a cyclic redundancy check (CRC) code utilized not to represent the data from which the code was created but rather to represent the consistency of underlying raw data across multiple instances or copies.

According to one embodiment, the accumulator operates via cumulative operations in which the exemplary 16 bit outputs collected for each transaction at each observation point are iteratively summed, cycle after cycle, for the entire execution of the test profile.

According to one embodiment, the accumulator operates via a Multiple Input Serial Response (MISR) function in which the exemplary 16 bit outputs collected for each transaction are accumulated to a register.

According to another embodiment, image periods are observed in which the observation points only collect data for cycles occurring at specified durations or intervals with the remainder of the cycles outside of the image period occurring without observation or at least without the accumulator collecting and updating the test signature based on such non-imaged cycles.

For instance, it may be that for the purposes of debug a user wishes to collect a test signature for only cycles which occur between test profile operations 200 through 300. Therefore, the user may initiate the test sequence and select only those operations to be imaged, such that operations of the test sequence outside of the image period corresponding to the specified sequence of operations at 200 to 300 are not contributing to the test signature. If the identical test sequence is imaged for cycles 200 to 300 on a known good or golden semiconductor device then the two signatures from the unit under test and the golden semiconductor device may be compared to verify if that portion of the test sequence at cycles 200 to 300 results in a fault or failure mode for that particular unit under test. If the test signatures match, then any fault attributable to that unit must have occurred in a different portion of the test sequence. Iteratively running portions will aid the user in debug by narrowing down the fault causing portion of the test profile.

According to another embodiment, the TLP Header Counter 671, TLP Data Counter 672, and the TLP Counter 670, of FIG. 6A all of which contribute to signature collection 673. For instance, another pass/fail value available for the unit under test is the number of transactions processed or observed for any of the counters. If the number of transactions for a unit under test does not match the expected number of transactions processed for a known good silicon device then the unit has failed. If the number of packets or transactions does not match according to the counters then different debug of the semiconductor device 199 may be performed than in the case of a failure mode attributable to a faulty signature created by the accumulator. For instance, a mismatch of packets indicates a problem with receiving or transmitting the packets by the fabric which is a different kind of failure mode than processing a correct number of packets, but doing so in an unexpected manner resulting in a corrupted test signature output by the accumulator (accum_o at element 855 of FIG. 8A).

Figure 9:
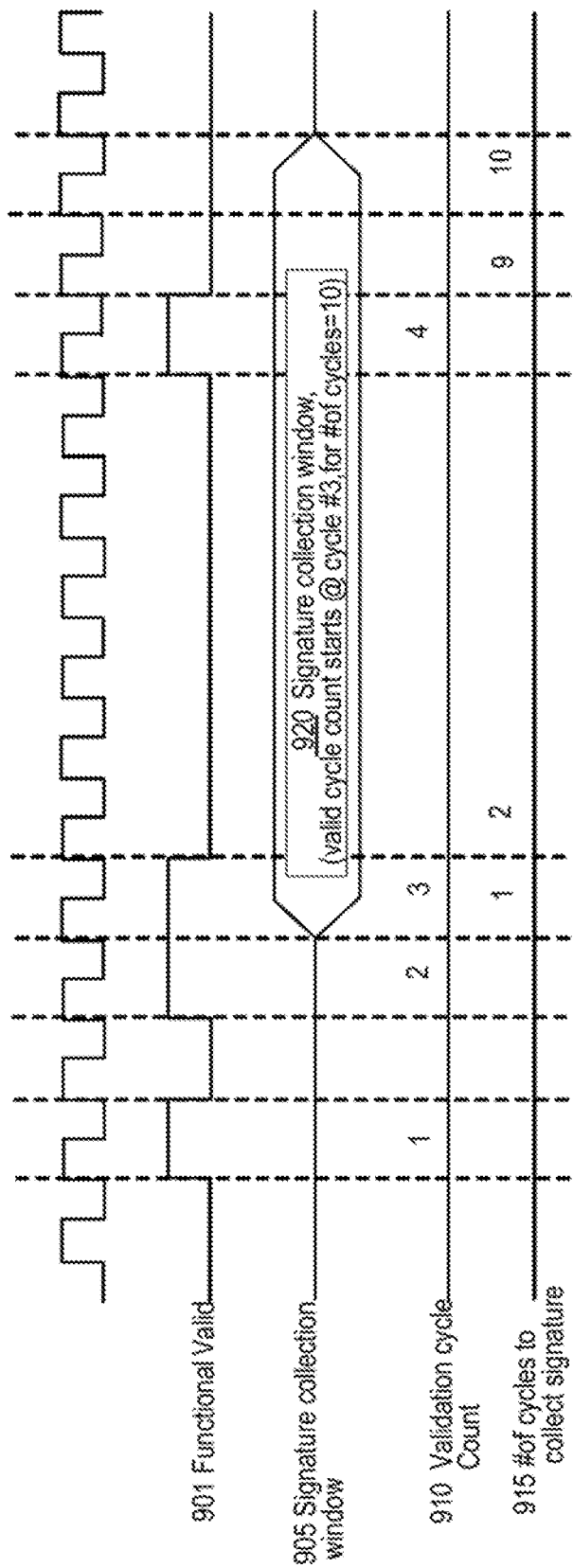
FIG. 9 depicts failing component isolation and debug in accordance with described embodiments.

FIG. 9 depicts failing component isolation and debug 900 in accordance with described embodiments. For instance, where a test profile identifies a failure for a semiconductor device or silicon under test, the virtual device debug infrastructure may be utilized to narrow down and zero in on the precise location and mode of failure by cycling through a binary search function triggering signature collection from cycle N to K cycles in which cycle #N and cycle #K are programmable and permit a wide range or a small or even single cycle debug range. The data is then compared with the known good signature values to determine if the cycle range specified is a pass or a failure. The operations may be repeated by iteratively cycling through initially a large range and then smaller and smaller ranges until the failure mode is determined. For instance, half of a test profile may be run, determine which half the failure mode occurred in, and then half of the half that failed may be re-run again, to determine if the failure mode is present in the portion run or the portion not run. Iterating through the test portions the test cycles may be reduced from a large number to a small number until the failure mode and cycle is determined. Laser instruments may additionally be utilized for the suspect devices to identify the faulty functional paths and corresponding devices.

Consider a particular test case example of a failing unit in which there were 15 total packets counted and the golden silicon indicates 15 packets for that test profile or that portion executed. Because the count matched but the unit failed it is then necessary to determine which cycle amongst an exemplary 1000 cycles corrupted the signature.

A user may therefore debug by choosing sub-sets of cycles to execute and correspond those to the golden silicon or the user may execute a debug test profile which algorithmically performs the processing. Like peeling an onion, the debug process seeks to isolate the cycle through a process of elimination. For example, cycles zero to 500 may be executed and if the signature is corrupted then those cycles include the fault, otherwise it is in cycles 501 to 1000. Then cycles zero to 250 may be executed and again, if those cycles have a corrupted signature then those cycles include the fault, otherwise the fault is in cycles 251 to 500. By repeating the process the cycle having caused the fault can be identified.

Figure 10:
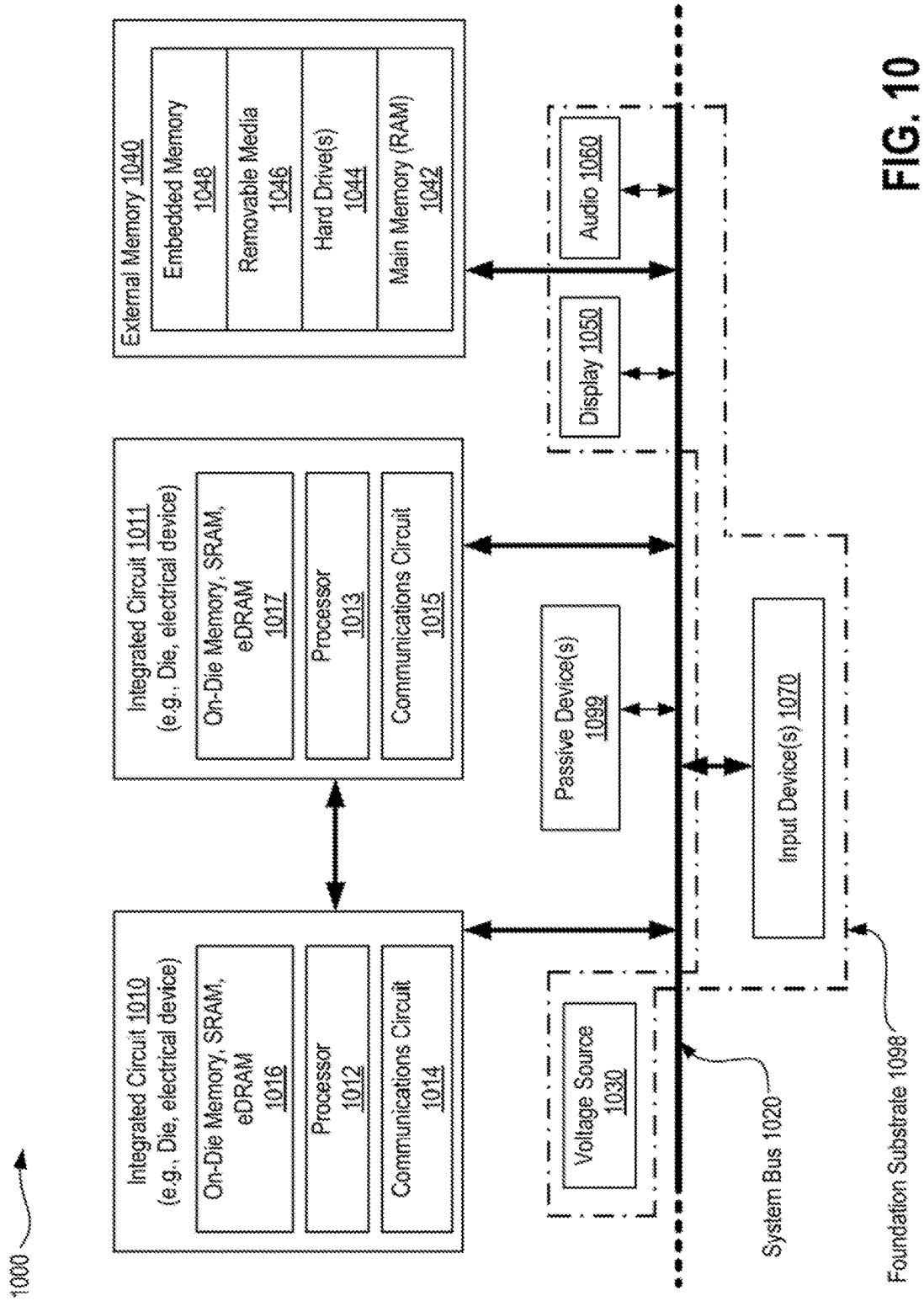
FIG. 10 is a schematic of a computer system in accordance with described embodiments.

FIG. 10 is a schematic of a computer system 1000 in accordance with described embodiments. The computer system 1000 (also referred to as the electronic system 1000) as depicted can embody high speed serial controller testing means as well as means for implementing SoC coverage through virtual devices in PCIe and DMI controllers and means for implementing virtual device observation and debug network for high speed serial IOS, according to any of the several disclosed embodiments and their equivalents as set forth in this disclosure. The computer system 1000 may be a mobile device such as a net-book computer. The computer system 1000 may be a mobile device such as a wireless smart phone or tablet. The computer system 1000 may be a desktop computer. The computer system 1000 may be a hand-held reader. The computer system 1000 may be a server system. The computer system 1000 may be a super-computer or high-performance computing system.

In accordance with one embodiment, the electronic system 1000 is a computer system that includes a system bus 1020 to electrically couple the various components of the electronic system 1000. The system bus 1020 is a single bus or any combination of busses according to various embodiments. The electronic system 1000 includes a voltage source 1030 that provides power to the integrated circuit 1010. In some embodiments, the voltage source 1030 supplies current to the integrated circuit 1010 through the system bus 1020.

Such an integrated circuit 1010 is electrically coupled to the system bus 1020 and includes any circuit, or combination of circuits according to an embodiment. In an embodiment, the integrated circuit 1010 includes a processor 1012 that can be of any type. As used herein, the processor 1012 may mean any type of circuit such as, but not limited to, a microprocessor, a microcontroller, a graphics processor, a digital signal processor, or another processor. In an embodiment, the processor 1012 includes, or is coupled with, electrical devices having gradient encapsulant protection, as disclosed herein.

In accordance with one embodiment, SRAM embodiments are found in memory caches of the processor. Other types of circuits that can be included in the integrated circuit 1010 are a custom circuit or an application-specific integrated circuit (ASIC), such as a communications circuit 1014 for use in wireless devices such as cellular telephones, smart phones, pagers, portable computers, two-way radios, and similar electronic systems, or a communications circuit for servers. In an embodiment, the integrated circuit 1010 includes on-die memory 1016 such as static random-access memory (SRAM). In an embodiment, the integrated circuit 1010 includes embedded on-die memory 1016 such as embedded dynamic random-access memory (eDRAM).

In accordance with one embodiment, the integrated circuit 1010 is complemented with a subsequent integrated circuit 1011. Useful embodiments include a dual processor 1013 and a dual communications circuit 1015 and dual on-die memory 1017 such as SRAM. In accordance with one embodiment, the dual integrated circuit 1010 includes embedded on-die memory 1017 such as eDRAM.

In one embodiment, the electronic system 1000 also includes an external memory 1040 that in turn may include one or more memory elements suitable to the particular application, such as a main memory 1042 in the form of RAM, one or more hard drives 1044, and/or one or more drives that handle removable media 1046, such as diskettes, compact disks (CDs), digital variable disks (DVDs), flash memory drives, and other removable media known in the art. The external memory 1040 may also be embedded memory 1048 such as the first die in a die stack, according to an embodiment.

In accordance with one embodiment, the electronic system 1000 also includes a display device 1050 and an audio output 1060. In one embodiment, the electronic system 1000 includes an input device 1070 such as a controller that may be a keyboard, mouse, trackball, game controller, microphone, voice-recognition device, or any other input device that inputs information into the electronic system 1000. In an embodiment, an input device 1070 is a camera. In an embodiment, an input device 1070 is a digital sound recorder. In an embodiment, an input device 1070 is a camera and a digital sound recorder.

As shown herein, the integrated circuit 1010 can be implemented in a number of different embodiments, including a package substrate or a semiconductor package having therein high speed serial controller testing means as well as means for implementing SoC coverage through virtual devices in PCIe and DMI controllers and means for implementing virtual device observation and debug network for high speed serial IOS, according to any of the several disclosed embodiments and their equivalents, an electronic system, a computer system, one or more methods of fabricating an integrated circuit, and one or more methods of fabricating an electronic assembly that includes a package substrate or a semiconductor package having therein high speed serial controller testing means as well as means for implementing SoC coverage through virtual devices in PCIe and DMI controllers and means for implementing virtual device observation and debug network for high speed serial IOS, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed package substrates and semiconductor packages having high speed serial controller testing means as well as means for implementing SoC coverage through virtual devices in PCIe and DMI controllers and means for implementing virtual device observation and debug network for high speed serial IOS embodiments and their equivalents. A foundation substrate 1098 may be included, as represented by the dashed line of FIG. 10. Passive devices 1099 may also be included, as is also depicted in FIG. 10.

Figure 11:
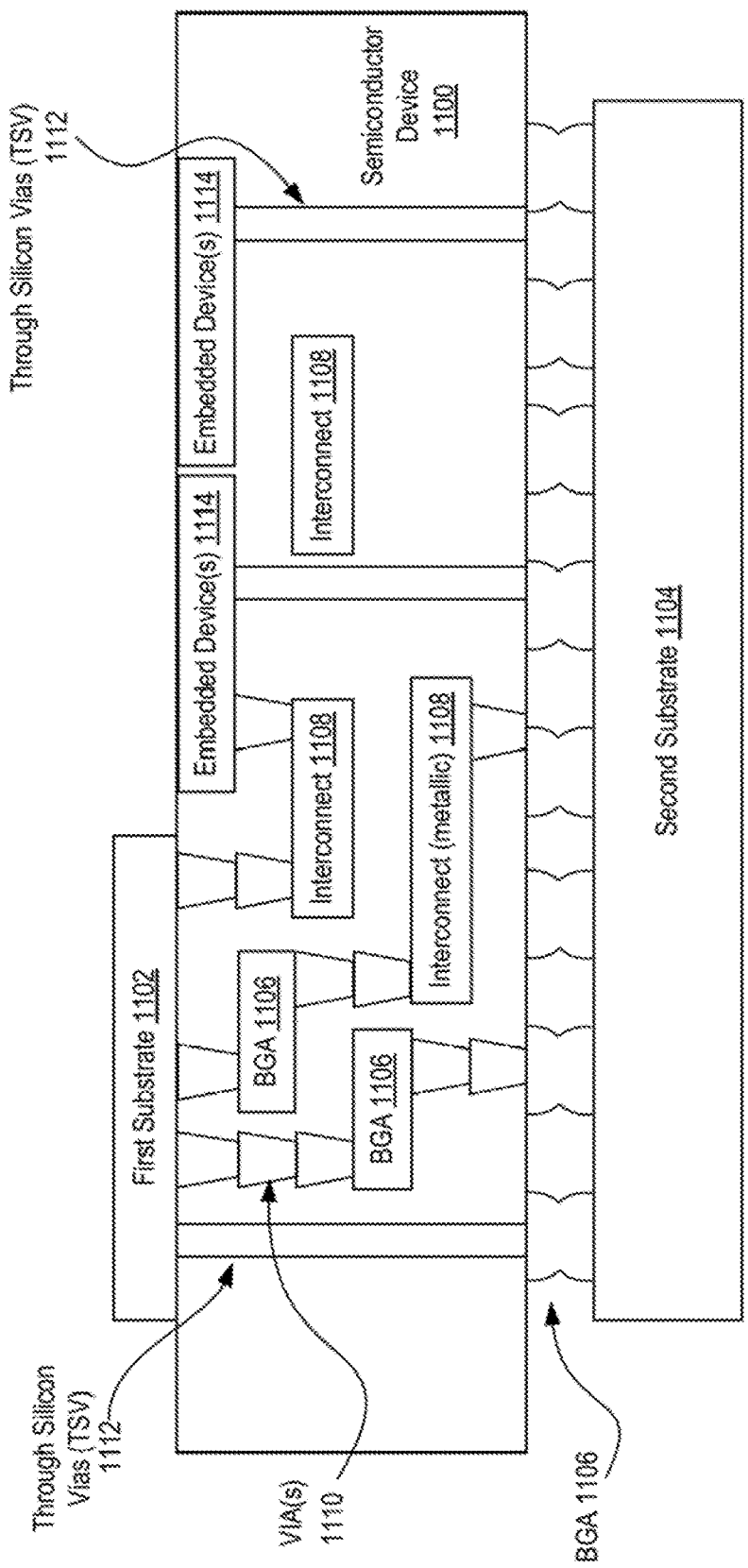
FIG. 11 illustrates an interposer that includes one or more described embodiments.

FIG. 11 illustrates an interposer 1100 that includes one or more described embodiments. The interposer 1100 is an intervening substrate used to bridge a first substrate 1102 to a second substrate 1104. The first substrate 1102 may be, for instance, an integrated circuit die. The second substrate 1104 may be, for instance, a memory module, a computer motherboard, or another integrated circuit die. Generally, the purpose of an interposer 1100 is to spread a connection to a wider pitch or to reroute a connection to a different connection. For example, an interposer 1100 may couple an integrated circuit die to a ball grid array (BGA) 1106 that can subsequently be coupled to the second substrate 1104. In some embodiments, the first and second substrates 1102/1104 are attached to opposing sides of the interposer 1100. In other embodiments, the first and second substrates 1102/1104 are attached to the same side of the interposer 1100. And in further embodiments, three or more substrates are interconnected by way of the interposer 1100.

The interposer 1100 may be formed of an epoxy resin, a fiberglass-reinforced epoxy resin, a ceramic material, or a polymer material such as polyimide. In further implementations, the interposer may be formed of alternate rigid or flexible materials that may include the same materials described above for use in a semiconductor substrate, such as silicon, germanium, and other group III-V and group IV materials.

The interposer may include metal interconnects 1108 and vias 1110, including but not limited to through-silicon vias (TSVs) 1112. The interposer 1100 may further include embedded devices 1114, including both passive and active devices. Such devices include, but are not limited to, capacitors, decoupling capacitors, resistors, inductors, fuses, diodes, transformers, sensors, and electrostatic discharge (ESD) devices. More complex devices such as radio-frequency (RF) devices, power amplifiers, power management devices, antennas, arrays, sensors, and MEMS devices may also be formed on the interposer 1100. In accordance with described embodiments, apparatuses or processes disclosed herein may be used in the fabrication of interposer 1100.

Figure 12A:
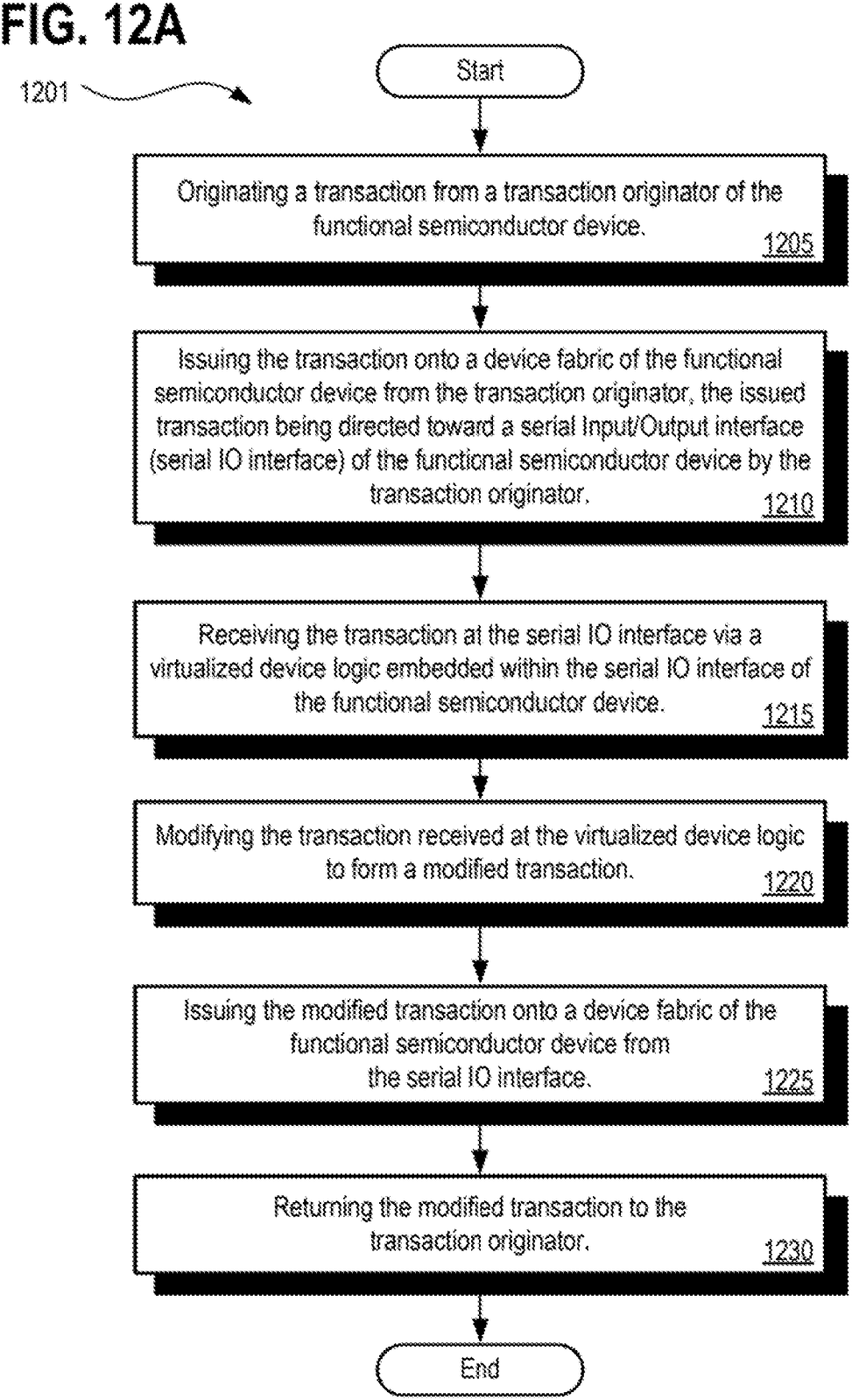
FIG. 12A is a flow diagram illustrating a method for implementing a high speed serial controller testing in accordance with described embodiments.

FIG. 12A is a flow diagram illustrating a method 1201 for implementing a high speed serial controller testing in accordance with described embodiments.

Figure 12B:
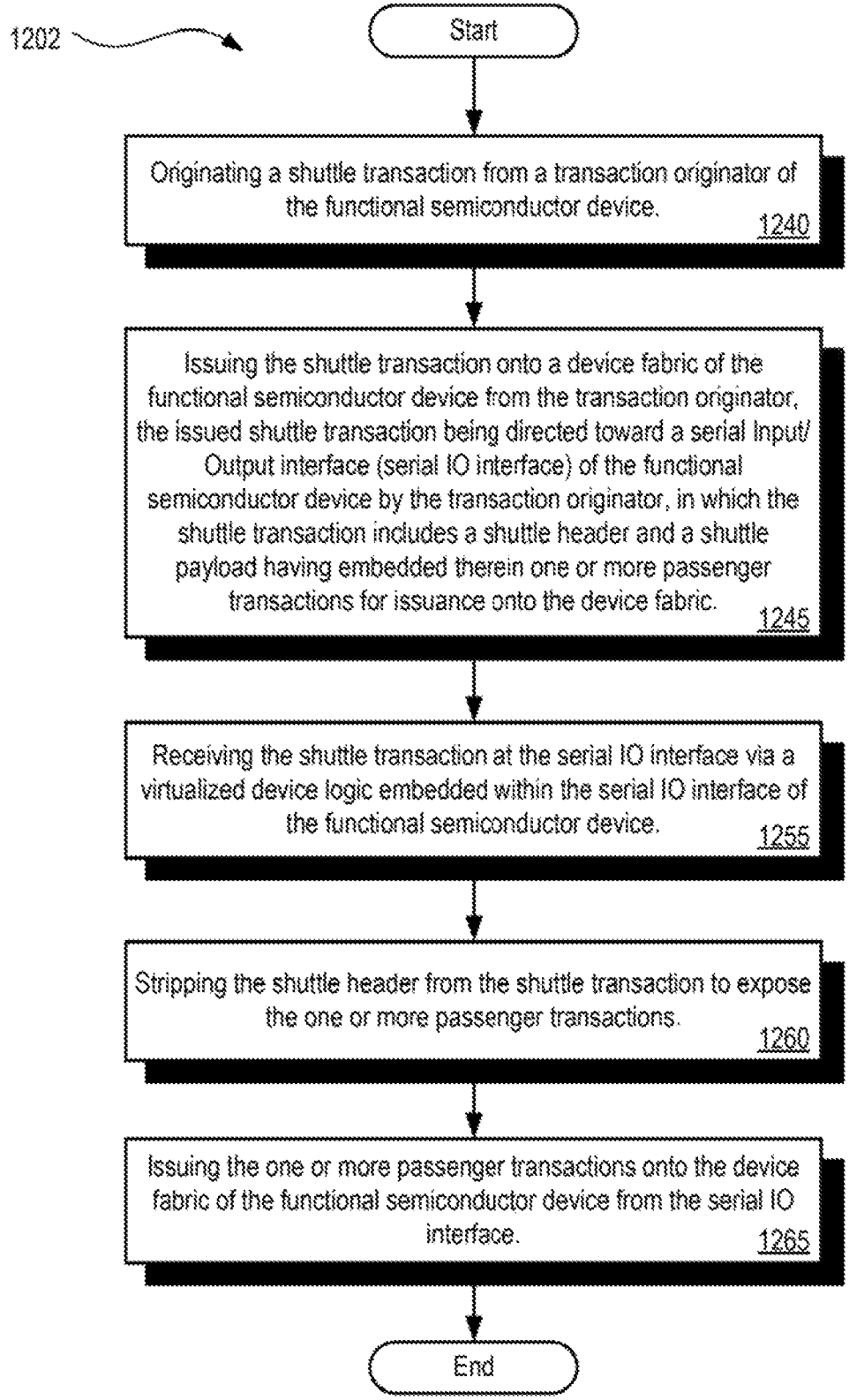
FIG. 12B is a flow diagram illustrating a method for implementing SoC coverage through virtual devices in PCIe and DMI controllers in accordance with described embodiments.

FIG. 12B is a flow diagram illustrating a method 1202 for implementing SoC coverage through virtual devices in PCIe and DMI controllers in accordance with described embodiments.

Figure 12C:
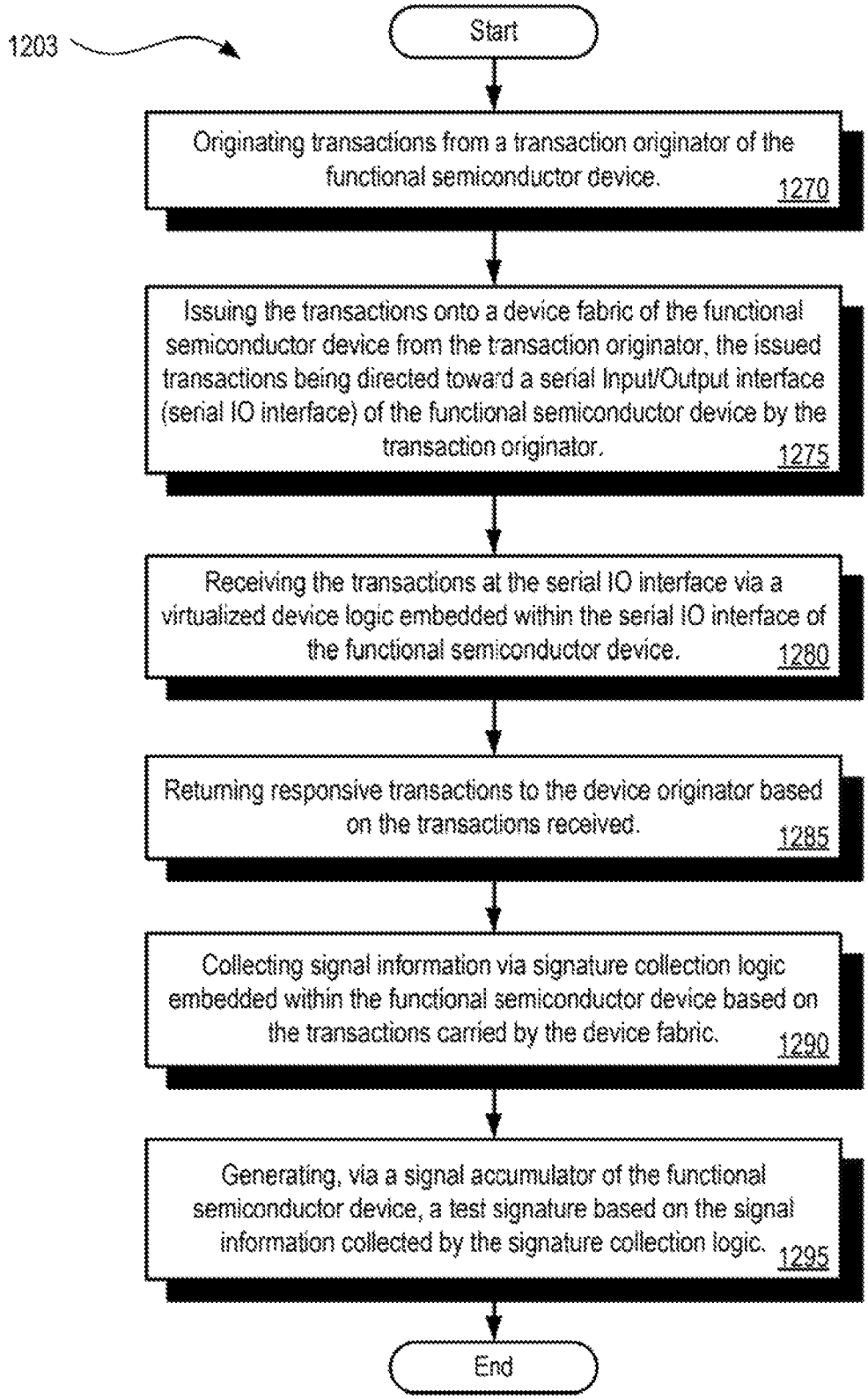
FIG. 12C is a flow diagram illustrating a method for implementing virtual device observation and debug network for high speed serial IOS in accordance with described embodiments.

FIG. 12C is a flow diagram illustrating a method 1203 for implementing virtual device observation and debug network for high speed serial IOS in accordance with described embodiments.

Some of the blocks and/or operations listed below with regard to the methods 1201, 1202, and 1203 are optional in accordance with certain embodiments. The numbering of the blocks presented is for the sake of clarity and is not intended to prescribe an order of operations in which the various blocks must occur. Additionally, operations from any of method flows 1201, 1202, and 1203 may be utilized in a variety of combinations.

Beginning with block 1205 of FIG. 12A, the method 1201 includes originating a transaction from a transaction originator of the functional semiconductor device.

At block 1210, the method includes issuing the transaction onto a device fabric of the functional semiconductor device from the transaction originator, the issued transaction being directed toward a serial Input/Output interface (serial IO interface) of the functional semiconductor device by the transaction originator.

At block 1215, the method includes receiving the transaction at the serial IO interface via a virtualized device logic embedded within the serial IO interface of the functional semiconductor device.

At block 1220, the method includes modifying the transaction received at the virtualized device logic to form a modified transaction.

At block 1225, the method includes issuing the modified transaction onto a device fabric of the functional semiconductor device from the serial IO interface.

At block 1230, the method includes returning the modified transaction to the transaction originator.

Referring now to block 1240 of FIG. 12B, the method 1202 includes originating a shuttle transaction from a transaction originator of the functional semiconductor device.

At block 1245, the method includes issuing the shuttle transaction onto a device fabric of the functional semiconductor device from the transaction originator, the issued shuttle transaction being directed toward a serial Input/Output interface (serial IO interface) of the functional semiconductor device by the transaction originator, in which the shuttle transaction includes a shuttle header and a shuttle payload having embedded therein one or more passenger transactions for issuance onto the device fabric.

At block 1250, the method includes receiving the shuttle transaction at the serial IO interface via a virtualized device logic embedded within the serial IO interface of the functional semiconductor device.

At block 1255, the method includes stripping the shuttle header from the shuttle transaction to expose the one or more passenger transactions.

At block 1260, the method includes issuing the one or more passenger transactions onto the device fabric of the functional semiconductor device from the serial IO interface.

Referring now to block 1270 of FIG. 12C, the method 1203 includes originating transactions from a transaction originator of the functional semiconductor device.

At block 1275, the method includes issuing the transactions onto a device fabric of the functional semiconductor device from the transaction originator, the issued transactions being directed toward a serial Input/Output interface (serial IO interface) of the functional semiconductor device by the transaction originator.

At block 1280, the method includes receiving the transactions at the serial IO interface via a virtualized device logic embedded within the serial IO interface of the functional semiconductor device.

At block 1285, the method includes returning responsive transactions to the device originator based on the transactions received.

At block 1290, the method includes collecting signal information via signature collection logic embedded within the functional semiconductor device based on the transactions carried by the device fabric.

At block 1295, the method includes generating, via a signal accumulator of the functional semiconductor device, a test signature based on the signal information collected by the signature collection logic.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

It is therefore in accordance with the described embodiments, that:

According to one embodiment there is a functional semiconductor device for implementing high speed serial controller testing, the apparatus having therein a functional semiconductor device, including: a serial Input/Output interface (serial IO interface); a device fabric to carry transactions between a plurality of components of the functional semiconductor device; virtualized device logic embedded within the serial IO interface; a transaction originator to originate a transaction and issue the transaction onto the device fabric directed toward the serial IO interface; in which the virtualized device logic is to receive the transaction at the serial IO interface via the device fabric; in which the virtualized device logic is to modify the transaction received to form a modified transaction; in which the virtualized device logic is to issue the modified transaction onto the device fabric; and in which the modified transaction is returned to the transaction originator.

According to such an embodiment, the virtualized device logic to issue the modified transaction onto the device fabric includes the modified transaction traversing a path through the device fabric to a memory controller prior to the modified transaction being returned to the transaction originator.

According to such an embodiment, the transaction by the transaction originator follows a path through the device fabric of the functional semiconductor device through at least the following components: from the transaction originator to the virtualized device logic of the serial IO interface as an originated transaction; from the virtualized device logic of the serial IO interface to a memory controller as the modified transaction, the modified transaction having a form of a memory transaction; from the memory controller to an auto-response mechanism as the memory transaction, in which the auto-response mechanism issues a responsive transaction in reply to the memory transaction; from the auto-response mechanism to the virtualized device logic of the serial TO interface as the responsive transaction in reply to the memory transaction; and from the virtualized device logic of the serial TO interface to the transaction originator as a second modified transaction, the second modified transaction directed to the transaction originator as a responsive message to the originated transaction.

According to such an embodiment, an auto-response mechanism responds to the modified transaction prior to the modified transaction being returned transaction originator; and in which the auto-response mechanism includes one of: (i) embedded logic within a memory controller of the functional semiconductor device; (ii) embedded logic with a DDR memory interface integrated within the functional semiconductor device; and (iii) an independent logic module connected with the device fabric of the functional semiconductor device which operates independent of the memory controller.

According to such an embodiment, the modified transaction is modified by the virtualized device logic to be directed toward external DDR memory connected with the device fabric of the functional semiconductor device via a DDR memory interface embedded within the functional semiconductor device; in which the DDR memory interface has no external DDR memory coupled thereto; and in which an auto-response mechanism is to respond to the modified transaction prior to the modified transaction reaching the DDR memory interface.

According to such an embodiment, the modified transaction includes a memory write transaction directed toward the DDR memory via the DDR memory interface; in which the auto-response mechanism to respond to the modified transaction prior to the modified transaction reaching the DDR memory interface includes the auto-response mechanism issuing a memory write acknowledgement responsive to the memory write transaction; and in which the memory write acknowledgement is returned to the transaction originator through the virtualized device logic embedded within the serial TO interface.

According to such an embodiment, the virtualized device logic embedded within the serial TO interface is to handle the memory write acknowledgement according to one of: (i) in which the virtualized device logic is to kill the memory write acknowledgement and prevent any response to the originated transaction from reaching the transaction originator when the transaction originator expects no response pursuant to a protocol for the device fabric; or (ii) in which the virtualized device logic is to return the memory write acknowledgement transaction originator responsive to the originated transaction when the transaction originator expects a response pursuant to the protocol for the device fabric.

According to such an embodiment, the modified transaction includes a memory read transaction directed toward the DDR memory via the DDR memory interface; in which the auto-response mechanism to respond to the modified transaction prior to the modified transaction reaching the DDR memory interface includes the auto-response mechanism issuing a responsive message with a header and a payload data carrying simulated memory read data in reply to the memory read transaction; and in which the responsive message with the header and the payload data is returned to the transaction originator through the virtualized device logic embedded within the serial TO interface.

According to such an embodiment, an auto-response mechanism is to respond to the modified transaction prior to the modified transaction being returned to the transaction originator; in which the auto-response mechanism is addressable; and in which the virtualized device logic is to modify the transaction received to form a modified transaction includes the virtualized device logic modifying addressing the transaction to be directed to the auto-response mechanism via the device fabric.

According to such an embodiment, the serial IO interface includes one of a PCIe, DMI, UFS, or SATA type serial IO interface.

According to such an embodiment, the transaction originator includes a CPU core module integrated within the functional semiconductor device, in which the CPU core module originates the transaction pursuant to execution of a test profile for the functional semiconductor device.

According to such an embodiment, the transaction originator includes a test controller integrated within the functional semiconductor device separately from one or more CPU core modules of the functional semiconductor device, in which the test controller originates the transaction pursuant to execution of a test profile for the functional semiconductor device.

According to such an embodiment, the apparatus further includes: a test interface; a communications link with a test bed external to the functional semiconductor device; and in which the transaction originator includes a test controller integrated within the test bed external to the functional semiconductor device, in which the test controller of the test bed originates the transaction pursuant to execution of a test profile for the functional semiconductor device and injects the transaction into the device fabric of the semiconductor device via the test interface.

According to such an embodiment, the serial IO interface includes a Peripheral Component Interconnect Express (PCIe) serial interface embedded within the functional semiconductor device; in which the transaction originator includes a CPU core module of the functional semiconductor device; in which the CPU core module is to originate the transaction and issue the transaction onto the device fabric directed toward an external PCIe device via the PCIe serial IO interface; in which the PCIe serial interface has no external PCIe device coupled thereto; and in which the virtualized device logic embedded within the serial IO interface includes a virtual device to emulate the functions of the external PCIe device and handle the transaction issued onto the device fabric directed toward the external PCIe device via the PCIe serial IO interface.

According to such an embodiment, the serial IO interface includes a Direct Media Interface (DMI) serial interface embedded within the functional semiconductor device; in which the transaction originator includes a CPU core module of the functional semiconductor device; in which the CPU core module is to originate the transaction and issue the transaction onto the device fabric directed toward an external DMI device via the DMI serial IO interface; in which the DMI serial interface has no external DMI device coupled thereto; and in which the virtualized device logic embedded within the serial IO interface includes a virtual device to emulate the functions of the external DMI device and handle the transaction issued onto the device fabric directed toward the external DMI device via the DMI serial IO interface.

According to such an embodiment, the serial IO interface includes a communications interface to an external Direct Media Interface (DMI) located external to the functional semiconductor device; in which the transaction originator includes a CPU core module of the functional semiconductor device; in which the CPU core module is to originate the transaction and issue the transaction onto the device fabric directed toward an external DMI device connected with the external DMI interface through the serial IO interface of the functional semiconductor device; in which the external DMI serial interface has no external DMI device coupled thereto; in which the serial IO interface has no external DMI serial interface coupled thereto; and in which the virtualized device logic embedded within the serial IO interface includes a virtual device to emulate the functions of the external DMI device and handle the transaction issued onto the device fabric directed toward the external DMI device or the external DMI serial interface.

According to such an embodiment, the virtualized device logic to modify the transaction received to form a modified transaction includes the virtual device logic to apply Address Translation Mode (ATM) to the transaction received to generate the modified transaction.

According to such an embodiment, the apparatus further includes: a protocol stack to implement a downstream protocol for a downstream communications layer and an upstream protocol for an upstream communications layer; in which the transaction originator to originate the transaction and issue the transaction onto the device fabric directed toward the serial IO interface includes the transaction originator issuing the transaction into the downstream communications layer in compliance with the downstream protocol; in which the virtualized device logic to modify the transaction received to form the modified transaction includes the virtualized device logic to modify the transaction into the modified transaction in compliance with the upstream protocol; and in which the virtualized device logic to issue the modified transaction onto the device fabric includes the virtualized device logic to issue the modified transaction into the upstream communications layer.

According to such an embodiment, the upstream protocol and the downstream protocol are asymmetric with upstream compliant transactions being non-compliant with the downstream communications protocol and downstream compliant transactions being non-compliant with the upstream communications protocol.

According to such an embodiment, the transaction issued into the downstream communications layer in compliance with the downstream protocol by the transaction originator is non-compliant with the upstream protocol; and in which a loopback function of the virtualized logic device of the serial IO interface morphs the transaction into an upstream protocol compliant transaction to form the modified transaction and loops the modified transaction back onto the device fabric in the upstream communications layer.

According to such an embodiment, the transaction issued into the downstream communications layer in compliance with the downstream protocol by the transaction originator is includes a downstream compliant transaction header and a downstream non-compliant payload carrying an illegal downstream transaction pursuant to the downstream protocol; in which the virtualized logic device of the serial IO interface strips away the downstream compliant transaction header and replaces the downstream compliant transaction header with an upstream compliant transaction header to form the modified transaction having therein the upstream compliant transaction header and the downstream non-compliant payload; and in which both the upstream compliant transaction header and the downstream non-compliant payload are legal and complaint in the upstream communications layer pursuant to the upstream protocol.

According to another embodiment, there is a method in a functional semiconductor device, the method including: originating a transaction from a transaction originator of the functional semiconductor device; issuing the transaction onto a device fabric of the functional semiconductor device from the transaction originator, the issued transaction being directed toward a serial Input/Output interface (serial IO interface) of the functional semiconductor device by the transaction originator; receiving the transaction at the serial IO interface via a virtualized device logic embedded within the serial IO interface of the functional semiconductor device; modifying the transaction received at the virtualized device logic to form a modified transaction; issuing the modified transaction onto a device fabric of the functional semiconductor device from the serial IO interface; and returning the modified transaction to the transaction originator.

According to such an embodiment, the method further includes implementing a downstream protocol for a downstream communications layer and an upstream protocol for an upstream communications layer; in which issuing the transaction onto a device fabric of the functional semiconductor device from the transaction originator includes the transaction originator issuing the transaction into the downstream communications layer in compliance with the downstream protocol; in which modifying the transaction received at the virtualized device logic to form a modified transaction includes the virtualized device logic morphing the transaction into the modified transaction in compliance with the upstream protocol; and in which issuing the modified transaction onto a device fabric includes the virtualized device logic issuing the modified transaction into the upstream communications layer.

According to another embodiment, there is a system including: a CPU core module (processor) and a memory to execute instructions; a printed circuit board (PCB) motherboard having the memory mounted thereupon; and a functional semiconductor device mounted to the PCB motherboard, the functional semiconductor device including: (i) the processor; (ii) a serial Input/Output interface (serial IO interface); (iii) a device fabric to carry transactions between a plurality of components of the functional semiconductor device; (iv) virtualized device logic embedded within the serial IO interface; and (v) a transaction originator to originate a transaction and issue the transaction onto the device fabric directed toward the serial IO interface; in which the virtualized device logic is to receive the transaction at the serial IO interface via the device fabric, in which the virtualized device logic is to modify the transaction received to form a modified transaction, in which the virtualized device logic is to issue the modified transaction onto the device fabric, and in which the modified transaction is returned to the transaction originator.

According to such an embodiment, the system is embodied within one of: a smart phone; a tablet; a hand-held computing device; a personal computer; or a wearable technology to be worn as a clothing item or an accessory.

It is in accordance with another embodiment that an apparatus for implementing SoC coverage through virtual devices in PCIe and DMI controllers is disclosed, the apparatus having therein a serial Input/Output interface (serial IO interface); a device fabric to carry transactions between a plurality of components of the functional semiconductor device; virtualized device logic embedded within the serial IO interface; a transaction originator to originate a shuttle transaction and to issue the shuttle transaction onto the device fabric directed toward the serial IO interface; in which the shuttle transaction includes a shuttle header and a shuttle payload having embedded therein one or more passenger transactions for issuance onto the device fabric; in which the virtualized device logic is to receive the shuttle transaction at the serial IO interface via the device fabric; in which the virtualized device logic is to strip the shuttle header from the shuttle transaction to expose the one or more passenger transactions; and in which the virtualized device logic is to issue the one or more passenger transactions onto the device fabric.

According to another embodiment, the device fabric implements an upstream protocol layer and a downstream protocol layer; in which the transaction originator to issue the shuttle transaction onto the device fabric directed toward the serial IO interface includes the transaction originator to issue the shuttle transaction onto the downstream protocol layer; and in which the virtualized device logic to issue the one or more passenger transactions onto the device fabric includes the virtualized device logic to issue the one or more passenger transactions onto the upstream protocol layer.

According to another embodiment, the apparatus further includes: a protocol stack to implement an upstream protocol for an upstream protocol layer of the device fabric and to implement a downstream protocol for a downstream protocol layer of the device fabric; in which the shuttle header of the shuttle transaction is compliant with the downstream protocol for the downstream protocol layer of the device fabric; in which the shuttle transaction traverses the device fabric to the serial TO interface via the downstream protocol layer; and in which the shuttle payload having embedded therein the one or more passenger transactions is hidden by the shuttle header in compliance with the downstream protocol.

According to another embodiment, the one or more passenger transactions hidden by the shuttle header are illegal on the downstream protocol layer and non-compliant pursuant to the downstream protocol; and in which the one or more passenger transactions are ignored by the downstream protocol due to being masked by the shuttle header.

According to another embodiment, the shuttle transaction having the shuttle header stripped by the virtualized logic device kills the shuttle transaction at the virtualized device logic; and in which no response is issued to the transaction originator in reply to the killed shuttle transaction.

According to another embodiment, the one or more passenger transactions to issue onto the device fabric include: one or more of: configuration register read or write transaction; TO read or write transaction; Vendor Message (VDM) transaction; memory read transaction; memory write transaction; atomics transaction; shuttle transactions; and simulated hacking transactions.

According to another embodiment, the shuttle transaction includes an illegal transaction shuttle carrying within the shuttle payload multiple illegal transactions to be spawned onto an upstream protocol layer via the virtualized device logic; in which the multiple illegal transactions are illegal in a downstream protocol layer upon which they are issued by the transaction originator.

According to another embodiment, the shuttle transaction includes an illegal transaction shuttle carrying within the shuttle payload multiple known malicious or simulated hacking transactions to test hacking protections and malicious transaction handling mechanisms of the device fabric.

According to another embodiment, the shuttle transaction carrying the shuttle payload transports multiple compound shuttle transactions as passenger transactions encapsulated within the shuttle payload and hidden from a protocol stack of the device fabric by the shuttle header of the shuttle transaction; and in which the virtualized device logic strips the shuttle header from the shuttle transaction and strips encapsulated headers associated with the multiple compound shuttle transactions encapsulated within the shuttle payload to expose a plurality of upstream protocol compliant transactions carried by the multiple compound shuttle transactions; and in which the virtualized device logic spawns the plurality of upstream protocol compliant transactions onto an upstream protocol layer to test buffers, arbiters, and flooding protections of the device fabric.

According to another embodiment, the virtualized device logic is to further modify the one or more passenger transactions exposed from stripping the shuttle header from the shuttle transaction; and in which the modification includes at least changing one or more fields of the one or more passenger transactions or modifying bandwidth mapping of the one or more passenger transactions.

According to another embodiment, no responsive transaction is issued to the transaction originator for the shuttle transaction; and in which a responsive transaction is issued to the transaction originator for each of the one or more passenger transactions issued onto the device fabric.

According to another embodiment, such an apparatus further includes: a receive buffer embedded within the device fabric to buffer transactions for a receive side of the device fabric; and a transmit buffer embedded within the device fabric to buffer transactions for a transmit side of the device fabric.

According to another embodiment, such an apparatus further includes: a control register having a plurality of hardware registers affecting operation of the functional semiconductor device; one or more of the plurality of registers programmable to activate or release a Receiver Cycles Hold Off operation to block the receive buffer from releasing transactions while the Receiver Cycles Hold Off operation is active; and a second one or more of the plurality of registers programmable to activate or release a Transmitter Cycles Hold Off operation to block the transmitter buffer from releasing transactions while the Transmitter Cycles Hold Off operation is active.

According to another embodiment, the receive buffer or the transmit buffer or both the transmit buffer and the receive buffer are programmatically blocked; in which the virtualized device logic to issue the one or more passenger transactions onto the device fabric includes the virtualized device logic to issue passenger transactions onto the device fabric until the receive buffer or the transmit buffer or both the transmit buffer and the receive buffer are filled with buffered transactions.

According to another embodiment, the receive buffer or the transmit buffer or both the transmit buffer and the receive buffer are programmatically released to cause the buffered transactions to burst onto the device fabric to test the buffers, arbiters, and flooding protections of the device fabric.

According to another embodiment, such an apparatus further includes: quieting logic of the functional semiconductor device to perform one or more of: implementing infinite credit mode for the device fabric; over-riding handshake checks for at least a sub-set of transactions traversing the device fabric; and preventing a chocking condition by iteratively issuing packets to activate the device fabric while the receive buffer or the transmit buffer or both the transmit buffer and the receive buffer are programmatically blocked to prevent the functional semiconductor device from entering a sleep mode or a low power mode due to inactivity of the device fabric.

According to another embodiment, an auto-response mechanism responds to the one or more passenger transactions issued onto the device fabric by the virtualized device logic; in which responsive transactions in reply to the one or more passenger transactions issued onto the device fabric by the virtualized device logic are returned to the transaction originator; and in which the auto-response mechanism includes one of: (i) embedded logic within a memory controller of the functional semiconductor device; (ii) embedded logic with a DDR memory interface integrated within the functional semiconductor device; and (iii) an independent logic module connected with the device fabric of the functional semiconductor device which operates independent of the memory controller.

According to another embodiment, the one or more passenger transactions issued onto the device fabric by the virtualized device logic are directed toward an external DDR memory connected with the device fabric of the functional semiconductor device via a DDR memory interface embedded within the functional semiconductor device; in which the DDR memory interface has no external DDR memory coupled thereto; and in which an auto-response mechanism is to respond to the one or more passenger transactions prior to the one or more passenger transactions reaching the DDR memory interface.

According to another embodiment, the shuttle transaction issued onto the device fabric by the transaction originator is directed toward one of (i) an external PCIe device via a PCIe serial IO interface implemented by the serial IO interface embedded within the functional semiconductor device or (ii) an external DMI device via a DMI serial IO interface implemented by the serial IO interface embedded within the functional semiconductor device; in which neither the PCIe serial IO interface nor the DMI serial IO interface has an externally connected PCIe device or externally connected DMI device; and in which the virtualized device logic emulates the externally connected PCIe device or externally connected DMI device, or both; and in which the virtualized device logic processes the shuttle transaction and issues the one or more passenger transactions back to the device logic.

According to another embodiment, the serial IO interface includes one of a PCIe, DMI, UFS, or SATA type serial IO interface.

According to another embodiment, the transaction originator includes one of: a CPU core module integrated within the functional semiconductor device, in which the CPU core module originates the shuttle transaction pursuant to execution of a test profile for the functional semiconductor device; a test controller integrated within the functional semiconductor device separately from the CPU core modules of the functional semiconductor device, in which the test controller originates the shuttle transaction pursuant to execution of a test profile for the functional semiconductor device; and an external test controller integrated within a test bed communicatively interfaced to the functional semiconductor device via a test interface embedded within the functional semiconductor device, in which the external test controller integrated within the test bed originates the shuttle transaction pursuant to execution of a test profile for the functional semiconductor device and injects the shuttle transaction into the device fabric of the semiconductor device via the test interface.

According to another embodiment there is a method in a functional semiconductor device, the method including: originating a shuttle transaction from a transaction originator of the functional semiconductor device; issuing the shuttle transaction onto a device fabric of the functional semiconductor device from the transaction originator, the issued shuttle transaction being directed toward a serial Input/Output interface (serial IO interface) of the functional semiconductor device by the transaction originator; in which the shuttle transaction includes a shuttle header and a shuttle payload having embedded therein one or more passenger transactions for issuance onto the device fabric; receiving the shuttle transaction at the serial IO interface via a virtualized device logic embedded within the serial IO interface of the functional semiconductor device; stripping the shuttle header from the shuttle transaction to expose the one or more passenger transactions; and issuing the one or more passenger transactions onto the device fabric of the functional semiconductor device from the serial IO interface.

According to another embodiment, such a method further includes: implementing an upstream protocol for an upstream protocol layer of the device fabric; implementing a downstream protocol for a downstream protocol layer of the device fabric; in which the shuttle header of the shuttle transaction is compliant with the downstream protocol for the downstream protocol layer of the device fabric; in which the shuttle transaction traverses the device fabric to the serial IO interface via the downstream protocol layer; in which the shuttle payload having embedded therein the one or more passenger transactions is hidden by the shuttle header in compliance with the downstream protocol; in which the one or more passenger transactions hidden by the shuttle header are illegal on the downstream protocol layer and non-compliant pursuant to the downstream protocol; and in which the one or more passenger transactions are ignored by the downstream protocol due to being hidden by the shuttle header.

According to another embodiment, there is a system including: a CPU core module (processor) and a memory to execute instructions; a printed circuit board (PCB) motherboard having the memory mounted thereupon; and a functional semiconductor device mounted to the PCB motherboard, the functional semiconductor device including: (i) the processor; (ii) a serial Input/Output interface (serial IO interface); (iii) a device fabric to carry transactions between a plurality of components of the functional semiconductor device; (iv) virtualized device logic embedded within the serial IO interface; (v) a transaction originator to originate a shuttle transaction and to issue the shuttle transaction onto the device fabric directed toward the serial IO interface; and in which the shuttle transaction includes a shuttle header and a shuttle payload having embedded therein one or more passenger transactions for issuance onto the device fabric; in which the virtualized device logic is to receive the shuttle transaction at the serial IO interface via the device fabric; in which the virtualized device logic is to strip the shuttle header from the shuttle transaction to expose the one or more passenger transactions; and in which the virtualized device logic is to issue the one or more passenger transactions onto the device fabric.

According to another embodiment, the system is embodied within one of: a smart phone; a tablet; a hand-held computing device; a personal computer; or a wearable technology to be worn as a clothing item or an accessory.

It is in accordance with another embodiment that there is an apparatuses for implementing virtual device observation and debug network for high speed serial IOS, the apparatus having therein a device fabric to carry transactions between a plurality of components of the functional semiconductor device; a transaction originator to originate a transactions and issue the transactions onto the device fabric directed toward the serial IO interface; in which the virtualized device logic is to receive the transactions at the serial IO interface via the device fabric and return responsive transactions to the device originator based on the transactions received; signature collection logic to collect signal information based on the transactions carried by the device fabric; and a signal accumulator to generate a test signature based on the signal information collected by the signature collection logic.

According to another embodiment, the signature collection logic collects a sub-portion of the signal information based on the transactions carried by the device fabric to generate a sample.

According to another embodiment, the signature collection logic includes: TLP Data Counters to count a number of data phases transmitted; in which the TLP data counters record an exact number of data phases observed including a count of multiple phases within a single TLP packet.

According to another embodiment, the signature collection logic includes TLP header counters to count a number of TLP headers transmitted and received.

According to another embodiment, the signature collection logic includes: TLP header counters; TLP data counters; and TLP counters which count a number of TLP packets regardless of whether or not the transactions are transmitted and received with or without payload data.

According to another embodiment, a test profile specifies the transactions to be originated and issued onto the device fabric iteratively over multiple clock cycles of the functional semiconductor device; in which the generated test signature specifies one or more transaction packet counts for the transactions observed on the device fabric during the test profile; and in which the one or more transaction packet counts are compared with expected packet counts to identify a pass or fail condition for the functional semiconductor device.

According to another embodiment, the functional semiconductor device is determined to be a passing unit or a failing unit based on whether the one or more transaction packet counts observed by the functional semiconductor device during execution of the test profile matches a corresponding one or more transaction packet counts observed by a known good functional semiconductor device during execution of an identical test profile.

According to another embodiment, the transaction originator to originate transactions and issue transactions onto the device fabric iteratively over multiple clock cycles of the functional semiconductor device; and in which the signature collection logic to collect the signal information based on the transactions carried by the device fabric over the multiple clock cycles of the functional semiconductor device.

According to another embodiment, the accumulator sums the collected signal information over the multiple clock cycles of the functional semiconductor device.

According to another embodiment, the accumulator stores an n-bit integer representing the generated test signature; in which the accumulator updates the n-bit integer representing the generated test signature during each of the multiple clock cycles of the functional semiconductor device; and in which the size in bits of the n-bit integer representing the generated test signature does not increase in a quantity of bits over the multiple clock cycles of the functional semiconductor device.

According to another embodiment, the collection of the signal information based on the signal information based on the transactions carried by the device fabric is programmatically activated and deactivated on a per-cycle basis for any of the multiple clock cycles of the functional semiconductor device.

According to another embodiment, the collection of the signal information based on the signal information based on the transactions carried by the device fabric is set to collect the signal information and generate the test signature for a sub-portion of the multiple clock cycles of the functional semiconductor device; in which the sub-portion of the multiple clock cycles for which the signature collection logic is to collect the signal information is specified as a range of the multiple clock cycles; in which the multiple clock cycles are specified according to a test profile for platform validation test of the functional semiconductor device.

According to another embodiment, a debug mode is to iteratively execute the test profile on the functional semiconductor device to diagnose a fault condition of the functional semiconductor device; in which the test profile is executed with a first sub-portion of the multiple clock cycles set to collect the signal information and generate the test signature according to a range of the multiple clock cycles specified via the debug mode; in which a new test signature generated based on the first sub-portion is compared with a known good test signature generated from a known good functional semiconductor device based on an execution of a same range of the multiple clock cycles as the first sub-portion of clock cycles executed on the functional semiconductor device.

According to another embodiment, if the new test signature matches the known good test signature then the first sub-portion of the multiple clock cycles is identified as free from the fault condition and a second sub-portion of the multiple clock cycles non-overlapping with the first sub-portion is specified as the range for a next iteration to execute the test profile; and in which if the new test signature does not match the known good test signature then the first sub-portion of the multiple clock cycles is identified as including the fault condition and the range associated with the first sub-portion of the multiple clock cycles is reduced for a next iteration to narrow down a location within the test profile having a clock cycle associated with the fault condition.

According to another embodiment, a test profile specifies the transactions to be originated and issued onto the device fabric iteratively over multiple clock cycles of the functional semiconductor device; in which the signal accumulator to generate the test signature based on the signal information collected by the signature collection logic for the test profile specified transactions originated and issued onto the device fabric iteratively over multiple clock cycles; in which a second test signature is generated from a known good functional semiconductor device by executing the test profile on the known good functional semiconductor device, the second test signature representing a known good test signature; and comparing the test signature generated from the functional semiconductor device with the known good test signature generated from the known good functional semiconductor device.

According to another embodiment, the functional semiconductor device is determined to be a passing unit or a failing unit based on whether the test signature generated from the functional semiconductor device matches the known good test signature generated from the known good functional semiconductor device.

According to another embodiment, the signature collection logic is programmatically activated pursuant to a security access policy.

According to another embodiment, the security access policy requires input of personal identification information and a password at boot time of the functional semiconductor device before the signature collection logic is activated.

According to another embodiment, the security access policy requires an encrypted secure token to be passed into the functional semiconductor device via a test interface embedded within the functional semiconductor device, in which the test interface is to receive the encrypted secure token from a test controller of a manufacturing test bed external to the functional semiconductor device over a communications link between the test interface and the test controller; and in which receipt of the encrypted secure token at boot time of the functional semiconductor device activates the signature collection logic on the functional semiconductor device.

According to another embodiment, the serial IO interface includes one of a PCIe, DMI, UFS, or SATA type serial IO interface.

According to another embodiment, the transaction originator includes one of: a CPU core module integrated within the functional semiconductor device, in which the CPU core module originates the shuttle transaction pursuant to execution of a test profile for the functional semiconductor device; a test controller integrated within the functional semiconductor device separately from the CPU core modules of the functional semiconductor device, in which the test controller originates the shuttle transaction pursuant to execution of a test profile for the functional semiconductor device; and an external test controller integrated within a test bed communicatively interfaced to the functional semiconductor device via a test interface embedded within the functional semiconductor device, in which the external test controller integrated within the test bed originates the shuttle transaction pursuant to execution of a test profile for the functional semiconductor device and injects the shuttle transaction into the device fabric of the semiconductor device via the test interface.

According to another embodiment, there is a method in a functional semiconductor device, the method including: originating transactions from a transaction originator of the functional semiconductor device; issuing the transactions onto a device fabric of the functional semiconductor device from the transaction originator, the issued transactions being directed toward a serial Input/Output interface (serial IO interface) of the functional semiconductor device by the transaction originator; receiving the transactions at the serial IO interface via a virtualized device logic embedded within the serial IO interface of the functional semiconductor device; returning responsive transactions to the device originator based on the transactions received; collecting signal information via signature collection logic embedded within the functional semiconductor device based on the transactions carried by the device fabric; and generating, via a signal accumulator of the functional semiconductor device, a test signature based on the signal information collected by the signature collection logic.

According to another embodiment of the method, the accumulator sums the collected signal information over the multiple clock cycles of the functional semiconductor device; in which the accumulator stores an n-bit integer representing the generated test signature; in which the accumulator updates the n-bit integer representing the generated test signature during each of the multiple clock cycles of the functional semiconductor device; and in which the size in bits of the n-bit integer representing the generated test signature does not increase in a quantity of bits over the multiple clock cycles of the functional semiconductor device.

According to another embodiment there is a system including: a CPU core module (processor) and a memory to execute instructions; a printed circuit board (PCB) motherboard having the memory mounted thereupon; and a functional semiconductor device mounted to the PCB motherboard, the functional semiconductor device including: (i) the processor; (ii) a serial Input/Output interface (serial IO interface); (iii) a device fabric to carry transactions between a plurality of components of the functional semiconductor device; (iv) a transaction originator to originate a transactions and issue the transactions onto the device fabric directed toward the serial IO interface, in which the virtualized device logic is to receive the transactions at the serial IO interface via the device fabric and return responsive transactions to the device originator based on the transactions received; (v) signature collection logic to collect signal information based on the transactions carried by the device fabric; and (vi) a signal accumulator to generate a test signature based on the signal information collected by the signature collection logic.

According to another embodiment, the system is embodied within one of: a smart phone; a tablet; a hand-held computing device; a personal computer; or a wearable technology to be worn as a clothing item or an accessory.

What is claimed is:

1. A functional semiconductor device, comprising:
a serial Input/Output interface (serial IO interface);
a device fabric to carry transactions between a plurality of components of the functional semiconductor device;
a transaction originator to originate a transactions and issue the transactions onto the device fabric directed toward the serial IO interface;
wherein the virtualized device logic is to receive the transactions at the serial IO interface via the device fabric and return responsive transactions to the device originator based on the transactions received;
signature collection logic to collect signal information based on the transactions carried by the device fabric; and
a signal accumulator to generate a test signature based on the signal information collected by the signature collection logic.

2. The functional semiconductor device of claim 1, wherein the signature collection logic collects a sub-portion of the signal information based on the transactions carried by the device fabric to generate a sample.

3. The functional semiconductor device of claim 1, wherein the signature collection logic includes:
TLP Data Counters to count a number of data phases transmitted;
wherein the TLP data counters record an exact number of data phases observed including a count of multiple phases within a single TLP packet.

4. The functional semiconductor device of claim 1, wherein the signature collection logic includes TLP header counters to count a number of TLP headers transmitted and received.

5. The functional semiconductor device of claim 1, wherein the signature collection logic includes:
TLP header counters;
TLP data counters; and
TLP counters which count a number of TLP packets regardless of whether or not the transactions are transmitted and received with or without payload data.

6. The functional semiconductor device of claim 1:
wherein a test profile specifies the transactions to be originated and issued onto the device fabric iteratively over multiple clock cycles of the functional semiconductor device;
wherein the generated test signature specifies one or more transaction packet counts for the transactions observed on the device fabric during the test profile; and
wherein the one or more transaction packet counts are compared with expected packet counts to identify a pass or fail condition for the functional semiconductor device.

7. The functional semiconductor device of claim 6:
wherein the functional semiconductor device is determined to be a passing unit or a failing unit based on whether the one or more transaction packet counts observed by the functional semiconductor device during execution of the test profile matches a corresponding one or more transaction packet counts observed by a known good functional semiconductor device during execution of an identical test profile.

8. The functional semiconductor device of claim 1:
wherein the transaction originator to originate transactions and issue transactions onto the device fabric iteratively over multiple clock cycles of the functional semiconductor device; and
wherein the signature collection logic to collect the signal information based on the transactions carried by the device fabric over the multiple clock cycles of the functional semiconductor device.

9. The functional semiconductor device of claim 8:
wherein the accumulator sums the collected signal information over the multiple clock cycles of the functional semiconductor device.

10. The functional semiconductor device of claim 8:
wherein the accumulator stores an n-bit integer representing the generated test signature;
wherein the accumulator updates the n-bit integer representing the generated test signature during each of the multiple clock cycles of the functional semiconductor device; and
wherein the size in bits of the n-bit integer representing the generated test signature does not increase in a quantity of bits over the multiple clock cycles of the functional semiconductor device.

11. The functional semiconductor device of claim 8:
wherein the collection of the signal information based on the signal information based on the transactions carried by the device fabric is programmatically activated and deactivated on a per-cycle basis for any of the multiple clock cycles of the functional semiconductor device.

12. The functional semiconductor device of claim 8:
wherein the collection of the signal information based on the signal information based on the transactions carried by the device fabric is set to collect the signal information and generate the test signature for a sub-portion of the multiple clock cycles of the functional semiconductor device;
wherein the sub-portion of the multiple clock cycles for which the signature collection logic is to collect the signal information is specified as a range of the multiple clock cycles;
wherein the multiple clock cycles are specified according to a test profile for platform validation test of the functional semiconductor device.

13. The functional semiconductor device of claim 11:
wherein a debug mode is to iteratively execute the test profile on the functional semiconductor device to diagnose a fault condition of the functional semiconductor device;
wherein the test profile is executed with a first sub-portion of the multiple clock cycles set to collect the signal information and generate the test signature according to a range of the multiple clock cycles specified via the debug mode;

wherein a new test signature generated based on the first sub-portion is compared with a known good test signature generated from a known good functional semiconductor device based on an execution of a same range of the multiple clock cycles as the first sub-portion of clock cycles executed on the functional semiconductor device.

14. The functional semiconductor device of claim 13:
wherein if the new test signature matches the known good test signature then the first sub-portion of the multiple clock cycles is identified as free from the fault condition and a second sub-portion of the multiple clock cycles non-overlapping with the first sub-portion is specified as the range for a next iteration to execute the test profile; and wherein if the new test signature does not match the known good test signature then the first sub-portion of the multiple clock cycles is identified as including the fault condition and the range associated with the first sub-portion of the multiple clock cycles is reduced for a next iteration to narrow down a location within the test profile having a clock cycle associated with the fault condition.

15. The functional semiconductor device of claim 1:
wherein a test profile specifies the transactions to be originated and issued onto the device fabric iteratively over multiple clock cycles of the functional semiconductor device;

wherein the signal accumulator to generate the test signature based on the signal information collected by the signature collection logic for the test profile specified transactions originated and issued onto the device fabric iteratively over multiple clock cycles;

wherein a second test signature is generated from a known good functional semiconductor device by executing the test profile on the known good functional semiconductor device, the second test signature representing a known good test signature; and comparing the test signature generated from the functional semiconductor device with the known good test signature generated from the known good functional semiconductor device.

16. The functional semiconductor device of claim 15:
wherein the functional semiconductor device is determined to be a passing unit or a failing unit based on whether the test signature generated from the functional semiconductor device matches the known good test signature generated from the known good functional semiconductor device.

17. The functional semiconductor device of claim 1:
wherein the signature collection logic is programmatically activated pursuant to a security access policy.

18. The functional semiconductor device of claim 17, wherein the security access policy requires input of personal identification information and a password at boot time of the functional semiconductor device before the signature collection logic is activated.

19. The functional semiconductor device of claim 17:
wherein the security access policy requires an encrypted secure token to be passed into the functional semiconductor device via a test interface embedded within the functional semiconductor device, wherein the test interface is to receive the encrypted secure token from a test controller of a manufacturing test bed external to the functional semiconductor device over a communications link between the test interface and the test controller; and wherein receipt of the encrypted secure token at boot time of the functional semiconductor device activates the signature collection logic on the functional semiconductor device.

20. The functional semiconductor device of claim 1, wherein the serial IO interface comprises one of a PCIe, DMI, UFS, or SATA type serial IO interface.

21. The functional semiconductor device of claim 1, wherein the transaction originator comprises one of:
a CPU core module integrated within the functional semiconductor device, wherein the CPU core module originates the shuttle transaction pursuant to execution of a test profile for the functional semiconductor device;

a test controller integrated within the functional semiconductor device separately from the CPU core modules of the functional semiconductor device, wherein the test controller originates the shuttle transaction pursuant to execution of a test profile for the functional semiconductor device; and an external test controller integrated within a test bed communicatively interfaced to the functional semiconductor device via a test interface embedded within the functional semiconductor device, wherein the external test controller integrated within the test bed originates the shuttle transaction pursuant to execution of a test profile for the functional semiconductor device and injects the shuttle transaction into the device fabric of the semiconductor device via the test interface.

22. A method in a functional semiconductor device, the method comprising:
originating transactions from a transaction originator of the functional semiconductor device;

issuing the transactions onto a device fabric of the functional semiconductor device from the transaction originator, the issued transactions being directed toward a serial Input/Output interface (serial IO interface) of the functional semiconductor device by the transaction originator;

receiving the transactions at the serial IO interface via a virtualized device logic embedded within the serial IO interface of the functional semiconductor device;

returning responsive transactions to the device originator based on the transactions received;

collecting signal information via signature collection logic embedded within the functional semiconductor device based on the transactions carried by the device fabric; and generating, via a signal accumulator of the functional semiconductor device, a test signature based on the signal information collected by the signature collection logic.

23. The method of claim 22, further comprising:
wherein the accumulator sums the collected signal information over the multiple clock cycles of the functional semiconductor device;

wherein the accumulator stores an n-bit integer representing the generated test signature;

wherein the accumulator updates the n-bit integer representing the generated test signature during each of the multiple clock cycles of the functional semiconductor device; and wherein the size in bits of the n-bit integer representing the generated test signature does not increase in a quantity of bits over the multiple clock cycles of the functional semiconductor device.

24. A system comprising:
a CPU core module (processor) and a memory to execute instructions;
a printed circuit board (PCB) motherboard having the memory mounted thereupon; and
a functional semiconductor device mounted to the PCB motherboard, the functional semiconductor device comprising:
  (i) the processor;
  (ii) a serial Input/Output interface (serial IO interface);
  (iii) a device fabric to carry transactions between a plurality of components of the functional semiconductor device;
  (iv) a transaction originator to originate a transactions and issue the transactions onto the device fabric directed toward the serial IO interface, wherein the virtualized device logic is to receive the transactions at the serial IO interface via the device fabric and return responsive transactions to the device originator based on the transactions received;
  (v) signature collection logic to collect signal information based on the transactions carried by the device fabric; and
  (vi) a signal accumulator to generate a test signature based on the signal information collected by the signature collection logic.

25. The system of claim 24, wherein the system is embodied within one of:
a smart phone;
a tablet;
a hand-held computing device;
a personal computer; or
a wearable technology to be worn as a clothing item or an accessory.

* * * * *

UNITED STATES PATENT AND TRADEMARK OFFICE
CERTIFICATE OF CORRECTION

PATENT NO. : 10,484,361 B2
APPLICATION NO. : 15/199356
DATED : November 19, 2019
INVENTOR(S) : Lakshminarayana Pappu et al.

It is certified that error appears in the above-identified patent and that said Letters Patent is hereby corrected as shown below:

In the Claims

Column 1, Claim 1, Line 31, delete the first occurrence of "the" and insert --a-- before "virtualized".

Column 1, Claim 24, Line 18, delete the second occurrence of "the" and insert --a-- after "wherein".

Column 1, Claim 1, Line 33, delete "device" and insert --transaction--.

Column 2, Claim 22, Line 46, delete "device" and insert --transaction--.

Column 2, Claim 24, Line 2, delete "device" and insert --transaction--.

Signed and Sealed this
Seventh Day of January, 2020

Andrei Iancu
*Director of the United States Patent and Trademark Office*